(12) United States Patent
Michelini et al.

(10) Patent No.: US 7,111,612 B2
(45) Date of Patent: Sep. 26, 2006

(54) CYLINDER AND VALVE MODE CONTROL FOR AN ENGINE WITH VALVES THAT MAY BE DEACTIVATED

(75) Inventors: John O. Michelini, Sterling Heights, MI (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/221,085

(22) Filed: Sep. 6, 2005

(65) Prior Publication Data

US 2006/0005813 A1  Jan. 12, 2006

Related U.S. Application Data

(62) Division of application No. 10/805,611, filed on Mar. 19, 2004.

(51) Int. Cl.
*F02D 13/06* (2006.01)
*F02B 15/00* (2006.01)

(52) U.S. Cl. .............. 123/432; 123/90.11; 123/90.15; 123/198 F

(58) Field of Classification Search ............ 123/90.11, 123/90.15, 90.16, 90.17, 198 F, 308, 432, 123/481
See application file for complete search history.

(56) References Cited

U.S. PATENT DOCUMENTS

| | | | |
|---|---|---|---|
| 5,117,790 A * | 6/1992 | Clarke et al. | ............ 123/198 F |
| 5,284,116 A * | 2/1994 | Richeson, Jr. | ........... 123/90.11 |
| 5,357,916 A | 10/1994 | Matterazzo | |
| 6,085,717 A | 7/2000 | Kamura et al. | |
| 6,250,266 B1 | 6/2001 | Okui et al. | |
| 6,401,026 B1 | 6/2002 | Robichaux et al. | |
| 6,510,824 B1 | 1/2003 | Vorih et al. | |
| 6,655,353 B1 | 12/2003 | Rayl | |
| 6,832,977 B1 | 12/2004 | You | |
| 6,866,012 B1 | 3/2005 | Hayase et al. | |
| 6,955,144 B1 | 10/2005 | Sakai et al. | |
| 2005/0166900 A1 * | 8/2005 | Song et al. | ................. 123/481 |

* cited by examiner

*Primary Examiner*—T. M. Argenbright
(74) *Attorney, Agent, or Firm*—Allan J. Lippa; Alleman Hall McCoy Russell & Tuttle LLP

(57) ABSTRACT

A method to select cylinder and valve operational modes in an internal combustion engine with valves that may be deactivated. A simplified method to select cylinder and valve modes is presented.

22 Claims, 60 Drawing Sheets

FIG - 11

|  | COLUMN 0 |  |  | COLUMN 3 |  |
|---|---|---|---|---|---|
| V2 | 1 | 1 | 1 | 1 | ROW 3 |
| 12-STROKE | 1 | 1 | 1 | 1 |  |
| V4 | 1 | 1 | 1 | 1 |  |
| V8 | 1 | 1 | 1 | 1 | ROW 0 |
|  | DIDE | DIAE | AIDE | AIAE |  |

↑ DECREASING TORQUE

— DECREASING TORQUE →

FIG - 12

|  | COLUMN 0 |  |  | COLUMN 3 |  |
|---|---|---|---|---|---|
| V2 | 0 | 0 | 0 | 0 | ROW 3 |
| 12-STROKE | 0 | 0 | 0 | 0 |  |
| V4 | 1 | (1) | 0 | 0 |  |
| V8 | 1 | 1 | 1 | 1 | ROW 0 |
|  | DIDE | DIAE | AIDE | AIAE |  |

↑ DECREASING TORQUE

— DECREASING TORQUE →

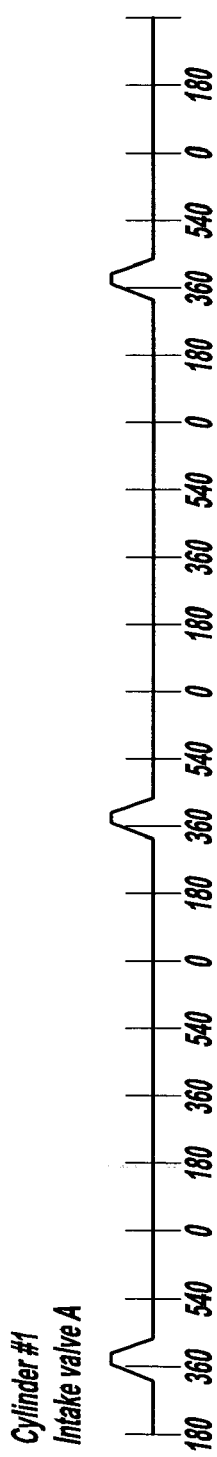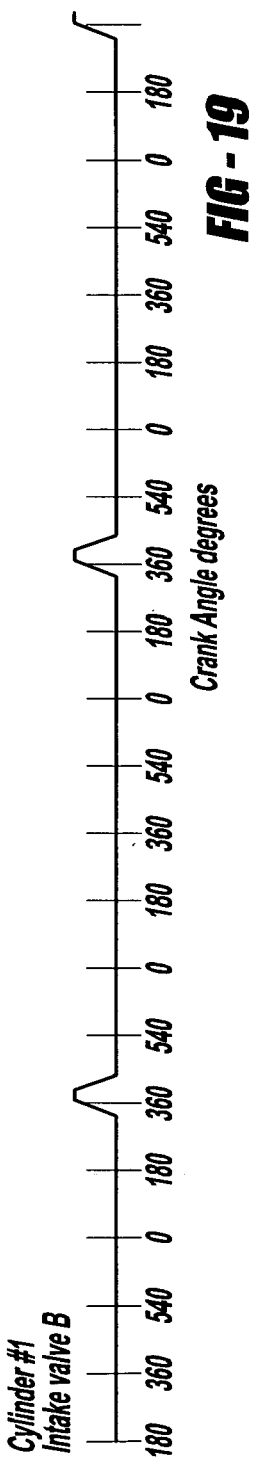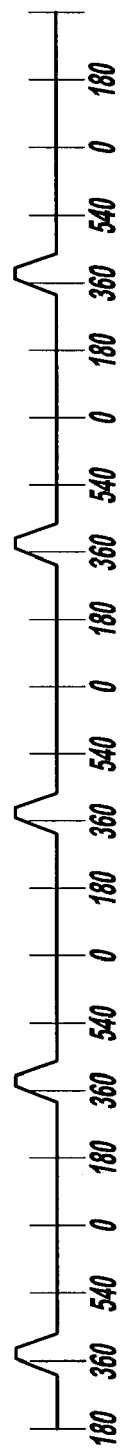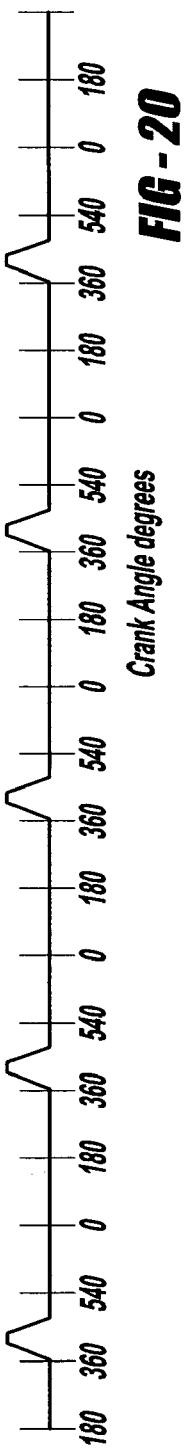
FIG-19
FIG-20

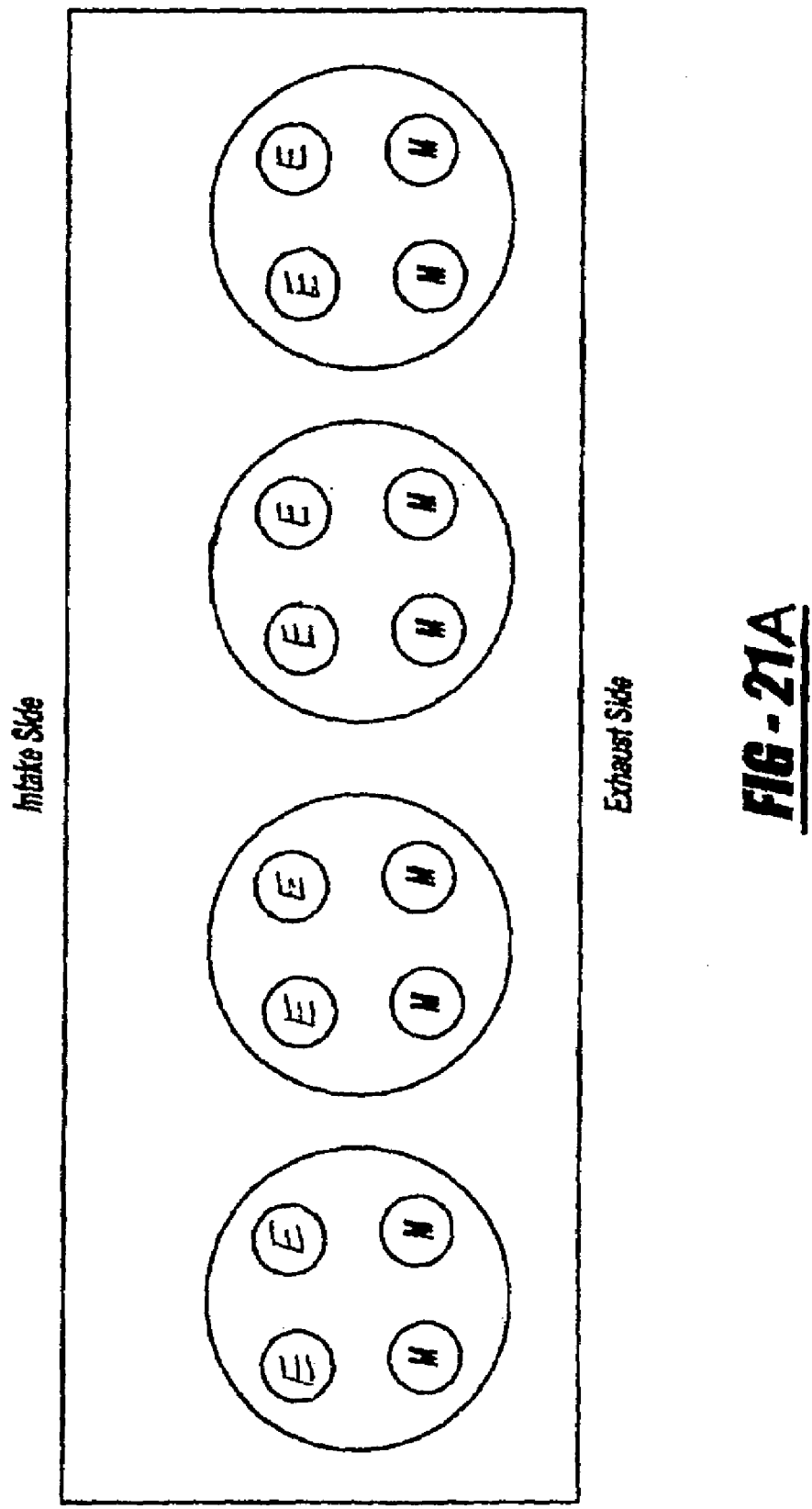

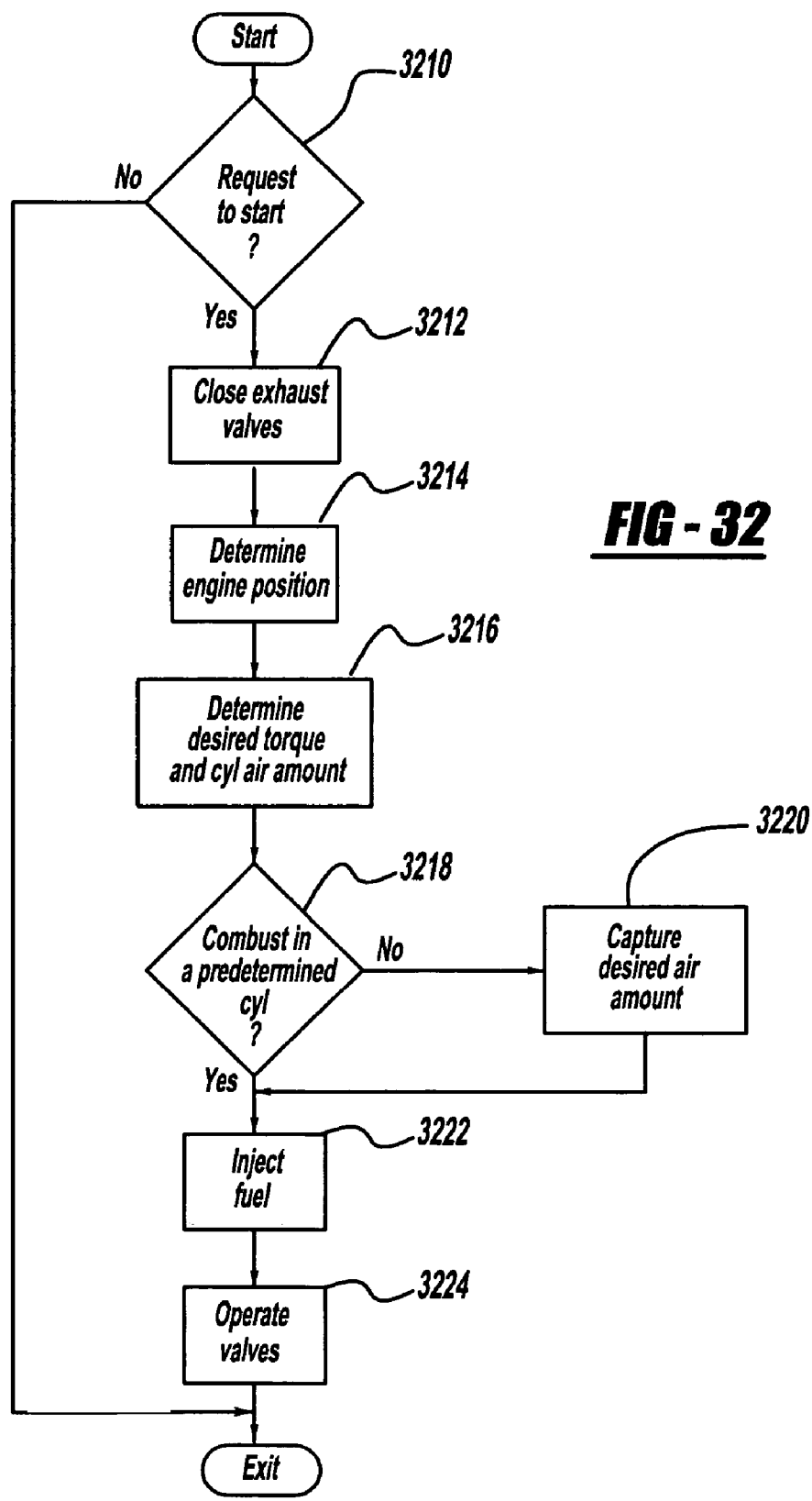

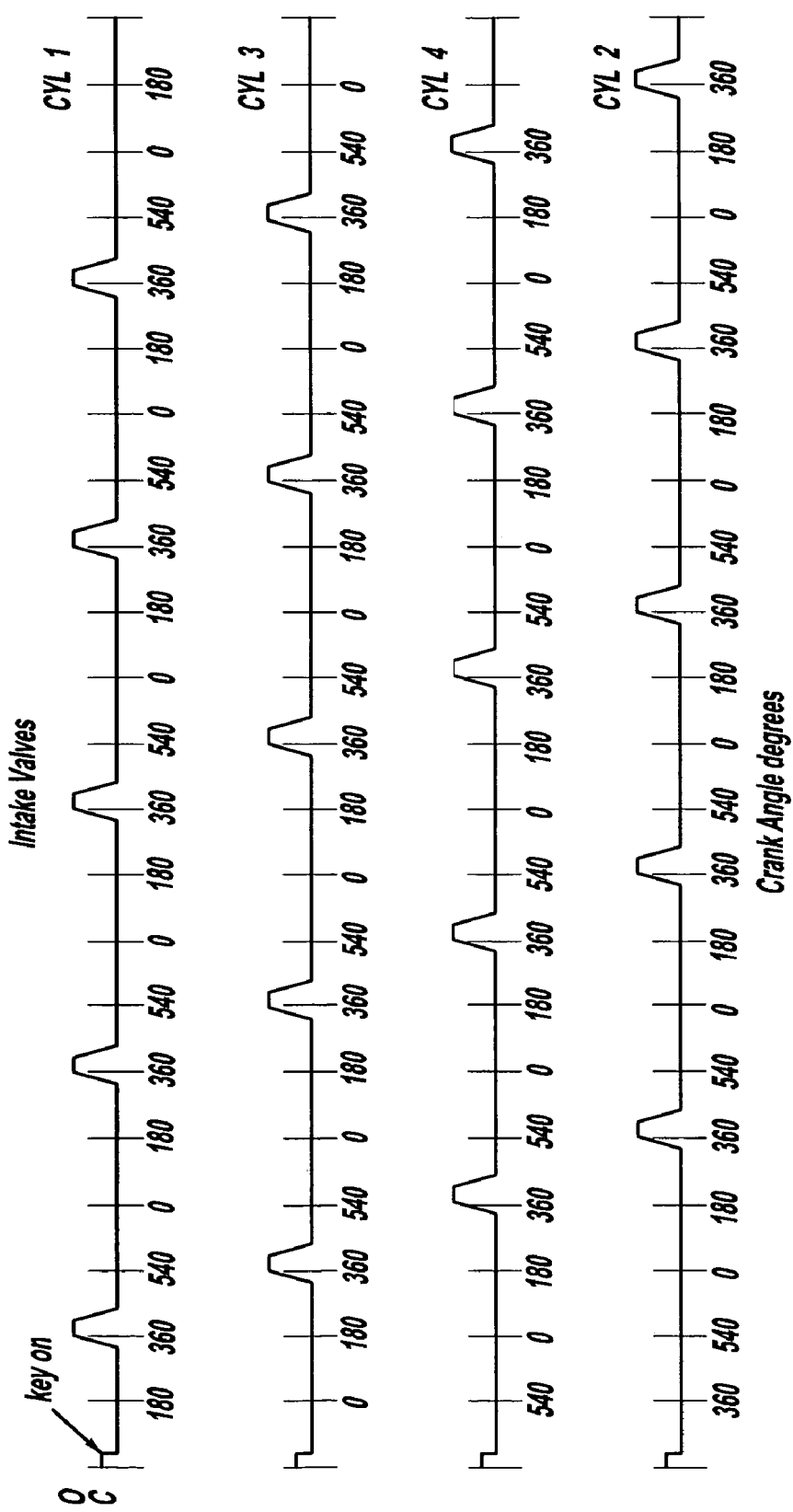

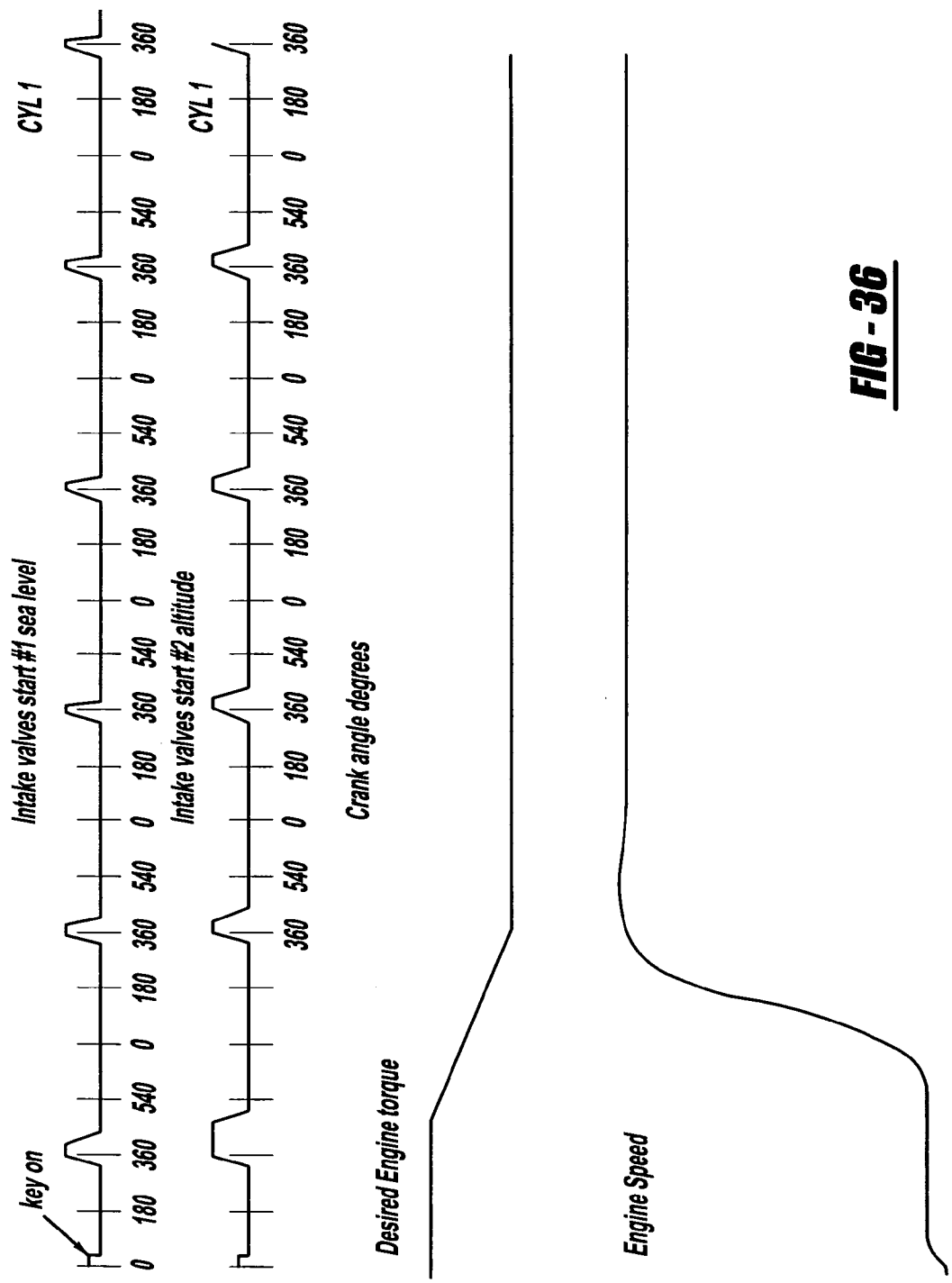

CYLINDER AND VALVE MODE CONTROL FOR AN ENGINE WITH VALVES THAT MAY BE DEACTIVATED

CROSS-REFERENCE TO RELATED APPLICATIONS

This present application is a divisional of U.S. patent application Ser. No. 10/805,611, filed on Mar. 19, 2004 and is hereby incorporated by reference in its entirety for all purposes.

FIELD

The present description relates to a method for controlling valves and cylinders in an internal combustion engine and more particularly to a method for controlling valves that may be deactivated.

BACKGROUND

The inventors herein have recognized that valves that may be deactivated, including electromagnetically actuated valves, present an opportunity to improve fuel economy and vehicle emissions by presenting valve control options that have not been previously available. However, since the valves may be individually controlled, configured in various patterns, and employed in various numbers per cylinder, the control possibilities and permutations seem nearly endless.

One method to control intake and exhaust valve operation during engine operation is described in U.S. Pat. No. 6,374,813. This method presents a means to control electromagnetically actuated valves to promote EGR control. The approach selects different valve modes and patterns to regulate internal EGR, i.e., EGR flow through a cylinder as opposed to EGR routed to the intake manifold. Valves are operated independently and control is based on operating conditions of the engine. Further, the disclosure also describes several valve configurations that may be operated in one or more operational modes to promote cylinder air charge swirl.

The above-mentioned method also can have several disadvantages. Namely, the approach selects valve mode based simply on engine speed, load, and desired EGR. The approach does not consider many other constraints that can affect valve mode selection. Further, the approach does not address valve selection in alternate cylinder modes, i.e., six-stroke, twelve-stroke, or cylinder deactivation. In addition, even if one of ordinary skill in the art attempted to extend the method to include additional modes, complexity would increase dramatically using the prior art approach.

SUMMARY

One embodiment includes a control method for selecting cylinder and valve actuation modes in an engine having at least a valve that may be deactivated, the method comprising:

generating a set of available cylinder and valve modes; removing cylinder and valve modes from said available set of cylinder and valve modes, based on a group of operating conditions; determining a cylinder and a valve mode, from remaining active cylinder and valve modes, based on a second group of operating conditions. This method can be used to reduce the above-mentioned limitations of the prior art approaches.

By generating a group of available cylinder and valve modes, and then removing modes based on a group of operating conditions, the inventors herein have reduced control complexity necessary to select cylinder and valve modes in an internal combustion engine with electromagnetic valves while also providing a wide variety of available modes.

Also, in one example, available modes are grouped into a matrix, array, or structure to provide an efficient organization that can be easily queried to determine operational status. Thus, the method can provide a simple way to track how the mode selection is determined.

Additionally, in another example, valve and cylinder mode selection criteria can be logically grouped in function specific tasks to further reduce complexity. For example, the desired engine torque and emissions objectives can be grouped as separate tasks. This can reduce calibration complexity and may reduce calibration time.

Still other advantages may be obtained, such as the ability to select cylinder and valve modes from a large group of available modes. This allows an engine controller to better match the engine performance and emissions to engine operating constraints. For example, for an engine operating at part load, fuel economy may be improved by reducing the number of active cylinders. Further fuel economy improvements or emissions reductions may be possible by selecting a specific valve pattern.

Yet another potential advantage is simplification of control logic. In one example, by grouping available cylinder and valve modes together in a unified structure disjointed mode selection decisions are reduced. Mode logic decisions are made within a single well-defined structure, e.g., a matrix or vector, as opposed to a scattered set of combinational logic or Boolean operations. Further, the available modes are organized in a preferential manner that minimizes search time for the final valve and cylinder modes.

The above advantages and other advantages, objects and features will be readily apparent from the following detailed description of the embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 11 is an example of an initialized cylinder and valve mode matrix;

FIG. 12 is an example of a mode matrix that has been through a cylinder and valve mode selection method;

FIG. 19 is a valve timing sequence for a cylinder operating in an alternating intake valve mode;

FIG. 20 is a valve timing sequence for a cylinder operating with phased intake valves;

FIGS. 21 and 21a are mechanical/electromechanical valve and cylinder grouped configuration;

FIG. 32 is a flowchart of a routine of a method to control electromechanical valves during a start of an engine;

FIG. 33$b$ is a plot that shows representative exhaust valve timing at a relatively constant desired torque;

FIG. 34$b$ is a plot that shows representative intake valve timing for the second of two different engine starts;

FIG. 35$b$ is a plot of representative intake valve timing during starts at altitude by the method of FIG. 32;

FIG. 36 is a representative plot of intake valve timing, desired engine torque, and engine speed during a start of an engine by the method of FIG. 32;

FIG. 49$b$ is a plot of example exhaust valve events over a crankshaft angle interval during start;

FIG. 50$b$ is a plot of example exhaust valve events over a crankshaft angle interval during start;

FIG. 51$b$ is a plot of example exhaust valve events over a crankshaft angle interval during start;

FIG. 52$b$ is a plot of example exhaust valve events over a crankshaft angle interval during start;

FIG. 53$b$ is a plot of example exhaust valve events over a crankshaft angle interval during start;

DETAILED DESCRIPTION

Figure 1:
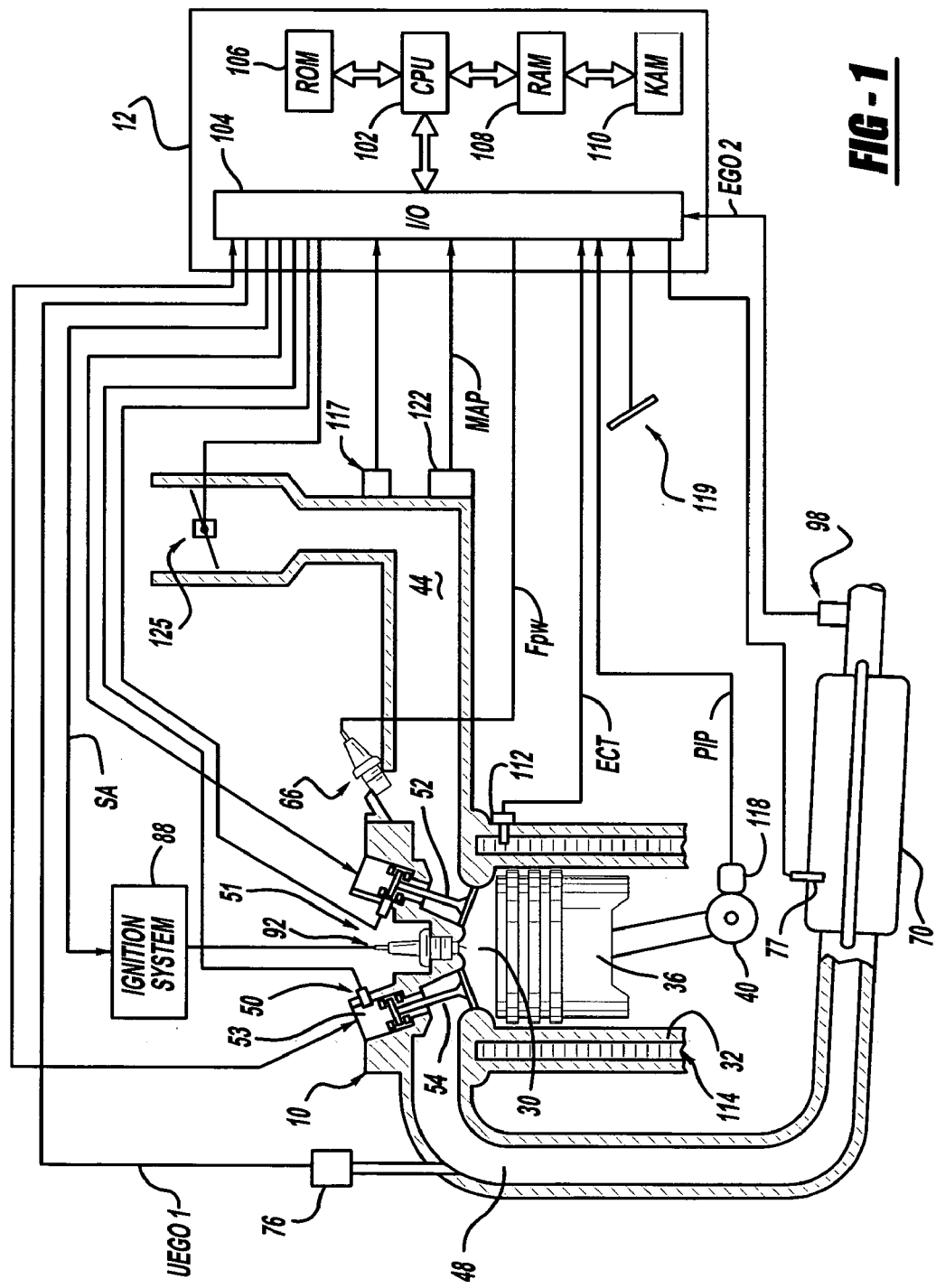
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valves actuators for valves 52 and 54 has a position sensor and a temperature sensor.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber.

Figure 2:
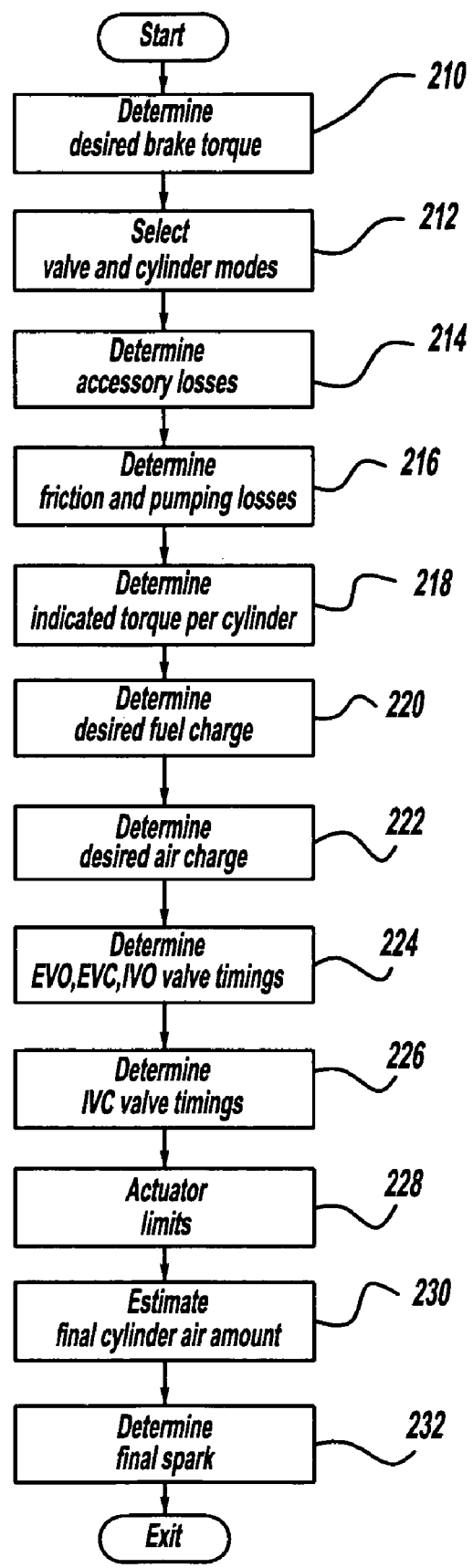
FIG. 2 is a flowchart of a method to determine engine torque and delivery.

Referring to FIG. 2, a high level flowchart of a routine that shows engine torque calculations from desired engine brake torque through engine output torque is shown.

As illustrated below, determination of engine torque loss for an engine capable of cylinder deactivation and multi-stroke operation can be improved by determining cylinder losses in both active and inactive cylinders. Typically, in conventional four-stroke engines, engine indicated torque is calculated from engine friction losses, engine pumping losses, and engine brake torque. However, when a cylinder is deactivated, friction and pumping losses of the cylinder change. Therefore, a better estimation of total torque losses may be possible by using both active an inactive friction and pumping losses, as described by FIG. 2.

Furthermore, by controlling torque in individual cylinders, transitions from a number of active cylinders to another number of active cylinders may be improved by the method of FIG. 2. For example, controlling torque in individual cylinders may allow individual cylinder torque amounts to smooth the transition from an eight-cylinder mode to a four-cylinder mode. Torque in individual cylinders may be ramped, stepped, and/or follow a predetermined trajectory during a cylinder and/or valve mode change to reduce torque disturbances. In contrast, controlling torque based on the number of active cylinders may result in a torque disturbance as the number of active cylinders changes from one engine revolution to the next.

In addition, an engine operating at altitude may have different losses due to the operating environment. Namely, the pressure differential across the combustion chamber may be altered, when compared to sea level operation, so that the pumping efficiency may affect the engine torque production. By controlling and estimating engine torque in individual cylinders (including inactive cylinders), errors introduced by a change in altitude and/or air temperature may be reduced using the method of FIG. 2.

Also, cylinder stroke changes in multi-stroke operation, e.g., twelve-stroke to four-stroke, can be improved. The method of FIG. 2 may allow four-stroke operation to be resumed by simply eliminating any benign pumping strokes and resuming a predetermined firing order after a combustion event in the multi-stroke cylinder, for example, since both inactive and active cylinder torque losses are considered. In contrast, other methods may require cylinders to complete the current cylinder cycle.

In step 210, desired engine brake torque is determined. In one example, driver demand engine brake torque is input into engine controller via position sensor 119, FIG. 1, and can be further adjusted based on vehicle speed, engine speed, and/or gear ratio, for example. The signal can represent a fraction of the available engine torque at the current engine speed. For example, at an engine speed where an engine has a capacity of 300 N-M and a driver input is fifty percent of sensor range, the desired engine brake torque can be interpreted as 150 N-M. Alternatively, the driver demand can be determined from a cruise control system or a traction control system for reducing wheel slip. After desired engine brake torque is determined, the routine proceeds to step 212.

In step 212, engine cylinder and valve modes are selected. In one example, an appropriate cylinder and valve mode is selected based on the desired engine brake torque, and other engine operating conditions and vehicle operating conditions. A detailed description of an example mode selection process is discussed in the description of FIG. 10. The cylinder mode can indicate cylinder operation and/or valve configuration. For example, cylinder modes may include, but are not limited to, V8, V6, V4, V2, I6, I5, I4, I3, I2, four-stroke, six-stroke, and twelve-stroke. Valve modes indicate valve operation and/or configuration in an active or inactive cylinder. For example, valve modes may include, but are not limited to, dual intake/dual exhaust (operating two intake valves and two exhaust valves during a combustion cycle of the engine, whether it is 4, 6, or 12 stroke), dual intake/single exhaust (operating two intake valves and one exhaust valve during a combustion cycle of the engine, whether it is 4, 6, or 12 stroke), single intake/dual exhaust (operating a single intake valve and two exhaust valves during a combustion cycle of the engine, whether it is 4, 6, or 12 stroke), single intake/single exhaust (operating a single intake valve and a single exhaust valve during a combustion cycle of the engine, whether it is 4, 6, or 12 stroke), alternating intake/dual exhaust (operating two intake valves during alternate cycles of a cylinder while operating two exhaust valves, whether it is 4, 6, or 12 stroke), dual intake/alternating exhaust (operating two intake valves while operating two exhaust valves during alternate cycles of a cylinder, whether it is 4, 6, or 12 stroke), alternating intake/alternating exhaust (operating two intake valves during alternate cycles of a cylinder while operating two exhaust valves during alternate cycles of an cylinder, whether it is 4, 6, or 12 stroke), single intake/alternating exhaust (operating as single intake valve while operating two exhaust valves during alternate cycles of an cylinder, whether it is 4, 6, or 12 stroke), and alternating intake/single exhaust (operating two intake valves during alternate cycles of a cylinder while operating a single exhaust valve, whether it is 4, 6, or 12 stroke). Some example unique valve and cylinder modes are detailed in the description of FIGS. 21–27. Further, the alternative valve modes are described in more detail with regard to FIGS. 44–48. As described herein, the engine can be controlled so that any (or all) or groups of the cylinders are operated between variations of the above modes. After the cylinder and valve modes have been selected, the routine proceeds to step 214.

In step 214, engine accessory losses are determined. Typical accessory losses include, but are not limited to, air conditioning, alternator/generator, power steering pumps, water pump, and/or vacuum pumps and combinations thereof. A total accessory loss amount can be determined by collectively summing individual accessory loss amounts that are stored in tables or functions and are indexed by one or more variables. For example, power steering pump losses can be determined from a table that is indexed by ambient air temperature and steering angle input.

Furthermore, torque loss due to power conversion and electrical valve operation can be determined by indexing an array containing torque losses that result from electromechanical valve operation based on engine speed, load and valve mode. The routine then continues on to step 216.

In step 216, engine friction and pumping losses are determined. In one example, the routine determines individual cylinder losses based on the number of active and inactive cylinders, by looking up stored polynomial coefficients that are based on engine operating conditions. Coefficients are determined by analyzing cylinder pressure-volume (P-V) diagrams collected at various engine speed/load conditions. Active and inactive cylinder pressure data are collected, and then data are regressed to determine polynomial coefficients for active and inactive cylinders.

Figure 3:
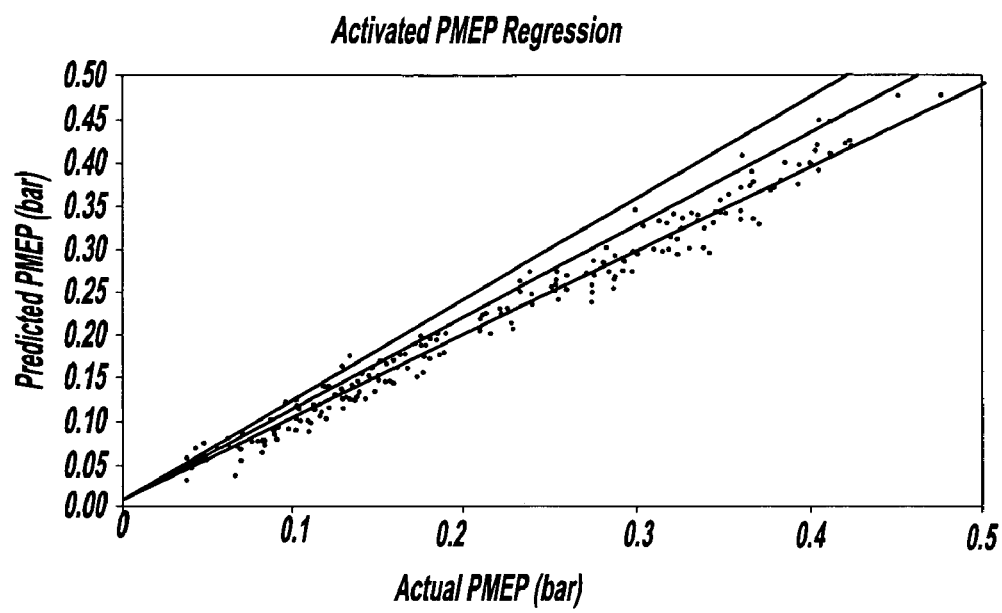
FIG. 3 is a plot of actual PMEP vs. predicted PMEP for active cylinders, determined from a polynomial with regressed coefficients.
Figure 4:
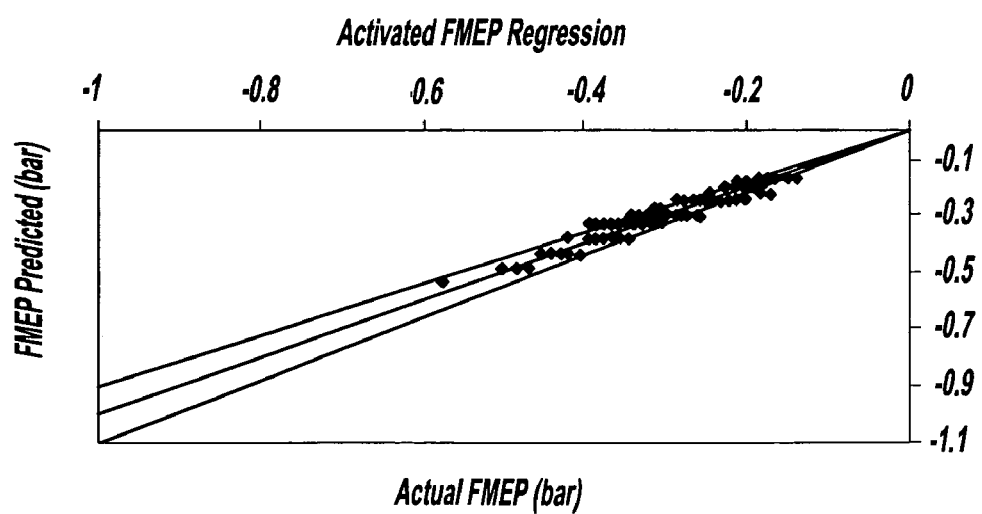
FIG. 4 is a plot of actual FMEP vs. predicted FMEP for active cylinders, determined from a polynomial with regressed coefficients.

FIGS. 3 and 4 show example regression fit data for cylinder pumping and friction losses of an active cylinder. The data are based on the following regression equations A and B:

$$PMEP_{Act}=C_0+C_1 \cdot V_{IVO}+C_2 \cdot V_{EVC}+C_3 \cdot V_{IVC\text{-}IVO}+C_4 \cdot N \quad \text{Equation A:}$$

Where $PMEP_{Act}$ is pumping mean effective pressure, $C_0$–$C_4$ are stored, predetermined, polynomial coefficients, $V_{IVO}$ is cylinder volume at intake valve opening position, $V_{EVC}$ is cylinder volume at exhaust valve closing position, $V_{IVC}$ is cylinder volume at intake valve closing position, $V_{IVO}$ is cylinder intake valve opening position, and N is engine speed. Valve timing locations IVO and IVC are based on the last set of determined valve timings.

$$FMEP_{Act}=C_0+C_1 \cdot N+C_2 \cdot N^2 \quad \text{Equation B:}$$

Where $FMEP_{Act}$ is friction mean effective pressure, $C_0$–$C_2$ stored, predetermined polynomial coefficients, and N is engine speed.

Figure 5:
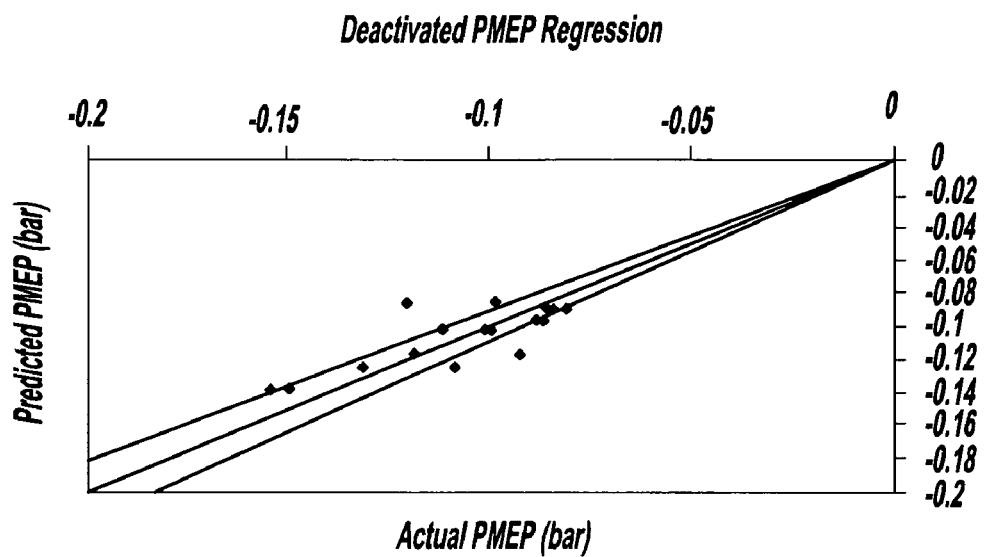
FIG. 5 is a plot of actual PMEP vs. predicted PMEP for inactive cylinders, determined from a polynomial with regressed coefficients.
Figure 6:
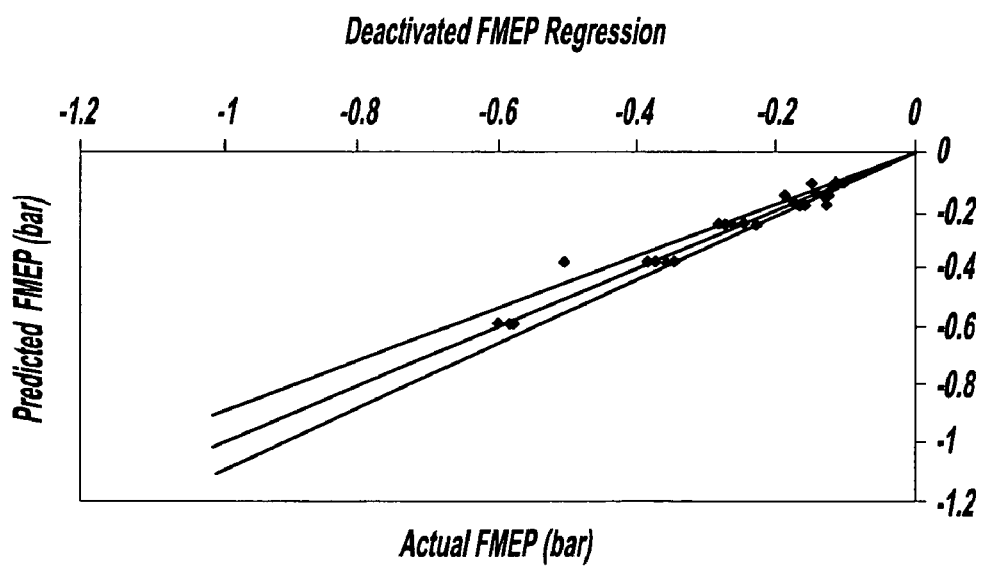
FIG. 6 is a plot of actual FMEP vs. predicted FMEP for inactive cylinders, determined from a polynomial with regressed coefficients.

FIGS. 5 and 6 show example regression fit data for cylinder pumping and friction losses of a deactivated cylinder. Data are based on the following regression equations C and D:

$$PMEP_{Deact}=C_0=C_1 \cdot N+C_2 N^2 \quad \text{Equation C:}$$

Where $PMEP_{Deact}$ is friction mean effective pressure, $C_0$–$C_2$ are stored, predetermined polynomial coefficients, and N is engine speed.

$$FMEP_{Deact}=C_0=C_1 \cdot N+C_2 \cdot N^2 \quad \text{Equation D:}$$

Where $FMEP_{Deact}$ is friction mean effective pressure, $C_0$–$C_2$ are stored, predetermined polynomial coefficients, and N is engine speed.

The following describes further exemplary details for the regression and interpolation schemes. One dimensional functions are used to store friction and pumping polynomial coefficients for active and inactive cylinders. The data taken to determine the coefficients are collected at a sufficient number of engine speed points to provide the desired torque loss accuracy. Coefficients are interpolated between locations where no data exists. For example, data is collected and coefficients are determined for an engine at engine speeds of 600, 1000, 2000, and 3000 RPM. If the engine is then operated at 1500 RPM, coefficients from 1000 and 2000 RPM are interpolated to determine the coefficients for 1500 RPM. Total friction losses are then determined by at least one of the following equations:

$$FMEP_{total} = \frac{[Numcyl_{Act} \cdot FMEP_{Act} + Numcyl_{Dact} \cdot FMEP_{Dact}(t_{deact})]}{Numcyl_{total}}$$

or $$FMEP_{total}=Modfact \cdot FMEP_{Act}+(1-Modfact) \cdot FMEP_{Deact}$$

Where $Numcyl_{Act}$ is the number of active cylinders, $Numcyl_{Dact}$ is the number of deactivated cylinders, Modfact is the ratio of the number of active cylinders to total number of cylinders, and $FMEP_{total}$ is the total friction mean effective pressure. Total pumping losses are then determined by one of the following equations:

$$PMEP_{total} = \frac{[Numcyl_{Act} * PMEP_{Act} + Numcyl_{Dactt} * PMEP_{Dact}(t_{deact})]}{Numcyl_{total}}$$

or $$PMEP_{total}=Modfact \cdot PMEP_{Act}+(1-Modfact) \cdot PMEP_{Deact}$$

Where $Numcyl_{Act}$ is the number of active cylinders, $Numcyl_{Dact}$ is the number of deactivated cylinders, Modfact is the ratio of the number of active cylinders to total number of cylinders, and $PMEP_{total}$ is the total pumping mean effective pressure. Additional or fewer polynomial terms may be used in the regressions for $PMEP_{Act}$, $PMEP_{Deact}$, $FMEP_{Act}$, and $FMEP_{Deact}$ based on the desired curve fit and strategy complexity.

The losses based on pressure are then transformed into torque by the following equations:

$$\Gamma_{\text{friction\_total}} = FMEP_{total} \cdot \frac{V_D}{4\cdot\pi} \cdot \frac{N/m^2}{(1\cdot 10^{-5} bar)}$$

$$\Gamma_{\text{pumping\_total}} = PMEP_{total} \cdot \frac{V_D}{4\cdot\pi} \cdot \frac{N/m^2}{(1\cdot 10^{-5} bar)}$$

Where $V_D$ is the displacement volume of active cylinders.

Figure 7:
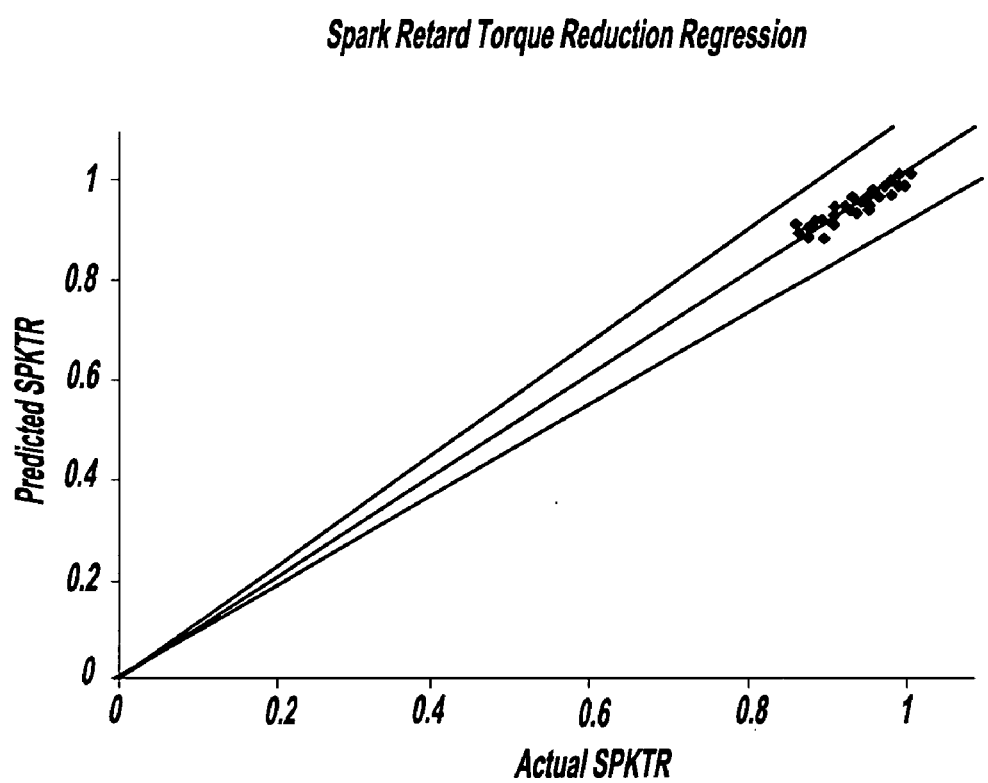
FIG. 7 is a plot of actual spark torque reduction vs. predicted spark torque reduction determined from a polynomial with regressed coefficients.

In step 218, indicated mean effective pressure (IMEP) for each cylinder is determined, for example via the equation:

$$IMEP_{cyl}(bar) = \left(\frac{\Gamma_{brake} - (\Gamma_{\text{friction\_total}} + \Gamma_{\text{pumping\_total}} + \Gamma_{\text{accessories\_total}})}{\text{Num\_cyl}_{Act}}\right) *$$
$$\frac{4\pi}{V_D} * \frac{(1*10^{-5}bar)}{N/m^2} \cdot SPKTR$$

Where $\text{Num\_cyl}_{Act}$ is the number of active cylinders determined in step 212, $V_D$ is the displacement volume of active cylinders, SPKTR is a torque ratio based on spark angle retarded from minimum best torque (MBT), i.e., the minimum amount of spark angle advance that produces the best torque amount. Additional or fewer polynomial terms may be used in the regression based on the desired curve fit and strategy complexity. Alternatively, different estimation formats can also be used. The term SPKTR is based on the equation:

$$SPKTR = \frac{\Gamma_{\Delta SPK}}{\Gamma_{MBT}}$$

Where $\Gamma_{\Delta SPK}$ is the torque at a spark angle retarded from minimum spark for best torque (MBT), and $\Gamma_{MBT}$ is the torque at MBT. In one example, the actual value of SPKTR is determined from a regression based on the equation:

$$SPKTR = C_0 + C_1 * \Delta_{spark}^2 + C_2 * \Delta_{spark}^2 * N + C_3 * \Delta_{spark}^2 * IMEP_{MBT}$$

Where $C_0$–$C_3$ are stored, predetermined, regressed polynomial coefficients, N is engine speed, and $IMEP_{MBT}$ is IMEP at MBT spark timing. The value of SPKTR can range from 0 to 1 depending on the spark retard from MBT. The correlation between estimated and actual spark torque ratio is shown in FIG. 7. The routine then proceeds to step 220.

Figure 8:
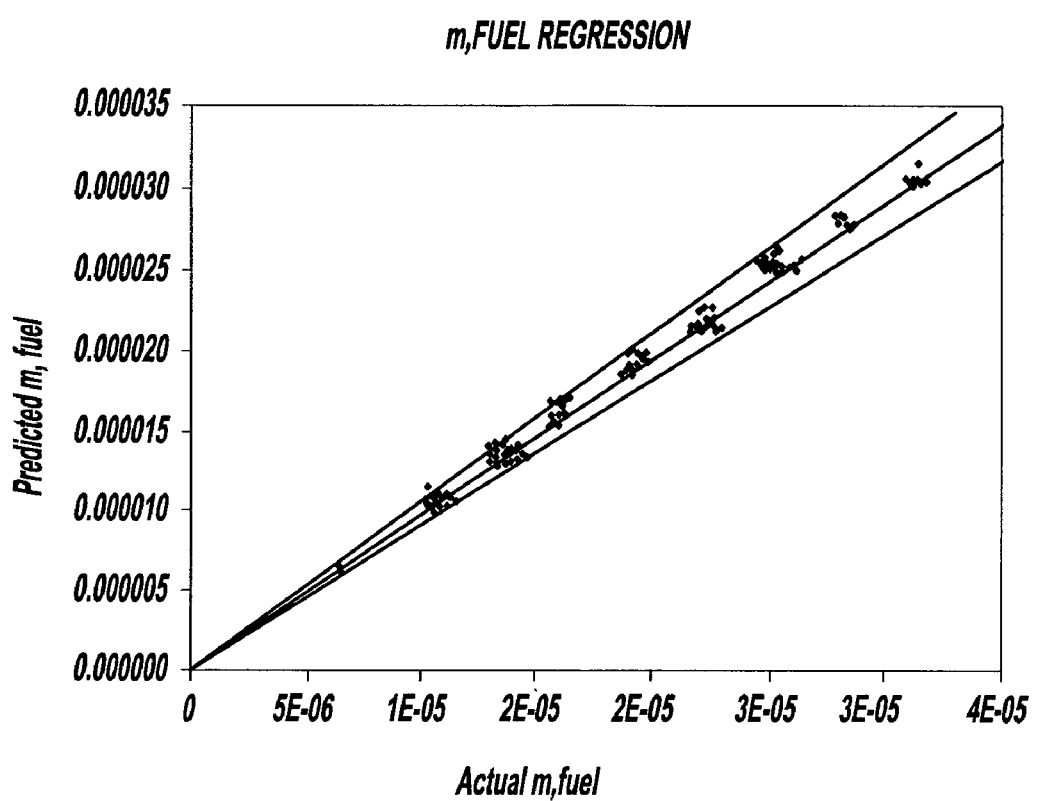
FIG. 8 is a plot of actual fuel mass vs. predicted fuel mass determined from a polynomial with regressed coefficients.

In step 220, individual cylinder fuel charges are determined. An individual cylinder fuel mass is determined, in one example, for each cylinder by the following equation:

$$M_f = C_0 + C_1*N + C_2*AFR + C_3*AFR^2 + C_4*IMEP + C_5*IMEP^2 + C_6*IMEP*N$$

Where $M_f$ is mass of fuel, $C_0$–$C_6$ are stored, predetermined, regressed polynomial coefficients, N is engine speed, AFR is the air-fuel ratio, and IMEP is indicated mean effective pressure. The correlation between estimated and actual fuel mass is shown in FIG. 8. As indicated previously, additional or fewer polynomial terms may be used in the regression based on the desired curve fit and strategy complexity. For example, polynomial terms for engine temperature, air charge temperature, and altitude might also be included. The routine then proceeds to step 222.

In step 222, a desired air charge is determined from the desired fuel charge. In one example, a predetermined air-fuel mixture (based on engine speed, temperature, and load), with or without exhaust gas sensor feedback, determines a desired air-fuel ratio. The determined fuel mass from step 220 is multiplied by the predetermined desired air-fuel ratio to determine a desired cylinder air amount. The desired mass of air is determined from the equation:

$$M_a = M_f AFR$$

Where $M_a$ is the desired mass of air entering a cylinder, $M_f$ is the desired mass of fuel entering a cylinder, and AFR is the desired air-fuel ratio. The routine then proceeds to step 224.

In step 224, exhaust valve opening (EVO), intake valve opening (IVO), and exhaust valve closing (EVC) timing are determined from center point of overlap and desired overlap. Center point of intake and exhaust valve overlap is a reference point, in crank angle degrees, from where IVO and EVC are determined. Overlap is the duration, in degrees, that intake valves and exhaust valves are simultaneously open. IVO and EVC are determined by the following equations:

$$IVO = CPO - \frac{OL}{2}$$

$$EVC = CPO + \frac{OL}{2}$$

Where CPO is center point of overlap and OL is overlap. The location of CPO and OL are predetermined and stored in a table that is indexed by engine speed and air mass entering a cylinder. The amount of overlap and the center point of overlap are selected based on desired exhaust residuals and engine emissions.

Exhaust valve opening (EVO) is also determined from a table indexed by engine speed and air mass entering a cylinder. The predetermined valve opening positions are empirically determined and are based on a balancing engine blow down, i.e., exhaust gas evacuation, and lowering expansion losses. Further, the valve timings may be adjusted based on engine coolant or catalyst temperature. The routine then proceeds to step 226.

In step 226, intake valve closing is determined. Since EVO, EVC, and IVO are scheduled in one example, i.e., predefined looked-up locations, intake valve closing (IVC) is determined based on these predetermined locations and the desired mass of air entering a cylinder, from step 222. The desired mass of air entering a cylinder is translated into a cylinder volume by the ideal gas law:

$$V_a = \frac{M_a \cdot R \cdot T}{P}$$

Where $V_a$ is the volume of air in a cylinder, $M_a$ is a desired amount of air entering a cylinder, from step 222, R is a ideal gas constant, T is the intake manifold temperature, and P is the intake manifold pressure. By using the ideal gas law, individual cylinder volumes be adjusted to provide the desired cylinder air amount at altitude. Furthermore, an altitude factor may be added to regression equations to provide additional altitude compensation.

From the determined cylinder volume $V_a$, a model-based regression determines a relationship between a volume of air in a cylinder and intake valve closing volume (IVC) from the equation:

$$V_a = C_0 + C_1 * (V_{IVC} - V_{Res|Ti}) + C_2 * dV_{Res} + C_3 * \left(\frac{N}{1000}\right) * (V_{IVC} - V_{Res|Ti}) + C_4 * \left(\frac{N}{1000}\right) * dV_{Res} + C_5 * \left(\frac{T_i}{T_e}\right) * (V_{IVC} - V_{Res|Ti})$$

Where $V_a$ is the volume of air inducted into the cylinder, $C_0$–$C_5$ are stored, predetermined, regressed polynomial coefficients, $V_{IVC}$ is cylinder volume at intake valve closed, $V_{RES|Ti}$ is the residual volume evaluated at the cylinder inlet temperature, $dV_{res}$ is a residual pushback volume, i.e., the volume of exhaust residuals entering the intake manifold, N is engine speed, $T_i$ is intake manifold temperature, and $T_e$ is exhaust manifold temperature. Additional or fewer polynomial terms may be used in the regression based on the desired curve fit and strategy complexity. The unknown value of $V_{IVC}$ is solved from the above-mentioned regression to yield:

$$V_{IVC} = V_{Res|Ti} + \frac{\left(V_a - C_0\left(C_2 + C_4 \cdot \frac{N}{1000}\right) \cdot dV_{Res}\right)}{C_1 + C_3 \cdot \frac{N}{1000} + C_5 \cdot \left(\frac{T_i}{T_e}\right)}$$

The solution of $V_{IVC}$ is further supported by the following equations derived from cylinder residual estimation:

$$V_{Res} = V_{EVC} + \frac{(V_{IVO} - V_{EVC})}{\left[1 - \left(\frac{V_E}{V_I}\right) \cdot \left(\frac{A_E}{A_I}\right)\right]}$$

$$dV_{Res} = V_{Res} - V_{TDC}$$

$$V_{Res|Ti} = V_{Res} \cdot \left(\frac{T_i}{T_e}\right)$$

$$\frac{V_E}{V_I} = \sqrt{\frac{P_m + 1}{2}}$$

$$V_{TDC} = \frac{V_{Dcyl}}{(CR - 1)}$$

$$V(x) = \pi \cdot r^2 \cdot \left(L + \frac{s}{2} - \frac{s}{2} \cdot \cos(\Theta) - \sqrt{L^2 - \left(\frac{s}{2} \cdot \sin(\Theta)\right)}\right)$$

Where $V(x)$ is the cylinder volume at crank angle $\Theta$ relative to top dead center of the respective cylinder, L is the length of a connecting rod, s/2 is the crank shaft offset where the connecting rod attaches to the crankshaft, relative to the centerline of the crank shaft, r is the cylinder radius, CR is the cylinder compression ratio, $V_{Dcyl}$ is cylinder displacement volume, $V_{TDC}$ is cylinder volume at top dead center, $V_E/V_I$ is the air velocity ratio across exhaust and intake valves, $A_E/A_I$ is the area ratio across exhaust and intake valves, $V_{Res}$ is the residual cylinder volume, $V_{IVO}$ is cylinder volume at intake valve opening, $V_{EVC}$ is cylinder volume at exhaust valve closing, and $V_{TDC}$ is cylinder volume at top dead center. Thus, cylinder volumes $V_{EVC}$ and $V_{IVO}$ are determined by solving for $V(x)$ at the respective EVC and IVO crank angles.

Note that this is one example approach for setting valve timing and overlap. An alternative approach could interrogate a series of predetermined tables and/or functions based on driver demand, engine speed, and engine temperature to determine intake and exhaust valve timing. The routine then proceeds to step 228.

In step 228, valve timings associated with IVO, IVC, EVO, and EVC are compared against valve constraints. For example, the determined valve timings are compared to a limited valve opening duration, i.e., valve timing below a specified duration is avoided to improve valve-opening consistency. If the determined valve timing is below a specified threshold the valve timings are increased to a predetermined duration. If determined valve timings are above the specified threshold no valve timing adjustments are made. Further, there may be other valve constraints, such as a maximum opening duration, which can be considered. The routine then continues to step 230.

Figure 9:
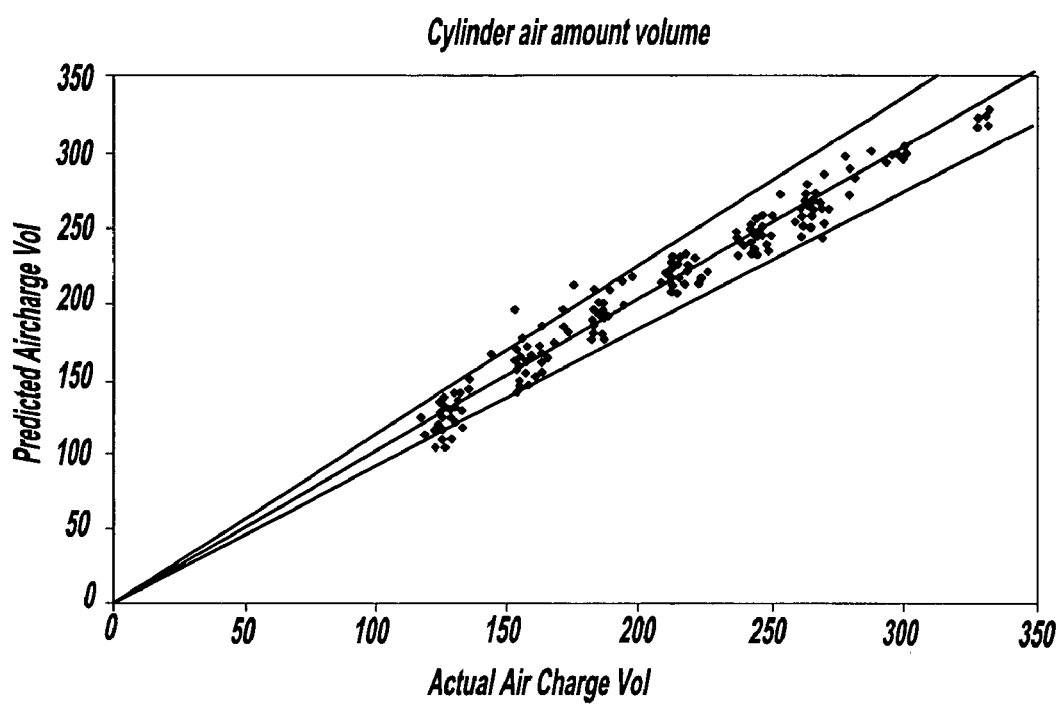
FIG. 9 is a plot of actual cylinder air charge volume vs. predicted cylinder air charge volume determined from a polynomial with regressed coefficients.

In step 230, final cylinder air amount is determined. This step can be performed to account for any adjustments in cylinder air amount resulting from valve timing adjustment in step 228. In one example, cylinder inducted air amount is determined from the valve timings of step 228 and the equation:

$$V_{adjusta} = C_0 + C_1 * (V_{IVC} - V_{Res|Ti}) + C_2 * dV_{Res} + C_3 * \left(\frac{N}{1000}\right) * (V_{IVC} - V_{Res|Ti}) + C_4 * \left(\frac{N}{1000}\right) * dV_{Res} + C_5 * \left(\frac{T_i}{T_e}\right) * (V_{IVC} - V_{Res|Ti})$$

Where $V_a$ is determined from the same equation as in step 226, but that uses revised valve timings. The correlation between estimated and actual cylinder air charge volume is shown in FIG. 9. Additional or fewer polynomial terms may be used in the regression based on the desired curve fit and strategy complexity. Cylinder air mass is then determined from:

$$M_{aadjust} = \rho_{intake} V_a$$

Where $M_{aadjust}$ is mass of air entering a cylinder, $\rho$ is density of air in the intake manifold determined from the ideal gas law, and $V_a$ is a volume of air inducted into the cylinder. The desired mass of fuel entering a cylinder is then determined from the equation:

$$M_{fadjust} = \frac{M_{aadjust}}{AFR}$$

Where $M_{aadjust}$ is the desired mass of air entering a cylinder, $M_{fadjust}$ is the desired mass of fuel entering a cylinder, and AFR is the desired air-fuel ratio. Further, the desired mass of fuel can be adjusted here for lost fuel, unaccounted fuel that passes cylinder rings or attaches to intake port walls, or for cylinder enleanment or enrichment based on cylinder and valve mode, or based on catalyst conditions. Lost fuel is preferably based on a number of fueled cylinder events.

In step 232, the spark angle delivered to a cylinder is determined. In one example, the final spark angle is based on MBT spark timing, but is adjusted to deliver the desired IMEP. From the above mentioned IMEP equation, desired air-fuel ratio, $M_{fadjust}$, engine speed, and IMEP adjusted for revised valve timings is determined. The adjusted IMEP is then divided by the IMEP amount determined in step 218 to produce a ratio of IMEP. This ratio is then substituted into the spark torque ratio regression equation of step 218 and solved for the final spark angle. In one example, MBT spark timing is determined by the equation:

$$SPK_{MBT} = C_0 + C_1 \cdot N + C_2 \cdot N^2 + C_3 \cdot N^3 + C_4 \cdot M_f + C_5 \cdot M_f^2 + C_6 \cdot FDR + C_7 \cdot FDR^2 + C_8 \cdot FDR^3$$

Where $C_0$–$C_8$ are stored, predetermined, regressed polynomial coefficients, N is engine speed, $M_f$ is mass of fuel injected into a cylinder, and FDR is fuel dilution ratio (mass of fuel)/(air mass amount+residual mass amount).

This example method of torque control permits individual cylinder valve timing and spark control in an engine capable of a variety of valve and cylinder modes without storing extensive engine maps within the torque control strategy.

Figure 10:
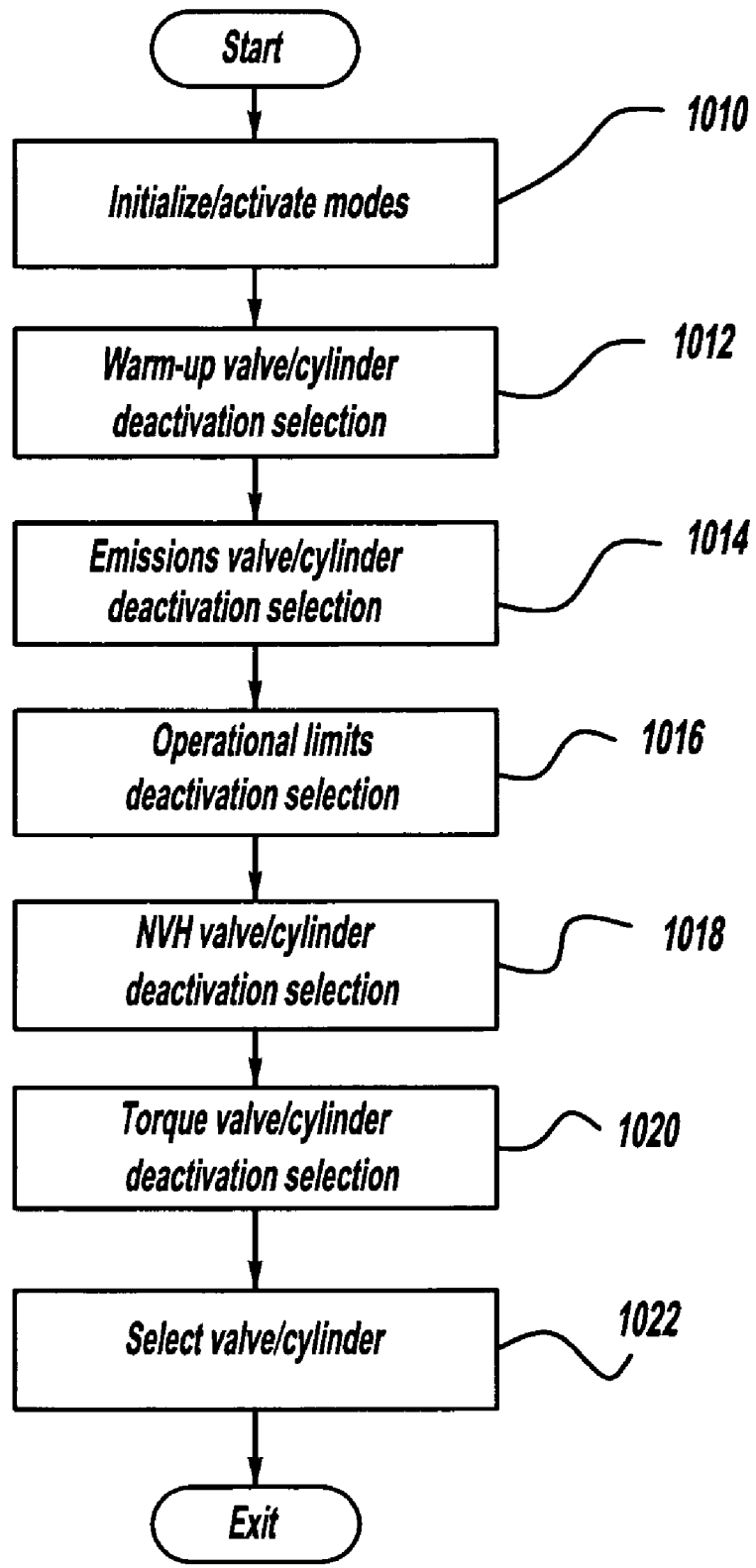
FIG. 10 is a flowchart to determine the number of active cylinders and valves in an engine with electromechanically actuated valves.

Referring to FIG. 10, a high level flowchart of cylinder and valve mode selection for an engine with electromechanically actuated valves is shown. Depending on mechanical complexity, cost, and performance objectives an engine can be configured with an array of electromechanical valve configurations. For example, if good performance and reduced cost are desired, a plausible valve configuration may include electromechanical intake valves and mechanically actuated exhaust valves. This configuration provides flexible cylinder air amount control while reducing the cost that is associated with higher voltage valve actuators that can overcome exhaust gas pressure. Another conceivable mechanical/electrical valve configuration is electromechanical intake valves and variable mechanically driven exhaust valves (mechanically driven exhaust valves that can be controlled to adjust valve opening and closing events relative to a crankshaft location). This configuration may improve low speed torque and increase fuel economy at reduced complexity when compared to a full electromechanically actuated valve train. On the other hand, electromechanical intake and exhaust valves can provide greater flexibility but at a potentially higher system cost.

However, unique control strategies for every conceivable valve system configuration could be expensive and could waste valuable human resources. Therefore, it is advantageous to have a strategy that can control a variety of valve system configurations in a flexible manner. FIG. 10 is an example cylinder and valve mode selection method that can reduce complexity and yet is capable of flexibly controlling a variety of different valve configurations with few modifications.

One example method described herein makes a set of cylinder and valve modes available each time the routine is executed. As the steps of the method are executed, different cylinder and valve modes may be removed from a set of available modes based on engine, valve, and vehicle operating conditions. However, the method may be reconfigured to initialize cylinder and valve modes in an unavailable state and then make desired cylinder and valve modes available as the different steps of the routine are executed. Thus, various options are available for the selection of an initialization state, order of execution, and activation and deactivation of available modes.

In step 1010, row and column cells of a matrix (mode matrix) representing valve and cylinder modes are initialized by inserting numerical 1's into all matrix row and column cells. An example mode matrix is shown in FIG. 11 for an eight cylinder engine having two banks of four-cylinders each in a V-type configuration. The mode matrix is a construct that holds binary ones or zeros in this example, although other constructs can be used. The matrix can represent cylinder and valve mode availability. In this example, the ones represent available modes while zeros represent unavailable modes.

The mode matrix is initialized each time the routine is called, thereby making all modes initially available. FIGS. 21–27 illustrate some potential valve and cylinder modes, and are described in more detail below. Although a matrix is shown, it is possible to substitute other structures such as words, bytes, or arrays in place of the matrix. Once the mode matrix is initialized the routine continues to step 1012.

Figure 13:
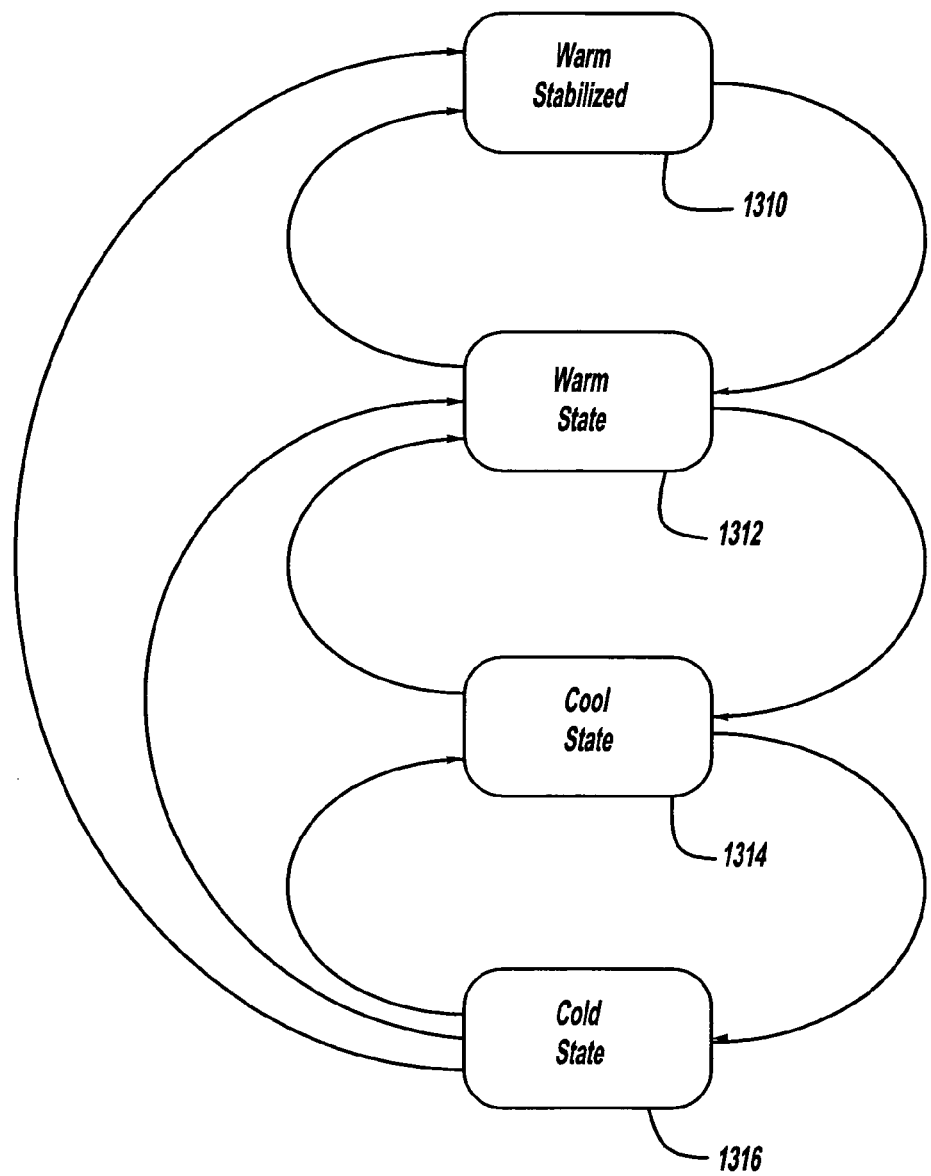
FIG. 13 is a diagram that shows engine warm-up states for cylinder and valve mode selection.

In step 1012, some valve and/or cylinder modes that are affected by engine warm-up conditions are deactivated from the mode matrix. In one example, warm-up valve and cylinder mode selection is based on engine operating conditions that determine an operating state of the engine. The description of FIG. 13 provides further details of warm-up valve and/or cylinder mode selection. The routine then proceeds to step 1014.

Figure 14:
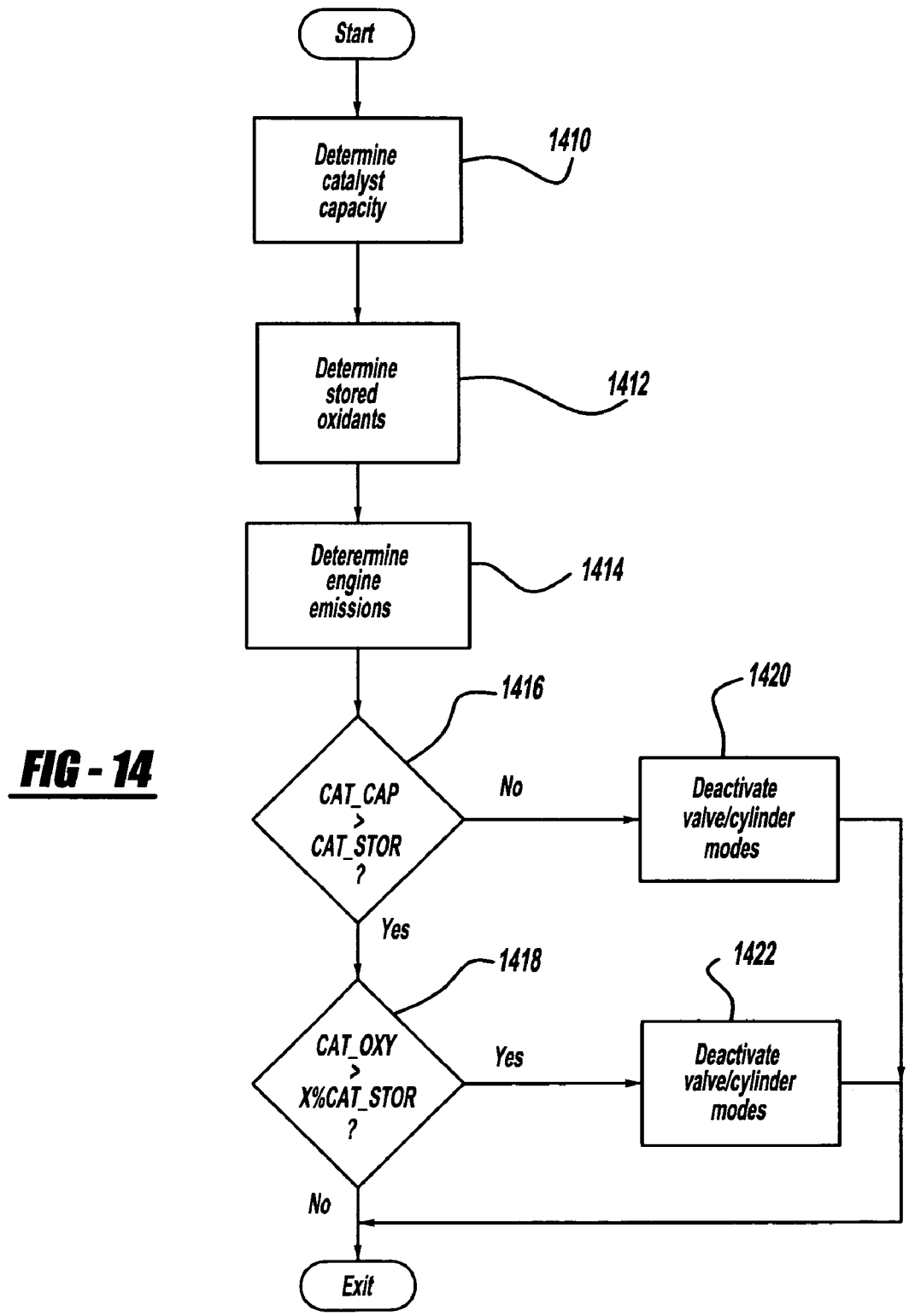
FIG. 14 is a flowchart of a routine to determine cylinder and valve modes based on the state of a catalyst.

In step 1014, some valve and/or cylinder modes that affect engine emissions or that are affected by emissions are deactivated. The description of FIG. 14 provides further details of cylinder and/or valve mode selection that is based on engine emissions. The routine then continues to step 1016.

Figure 15:
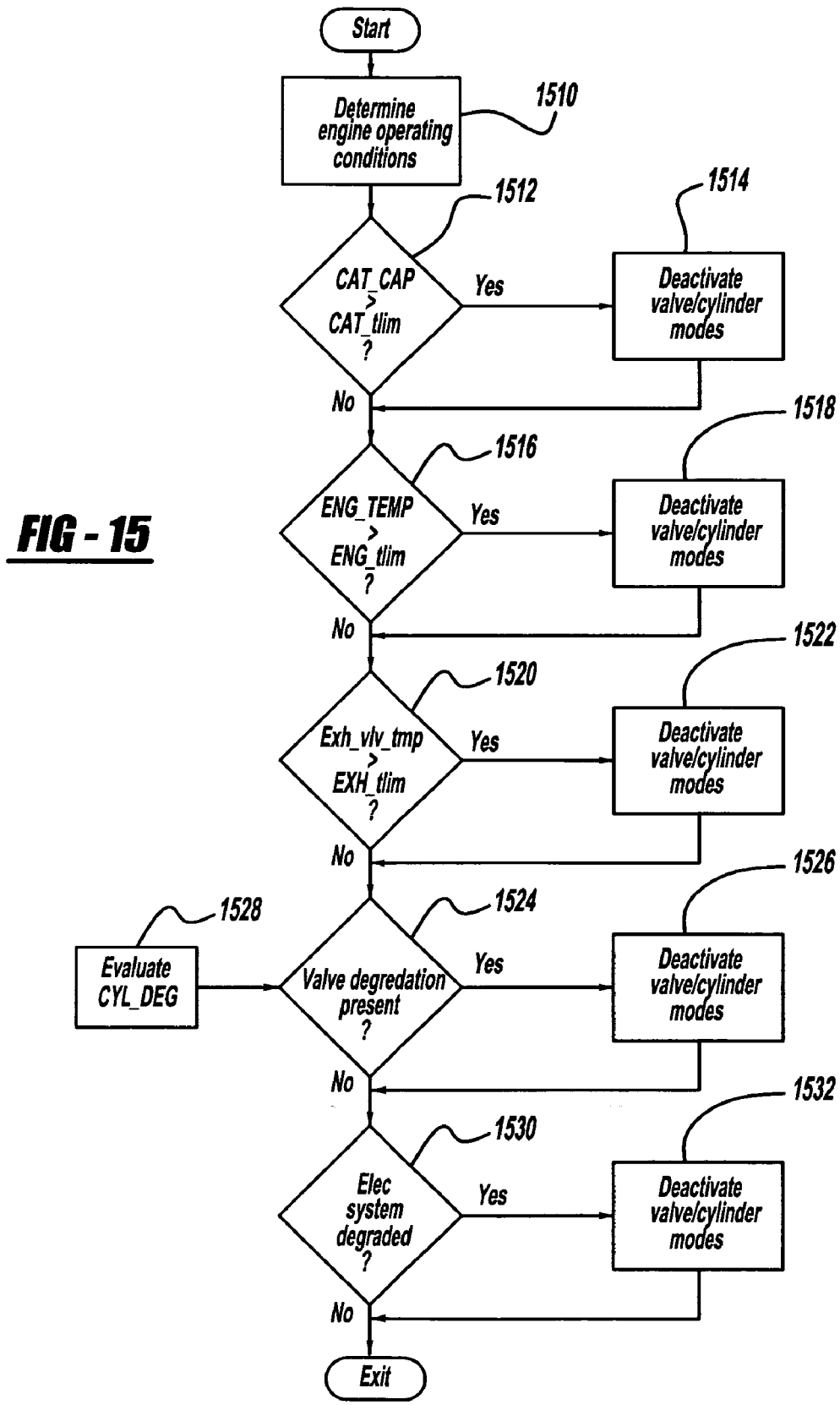
FIG. 15 is a flowchart of a routine to determine cylinder and valve modes based on operational limits.

In step 1016, some valve and/or cylinder modes that are affected by engine operating region and valve degradation are deactivated. Catalyst and engine temperatures along with indications of valve degradation, are used in one example to determine cylinder and/or valve mode deactivation in this step. The description of FIG. 15 provides further details of the selection process. The routine then continues to step 1018.

Figure 16:
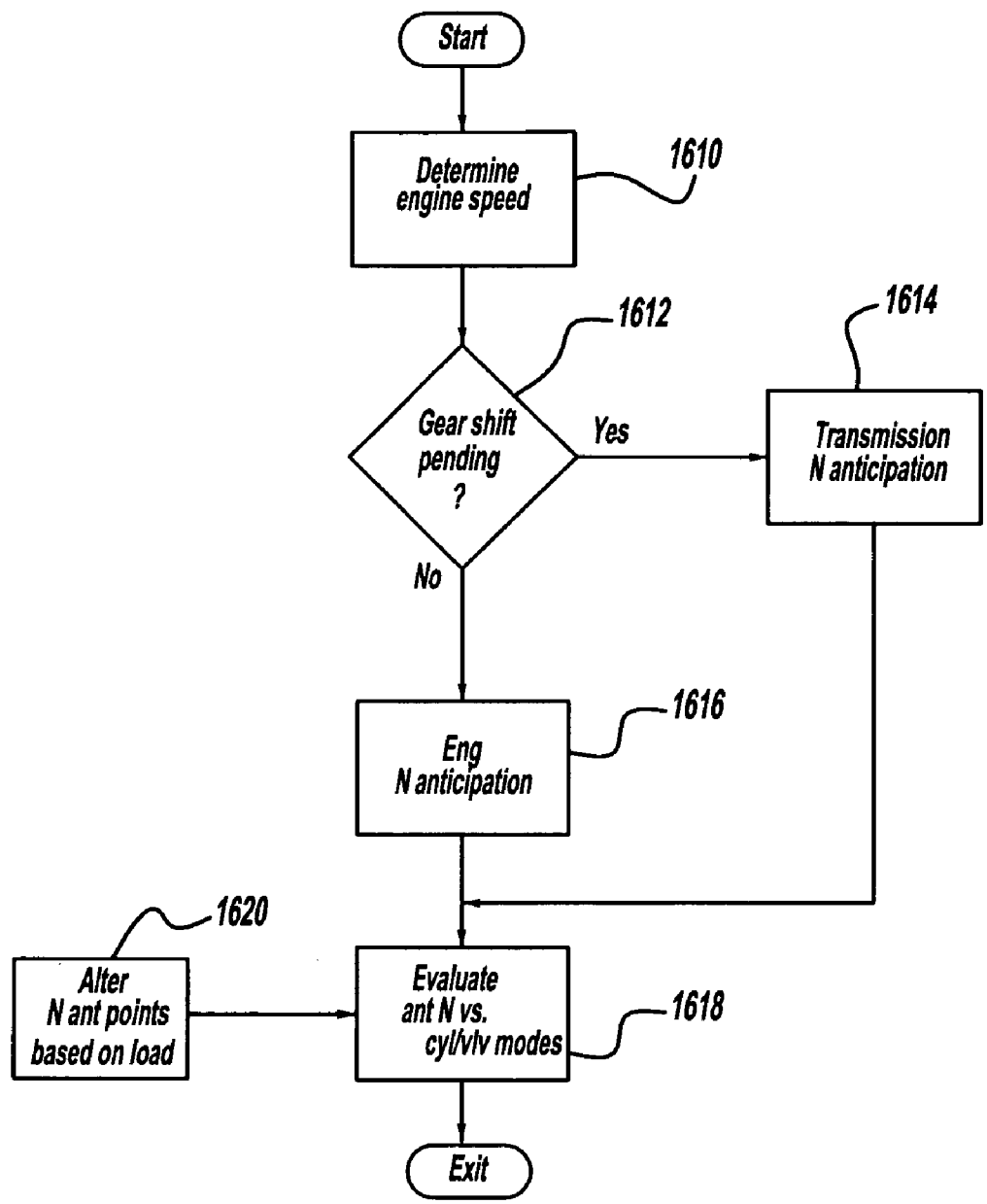
FIG. 16 is a flowchart of a routine to determine cylinder and valve modes based on noise, vibration, and harshness (NVH)

In step 1018, some valve and/or cylinder modes that affect engine and vehicle noise, vibration, and harshness (NVH) are deactivated. For example, electromechanical valves can be selectively activated and deactivated to change the number of active cylinders and therefore the cylinder combustion frequency. It can be desirable, under selected circumstances, to avoid (or reduce) valve and cylinder modes that can excite vibrational frequencies or modes of a vehicle, i.e., frequencies where the mechanical structure has little or no damping characteristics. The valve and/or cylinder modes that affect these frequencies are deactivated in step 1018. The description of FIG. 16 provides further details of NVH based valve and cylinder mode deactivation. The routine then proceeds to step 1020.

In step 1020, some cylinder and/or valve modes that do not provide sufficient torque to produce the desired engine brake torque are deactivated. In this step desired engine brake torque is compared to the torque capacity of the cylinder and valve modes contained within the mode matrix. In one example, if the desired brake torque is greater than the torque capacity (including a margin of error, if desired) of a given cylinder and valve mode, then the cylinder and/or valve mode is deactivated. Additional details of the torque based cylinder and valve mode selection process can be found in the description of FIG. 17. The routine then continues to step 1022.

In step 1022, the mode matrix is evaluated and the cylinder and valve modes are determined. At this point, based on the criteria of steps 1010–1020, deactivated cylinder and valve operating modes have been made unavailable by writing zeros into the appropriate mode matrix cell row/column pair. The mode matrix is searched starting from the matrix origin (0,0) cell, row by row, to determine row and column pairs containing ones. The last matrix row/column containing a value of one determines the valve and cylinder mode. In this way, the design of the mode matrix and the selection process causes the fewest number of cylinders and valves to meet the control objectives.

If a cylinder and/or valve mode change is requested, that is, if the method of FIG. 10 determines that a different cylinder and/or valve mode is appropriate since the last time the method of FIG. 10 executed, then an indication of an impending mode change is indicated by setting the requested mode variable to a value indicative of the new cylinder and/or valve mode. After a predetermined interval, the target mode variable is set to the same value as the requested mode variable. The requested mode variable is used to provide an early indication to peripheral systems of an impending mode change so that those systems may take action before the actual mode change. The transmission is one example where such action is taken, as described in FIG. 28. The actual cylinder and/or valve mode change is initiated by changing the target mode variable. Furthermore, the method may delay changing requested and target torque while adjusting fuel to suit the new cylinder and/or valve mode by setting the MODE_DLY variable. Cylinder and/or valve mode changes are inhibited while the MODE_DLY variable is set.

The chosen valve and cylinder mode is then output to the torque determination and delivery routine. The cylinder and valve mode selection routine is then exited.

In addition, the cylinder and valve mode matrix structure can take alternate forms and have alternate objectives. In one example, instead of writing ones and zeros to the cells of the matrix an alternate embodiment might write numbers to the matrix that are weighted by torque capacity, emissions, and/or fuel economy. In this example, selection of the desired mode might be based on the values of the numbers written into the matrix cells. Further, modes that define the axis of the matrix do not have to be in increasing or decreasing torque amounts; fuel economy, power consumption, audible noise, and emissions are a few additional criteria that may be used to define the structure of the mode control matrix organization. In this way, the matrix structure can be designed to determine cylinder and valve modes based on goals other than fewest cylinders and valves.

Also, the method of FIG. 10 may be configured to determine operating conditions of a valve, valve actuator, engine, chassis, electrical system, catalyst system, or other vehicle system. The before-mentioned operating conditions may be used to determine a number of active cylinders, number of active valves, valve patterns, cylinder strokes in a cylinder cycle, cylinder grouping, alternate valve patterns, and valve phasing desired. Determining a variety of operating conditions and selecting an appropriate cylinder and valve configuration may improve engine performance, fuel economy, and customer satisfaction.

In one example, at least the following two degrees of freedom can be used to regulate torque capacity of an engine:

(1) the number of cylinders carrying out combustion; and
(2) the number of valves operating in each cylinders Thus, it is possible to increase the resolution of torque capacity beyond that obtained by simply using the number of cylinders.

Furthermore, the method of FIG. 10 can switch between cylinder and valve modes during a cycle of the engine based on engine operating conditions.

In another example, an eight-cylinder engine operates four-cylinders in four-stroke mode and four-cylinders in twelve-stroke mode, all cylinders using four valves in each cylinder. This mode may generate the desired torque and a level of increased fuel efficiency by reducing the number of active cylinders and by operating the active cylinders at a higher thermal efficiency. In response to a change in operating conditions, the controller might switch the engine operating mode to four-cylinders operating in a four-stroke mode and using two valves in each cylinder. The remaining four-cylinders might operate in twelve-stroke mode with alternating exhaust valves.

In another example, under other operating conditions, some cylinders are operated with fuel injection deactivated, and others are operated with 4 valves active per cylinder. This mode may generate the desired torque while further increasing fuel efficiency. Also, the exhaust valves in the cylinders operating in twelve-stroke mode may cool due to the alternating pattern. In this way, the method of FIG. 10 permits an engine to change the number of active cylinders, number of strokes in a cycle of a cylinder, number of operating valves, and the valve pattern based on operating conditions and the mode matrix calibration and design.

Because an engine with electromechanical valves is capable of operating different cylinders in different modes, e.g., half the number of available cylinders in four-stroke and the remainder of cylinders in six-stroke, a cycle of an engine is defined herein as the number of angular degrees over which the longest cylinder cycle repeats. Alternatively, the cycle of a cylinder can be individually identified for each cylinder. For example, again, where an engine is operating with cylinders in both four and six stroke modes, a cycle of the engine is defined by the six-stroke cylinder mode, i.e., 1080 angular degrees. The cylinder and valve mode selection method described by FIG. 10 may also be used in conjunction with a fuel control method to further improve engine emissions. One such fuel control method is described by the flowchart illustrated in FIG. 55.

Referring to FIG. 11, an example of an initialized cylinder and valve mode matrix for a V8 engine with electromechanical intake and exhaust valves is shown. The x-axis columns represent a few of potentially many valve modes for a cylinder with four valves. Dual intake/dual exhaust (DIDE), dual intake/alternating exhaust (DIAE), alternating intake/dual exhaust (AIDE), and alternating intake/alternating exhaust (AIAE) are shown from left to right, from higher to lower torque capacity. The y-axis rows represent a few of potentially many cylinder modes for a V8 engine. The cylinder modes with more cylinders begin at the bottom and end at the top with fewer cylinders, from higher to lower torque capacity.

In this example, the mode matrix is advantageously constructed to reduce search time and mode interpretation. The intersection of a row and column, a cell, identifies a unique cylinder and valve mode. For example, cell (1,1) of the mode matrix in FIG. 12 represents V4 cylinder mode and dual intake/alternating exhaust (DIAE) valve mode. The mode matrix is organized so that engine torque capacity in the cylinder/valve mode decreases as the distance from the origin increases. The reduction in torque capacity is greater by row than by column because the number of active cylinders per engine cycle decreases as the row number increases, whereas the different valve modes reduce the engine torque by a fraction of a cylinder torque capacity.

Since the mode matrix construction is based on valves and cylinders, it naturally allows cylinder and valve modes to be defined that determine the number of active cylinders and valves as well as the cylinder and valve configuration. In addition, the mode matrix can identify cylinder and valve configurations that group cylinders and that have unique numbers of operating valves and valve patterns. For example, the mode matrix can be configured to provide half of active cylinders with two active valves and the other half of active cylinders with three active valves. Also, the mode matrix supports selection of multi-stroke modes. Multi-stroke operation generally includes a combustion cycle of greater than a four stroke combustion cycle. As described herein, multistroke operation includes greater than four stroke combustion, and variation of the number of strokes in the combustion cycle, such as, for example, variation between four-stroke, six-stroke, and/or twelve-stroke.

Further, different cylinders may be made active for a single cylinder mode, e.g., in a four-cylinder engine I2 cylinder mode may be produced by cylinders 1–4 or 2–3, by defining and selecting from two unique matrix cells.

Any of the cylinder and valve modes represented in the mode matrix can be deactivated with the exception of the cylinder and valve mode that is located in the (0,0) cell. Cell (0,0) is not deactivated so that at least one mode is available.

Referring to FIG. 12, an example of a matrix that has been through the cylinder and valve mode selection process is shown. The figure shows the zeros in the matrix cells that were initially set to ones in the mode matrix initialization, step 1010. Also, in the steps of the method of FIG. 10, when a cylinder and valve mode is deactivated, cylinder and valve modes of lesser torque capacity are also deactivated. For example, cell (1,2) has the higher torque capacity of the cells containing zeros. Based on the cylinder selected and valve mode selection criteria described above, cell (1,1) is selected as the current cylinder and valve mode, i.e., V4-dual intake/alternating exhaust (DIAE). This can reduce search time of the matrix if searching ceases after a zero is encountered in the matrix.

Referring to FIG. 13, a diagram of the state machine that selects cylinder and valve modes based on warm-up conditions is shown. Four states are shown but fewer or additional states are possible. State 1316, the cold state, is the default state entered when the cylinder and valve mode selection routine is executed for the first time (e.g., after a start). Engine and/or vehicle operating conditions thereafter determine the occupied state. Further, the arrows connecting states 1310–1316 designate operational conditions that trigger a state change, transferring state control from one state to another. For example, upon receiving a key on indication the cold state 1316 is entered. Vehicle and engine operating conditions are then determined, and if conditions permit the operational state is changed. A representative condition that triggers state change from the cold state 1316 to the warm stabilized state 1310 via arrow 1320 is:

If(((ECT>ECTSTBL)&(CAT>CATWRM))or ((ECT>ECTWRM)&(CAT>CATSTBL)))

Where ECT is measured or inferred engine temperature, ECTSTBL is a predetermined engine temperature that indicates the engine is at a warm operating temperature, CAT is a measured or inferred catalyst temperature, CATWRM is a predetermined catalyst temperature that indicates at least a partially warm catalyst system, ECTWRM is a predetermined engine temperature that indicates that the engine is warm but not at a stabilized operating temperature ECTSTBL, and CATSTBL is a predetermined catalyst temperature that indicates that the catalyst is at a temperature that permits efficient catalytic reactions.

Similar rule sets control the transitions between the other states. Thus, if the statement is true, the cold state 1316 is exited and the warm stabilized state 1310 is entered. Contained within each state is a predetermined state matrix of the same dimensions as the mode matrix. The predetermined state matrix can contain ones and zeros. When in a given state any zeros entered in the predetermined state matrix are copied into the mode matrix. Each time the mode selection routine is executed there is potential to change states. In this way, the different warm-up states update the mode matrix. Further, calibration of predetermined state matrices allows catalyst temperature and engine temperature to determine active and inactive cylinder and valve modes. That is, engine and catalyst temperatures can determine the number of active cylinders and the number of strokes in the active cylinders, plus they can determine the number and configuration or pattern of operational valves.

Warm-up cylinder and valve mode selection determination based on operational conditions of an engine are not constrained to engine temperature and catalyst temperature. Transitions between operating states may also be determined by engine oil temperature, ambient air temperature, barometric pressure, humidity, and a number of fueled cylinder events after a start, such as a number of combustion events.

Although engine and catalyst temperature provide an indication of engine operating conditions, conditions of an electromechanical valve can provide additional information and in some cases a basis for cylinder and valve mode changes. For example, armature temperature determined by sensor 50 (or estimated) may be included into the above-mentioned representative condition that triggers a state change. Further, the number of valve operations, time since start, valve operating time, valve current, valve voltage, power consumed by the valve, valve impedance sensing devices, combinations thereof, and/or sub-combinations thereof can augment (or supplant) the armature temperature sensor by providing additional operating conditions of a valve. Consequently, operating conditions of an electromechanical valve can be used to determine the number of active cylinders and/or the number of strokes in the active cylinders, plus they can optionally be used to determine the number and configuration or pattern of operational valves. These valve operating conditions may be included with engine and catalyst conditions in the state transition logic or they can comprise state transition logic without engine and catalyst operating conditions.

Selecting valve patterns, e.g., opposed intake and/or exhaust valves or diagonally opposed intake and exhaust valves, may also be based on warm-up conditions, cylinder stroke mode, and number of active cylinders by the state machine. This is accomplished by leaving desired valve patterns, cylinder stroke modes, and cylinder modes active in a given warm-up state. Then the remaining selection criteria of FIG. 2 can determine the cylinder mode, number of active valves, active valve pattern, and cylinder stroke mode by applying the conditional constraints of steps 1014–1022 of FIG. 10.

Selection of electromechanical valves operation during the engine warm-up in this way can improve engine operation in a number of ways, such as, for example, by operating all cylinders of an engine with a fewer number of valves. One example of such an option would be a V8 with four electromagnetic valves per cylinder operated with eight cylinders and two valves per cylinder. Not only can such operation increase fuel economy (by saving electrical energy by reduced valve current), but engine noise, vibration, and harshness (NVH) can also be reduced since engine torque peaks are closer together. Further, valve power consumption at low temperature increases while power supply capacity may decrease. Therefore, selecting a fewer number of valves during a low temperature condition (such as, for example, during an engine start) can make more current available to the engine starter so that longer engine cranking (rotating the engine until the engine is rotating under its own power) and higher cranking torque is possible without depleting battery capacity.

The state machine of FIG. 13 can be further configured to accommodate warm-up states that are entered based on operating conditions of a transmission. For example, transmission oil temperature, gear selector position, or estimated transmission torque losses may also be incorporated into warm-up state determination logic and used to select engine and valve modes.

Continuing with the remaining transitions of FIG. 13, the transition from cold state 1316 to the warm stabilized state 1310 is performed if:
(((ECT>ECTSTBL)&(CAT>CATWRM))or
((ECT>ECTWRM)&(CAT>CATSTBL)))

The transition from cold state 1316 to the warm state 1312 is performed if:
(((ECT>ECTWRM)&(CAT>CATCOL))or
((ECT>ECTCOL)&(CAT>CATWRM)))&((ECT<ECTSTBL)&(CAT<CATSTBL))

The transition from cold state 1316 to the cool state 1314 is performed if:
(((ECT>ECTCOL)&(CAT>CATCLD))or((ECT>ECTCLD)&(CAT>CATCOL)))&((ECT<ECTWRM)&(CAT<CATWRM))

The transition from cool state 1314 to warm state 1312 is performed if:
(((ECT>ECTWRM) & (CAT>CATCOOL)) or ((CAT>CATWRM) & (ECT>ECTCOL)))

The transition from warm state 1312 to warm stabilized state 1310 is performed if:
(((ECT>ECTSTBL) & (CAT>CATWRM)) or ((CAT>CATSTBL) & (ECT>ECTWRM)))

The transition from warm stabilized 1310 to warm 1312 is performed if:
((ECT<ECTSTBL) & (CAT<CATSTBL))

The transition from warm 1312 to cool 1314 is performed if:
((ECT<ECTWRM) & (CAT<CATWRM))

And finally, the transition from cool 1314 to cold 1316 is performed if:
((ECT<ECTCOL) & (CAT<CATCOL))

Where CATCOL is a catalyst temperature threshold that identifies a cool cat temp (e.g., 400 deg F.), ECTCOL is a engine temperature threshold that identifies a cool engine (e.g., 110 deg F.), CATCLD is a catalyst temperature threshold that identifies a cold cat (e.g., 70 deg F.), and ECTCLD is a temperature that identifies a cold engine temperature (e.g., 70 deg F.).

Referring to FIG. 14, a method to deactivate cylinder and valve modes from the mode matrix based on catalyst operating conditions (for example, catalyst state) is shown. In one example, an oxidant storage state (such as an amount of oxidants stored) is used. In one example, oxygen is the primary oxidant. In one approach, catalyst temperature can be used in determining a catalyst operating condition. However, in another example, catalyst temperature (even though a factor in determining an oxidant storage state) is not explicitly used to determine cylinder and valve modes since this feature can be captured in the warm-up cylinder and valve mode selection, see FIG. 13. The method evaluates each cylinder and/or valve mode represented in the mode matrix and deactivates selected modes based on the evaluation.

In steps 1410 and 1412, Catalyst storage capacity (such as a maximum oxidant storage availability at the current operating conditions) and oxidant storage amount are determined. In one example, these can be determined using the method in accordance with U.S. Pat. No. 6,453,662, which is hereby fully incorporated by reference.

In one example, catalyst capacity is determined after filling the catalyst with oxidants by running the engine with a lean air/fuel ratio for an extended period of time. After the catalyst is filled, the air/fuel ratio provided to the engine is made rich. The pre-catalyst oxygen sensor 76 detects the rich air/fuel condition in the exhaust almost immediately. However, because the HC and CO produced by the rich engine air/fuel ratio reacts with the stored oxidants in the catalyst, there is a time delay until the post-catalyst oxygen sensor 98 detects a rich air/fuel ratio in the downstream exhaust. The length of the time delay is indicative of the oxidant storage capacity of the catalyst. Based upon the measured time delay, a deterioration factor between 0 and 1 (0 representing total deterioration and 1 representing no deterioration) is calculated. Alternatively, the method could be used in reverse, i.e., the catalyst could be depleted due to extended rich operation, after which the air/fuel ratio would be switched to lean operation. Similar to the original method, the length of the time delay until the post-catalyst sensor 98 registered a change in state would be indicative of the catalyst storage capacity. Also, the duration of delay can be affected by catalyst space velocity, air flow, temperature, etc., and these parameters can be therefore included in the calculation. The routine then proceeds to step 1414.

In step 1414, an engine emissions amount is determined by looking up stored empirical emissions concentrations of HC, CO, and $NO_x$ at the current engine speed/load operating conditions. These concentrations can be integrated over time to determine a mass weight of each constituent. Further, functions that represent spark advance and air-fuel modifiers alter emissions concentrations, and can be included. Alternatively, emissions sensors may be employed to make a direct measurement of a constituent of interest. Still further, combinations of estimates and measurements can also be used. The routine then proceeds to step 1416.

In step 1416, estimated catalyst oxidant storage capacity, CAT_CAP, is compared to a predetermined matrix of oxidant catalyst storage capacity amounts, CAT_STOR. In other words, each cylinder and valve mode may have a unique desired catalyst storage capacity that is compared to the estimated catalyst oxidant storage capacity. If the current catalyst oxidant storage capacity is above the amount stored in the predetermined catalyst storage matrix (which can represent a desired catalyst oxidant capacity for a selected cylinder and/or valve mode) the routine proceeds to step 1418. Otherwise, the routine continues to step 1420.

In step 1420, cylinder and valve modes are deactivated based on the catalyst oxidant storage capacity. Cylinder and valve modes are deactivated based on the comparison of catalyst oxidant storage capacity verses the predetermined matrix of catalyst oxidant storage from step 1416. In other words, if current catalyst oxidant storage capacity is below a predetermined amount for a specific cylinder and valve mode, then the cylinder and valve mode is deactivated. In this way, cylinder and valve mode are determined, in part, by catalyst oxidant storage capacity.

In step 1418, an amount of estimated stored oxidants, CAT_OXY, is compared to a predetermined matrix of oxidant catalyst storage capacity amounts, CAT_STOR, from step 1416. If the current catalyst oxidant storage capacity is greater than X% of the amount stored in the predetermined catalyst storage matrix the routine proceeds to step 1422. The value of X may be determined by indexing an array based on engine speed, engine air amount, and vehicle speed.

To estimate the amount of oxidants, CAT_OXY, that are actually adsorbed/desorbed by the catalytic converter, (which can be done on a per brick basis) this estimation depends on several factors, including the volume of the catalytic converter 70, the flow rate of oxidants in the exhaust manifold 48, the percentage of the catalytic converter that is already full of oxidants, and other physical and operational characteristics of the catalytic converter. The change in the amount of oxidants stored in the catalytic converter 70 between two preset times ($\Delta T$) is estimated based on the following model:

$$\Delta O_2 = C_1 * C_2 * C_3 * C_4 \left[ K_a * \left(1 - \frac{\text{Stored } O_2}{\text{Max } O_2}\right)^{N_1} * \left(\frac{O_2 \text{ Flow Rate}}{\text{Base Value}}\right)^{Z_1} * Cat\ Vol * \Delta T \right] \quad (A)$$

for Oxygen being adsorbed $$\Delta O_2 = C_1 * C_2 * C_3 * C_4 \left[ K_d * \left(1 - \frac{\text{Stored } O_2}{\text{Max } O_2}\right)^{N_2} * \left(\frac{O_2 \text{ Flow Rate}}{\text{Base Value}}\right)^{Z_2} * Cat\ Vol * \Delta T \right] \quad (B)$$

for Oxygen being desorbed

As indicated above, Equation (A) is used to calculate the change in oxidant storage in the catalytic converter if the catalyst is in an adsorption mode and Equation (B) is used if the catalyst is in a desorption mode.

In Equations (A) and (B), the variables $C_1$, $C_2$, and $C_3$ are assigned values to compensate for various functional and operational characteristics of the catalytic converter. The value of $C_1$ is determined according to a mathematical function or look-up table based on the catalyst temperature. One embodiment uses a mathematical function that illustrates that a catalytic converter is most active when the catalyst is hot and least active when it is cold. The catalyst temperature can be determined according to several different methods that are well-known to those of skill in the art, including by a catalyst temperature sensor.

The value of $C_2$ in Equations (A) and (B) is determined based on the deterioration of the catalytic converter. The deterioration of the catalytic converter can be determined by a variety of well-known methods, including, for example, inferring such age or deterioration from the vehicle's total mileage (recorded by the vehicle's odometer) or total amount of fuel used over the vehicle's lifetime. Further, a catalytic deterioration factor can be calculated according to one of the preferred methods described hereinabove.

The value of $C_3$ is determined by a mathematical function or map based on the air mass flow in the exhaust manifold 48 which can be measured or inferred. The mathematical function used to assign values to $C_3$ depends on the mass airflow rate in the induction manifold 44. The adsorption/desorption efficiency of the catalyst decreases as the mass flow rate increases.

The $C_4$ value is read from a two-dimensional look-up table of adaptive parameters. The primary index to the look-up table is air mass flow. For each air mass flow, there are two $C_4$ values—one for when the catalyst is adsorbing oxidants (equation (A)) and one for when the catalyst is desorbing oxidants (equation (B)). Thus, the value of $C_4$ used in equations (A) and (B) above varies from time to time with the determined air mass flow.

In Equation (A), the value of $k_a$ represents the maximum adsorbing rate of the catalytic converter in terms of grams of oxidants per second per cubic inch. Similarly, in Equation (B), the value of $k_d$ represents the maximum desorbing rate of the catalytic converter in terms of grams of oxidants per second per cubic inch. The values of $k_a$ and $k_d$ are predetermined based on the specifications of the particular catalytic converter being used.

The value for Max $O_2$ in both Equation (A) and Equation (B) represents the maximum amount of oxidants that the catalyst 70 is capable of storing in terms of grams. This is a constant value that is pre-determined according to the specifications of the particular catalytic converter used in the system. The value for Stored $O_2$ in Equations (A) and (B) represents the previously-calculated current amount of oxidants stored in the catalytic converter 70 in terms of grams. The value for Stored $O_2$ is read from RAM 108.

The value for $O_2$ Flow Rate in Equation (A) and Equation (B) represents the cylinder air amount. The Base Value in Equation (A) and Equation (B) represents the oxygen flow rate where $K_d$ and $K_a$ were determined and it is (PPM $O_2$ of input gas)*(volumetric flow rate)*(density of $O_2$).

The Cat Vol parameter in Equation (A) and Equation (B) represents the total volume of the catalytic converter in terms of cubic inches. This value is pre-determined based on the type of catalytic converter being used. The value $\Delta T$ in both equations represents the elapsed time in seconds since the last estimation of the change in oxidant storage in the catalyst.

Finally, the values of $N_1$, $N_2$, $Z_1$, and $Z_2$ are exponents that express the probability of desorption/adsorption and they are determined by experimentally measuring rates of adsorption/desorption at given levels of storage and flow. The exponents are regressed from measurements and can be used to describe linear to sigmoid probabilities.

After the change in estimated oxidant storage in the catalyst 70 is calculated according to Equation (A) or Equation (B), the running total of the current oxidant storage maintained in RAM memory 108 is updated accordingly. Specifically, the amount of oxidants either adsorbed or desorbed is added/subtracted to the running total of oxidant storage, which is maintained in RAM memory 108.

If the current catalyst oxidant storage capacity is not greater than X% of the amount stored in the predetermined catalyst storage matrix, the routine continues and exits, signifying that the catalyst has a desired oxidant storage capacity and that a desired amount of the storage capacity remains for storing oxidants.

In step 1422, cylinder and valve modes are deactivated based on the amount of oxidants stored in the catalyst. Cylinder and valve modes are deactivated based on the comparison of oxidants stored in a catalyst to a percentage of an amount stored in the predetermined catalyst storage matrix. In other words, if the amount of oxidants stored in a catalyst are greater than a percentage of a predetermined amount then those cylinder and valve modes that are greater than the desired amount are deactivated. For example, if a catalyst has a predetermined oxidant storage capacity of 0.0001 gm and has a desired oxidant storage capacity of 60% or less of the predetermined oxidant storage capacity then the cylinder and valve mode will be deactivated if the stored oxidant amount is greater than 0.00006 gm.

An alternative to the method of FIG. 14 is to recognize that deactivation of cylinder and valve modes can affect engine feed gas emissions. Therefore, cylinder and valve modes may be selected to alter the catalyst state. That is, deactivating certain cylinder and valve modes can constrain engine feed gas emissions altering the gas concentrations that enter the catalyst. For example, a V8 engine operating in V4 cylinder and dual intake/dual exhaust mode may produce higher levels of oxidants as compared to a V8 cylinder mode due to higher in cylinder temperatures and pressures. If a catalyst oxidant storage capacity is less than desired, V4 cylinder mode could be deactivated in an effort to reduce NOx emissions.

In addition, engine fuel may be adjusted before and during a cylinder/valve mode change to further affect the amount of oxidants stored in a catalyst. For example, if an engine is operating in an eight cylinder mode and mode selection criteria permits switching to another mode, four-cylinder mode for example, fuel may be added or subtracted from the base fuel amount to bias the total fuel amount in a rich or lean direction, before the mode change is initiated, to precondition the catalyst for the mode change. Further, during and after a mode change, fuel may be added or subtracted from the base fuel amount to bias the total fuel amount in a rich or lean direction. The fuel adjustments may provide compensation for gas constituent changes that may occur due to different cylinder air amounts.

In one example embodiment, advantageous operation can be obtained for an engine with electromechanical valves that is first operating in a first operating mode with a first valve and/or cylinder configuration (e.g., a first group of cylinders operating with a first number of valves and a second group operating with a second number of valves, or some cylinders in 4-stroke and some cylinders in 12 stroke mode, or some cylinders deactivated and remaining cylinders having differing number of active valves, or combinations or subcombinations thereof), and transitions to operating in a second operating mode with a second valve and/or cylinder configuration. And, before and/or during the transition, the exhaust gas mixture air-fuel ratio is temporarily biased lean or rich to precondition the exhaust system (by, for example, changing the air-fuel mixture in one or more cylinders carrying out combustion).

Referring to FIG. 15, a flowchart of a method to deactivate cylinder modes (from available modes, for example) based on engine and valve operational limits is shown. The method evaluates engine and catalyst temperatures to determine which available cylinder and valve modes should be deactivated. Further, if valve degradation is indicated the method deactivates cylinder and valve modes influenced by the degradation, with the exception of the cylinder and valve mode in cell (0,0) of the mode matrix, if desired.

In step 1510, engine operating conditions are determined. Engine temperature sensor 112 and catalyst brick temperature 77 are measured. Alternatively, the temperatures may be inferred. In addition, exhaust valve temperature can be inferred from empirical data based on engine temperature, exhaust residuals, engine speed, engine air amount, and spark advance. The routine then proceeds to step 1512.

In step 1512, catalyst temperature, CAT_TEMP, is compared to a predetermined variable CAT_tlim. If the catalyst temperature is greater than CAT_tlim the routine proceeds to step 1514. If catalyst temperature is less than CAT_tlim then the routine proceeds to step 1516.

In step 1514, cylinder and valve modes are deactivated based on predetermined matrix, CAT_LIM_MTX. The matrix has the same dimension as the mode matrix, i.e., the matrices have the same number of elements. Within CAT_LIM_MTX, the cylinder and valve modes that produce higher temperatures are deactivated. The deactivated modes are then copied from the CAT_LIM_MTX to the mode matrix. For example, if a measured or inferred catalyst temperature is higher than desired for a V8 engine, partial cylinder modes, V4, six-stroke, and V2 are deactivated. Deactivating the partial cylinder modes lowers exhaust temperatures by decreasing the load per cylinder at the same desired torque. The routine then proceeds to step 1516.

In step 1516, engine temperature, ENG_TEMP, is compared to a predetermined variable ENG_tlim. If the engine temperature is greater than ENG_tlim the routine proceeds to step 1518. If the engine temperature is less than ENG_tlim then the routine proceeds to step 1520.

In step 1518, cylinder and valve modes are deactivated based on predetermined matrix, ENG_LIM_MTX, where the matrix has the same dimension as the mode matrix, i.e., the matrices have the same number of elements. Within ENG_LIM_MTX the cylinder and valve modes that produce higher temperatures are deactivated. The deactivated modes are then copied from the ENG_LIM_MTX to the mode matrix. For example, if a measured or inferred catalyst temperature is higher than desired for a V8 engine, partial cylinder modes, V4, six-stroke, and V2 are deactivated. Deactivating the partial cylinder modes can lower exhaust temperatures by decreasing the load per cylinder at the same desired torque. The routine then proceeds to step 1520.

In step 1520, the inferred exhaust valve temperature, EXH_vlv_tmp, is to a predetermined variable EXH_tlim. If the inferred exhaust valve temperature is greater than EXH_tlim the routine proceeds to step 1522. If the inferred exhaust valve temperature is less than the EXH_tlim then the routine proceeds to step 1524.

In step 1522, cylinder and valve modes are deactivated based on predetermined matrix, EXH_LIM_MTX, where the matrix has the same dimension as the mode matrix, i.e., the matrices have the same number of elements. Within EXH_LIM_MTX the cylinder and valve modes that produce higher temperatures are deactivated. The deactivated modes are then copied from the ENG_LIM_MTX to the mode matrix. For example, if a measured or inferred exhaust valve temperature is higher than desired for a V8 engine, partial cylinder modes, V4, six-stroke, and V2 are deactivated and the exhaust valves operate in an alternating mode. Deactivating the partial cylinder modes lowers exhaust temperatures by decreasing the load per cylinder while alternating valves facilitates heat transfer between the inactive exhaust valve and the cylinder head. The routine then proceeds to step 1524.

In step 1524, valve degradation is evaluated. The valve degradation can be indicated in a number of ways that may include but are not limited to: valve position measurements, temperature measurements, current measurements, voltage measurements, by inference from oxygen sensors, or by an engine speed sensor. If valve degradation is detected, a variable, VLV_DEG, is loaded with the number of cylinders with degraded valves and a cylinder identifier, CYL_DEG, is loaded with the latest cylinder number where the degraded valve is located, in step 1528. If valve degradation is present, the routine continues to step 1526. If valve degradation is not indicated the routine exits.

In step 1526, cylinder and valve modes that are affected by valve degradation are deactivated, which can include deactivating the cylinder(s) with the degraded valve(s). Specifically, the cylinder in which the degraded valve is located, CYL_DEG, is an index into a matrix, FN_DEG-MODES_MTX; that contains cylinder modes that are affected by the cylinder that contains the degraded valve. The routine then deactivates the cylinder modes that are identified by the FN_DEGMODES_MTX. However, in one example, the cylinder mode of row zero is not deactivated so that the engine is capable of delivering torque from at least some (or all) cylinders with non-degraded valves when requested. In addition, if more than one cylinder has degraded performance due to degraded valve performance, i.e., VLV_DEG is greater than one, the cylinder mode corresponding to row zero is the single active cylinder mode. In this way, a cylinder identified to have degraded performance causes affected cylinder modes to be deactivated, which may include disabling combustion, fuel injection, and/or ignition plug activation in the cylinders with degraded valves. Thus, fuel and/or spark can be deactivated in cylinders with degraded valve performance.

Valve performance degradation may also be compensated in step 1526. Valve temperature is sensed by temperature sensor 50, but additional valve operating conditions may be determined as well. For example, valve voltage, impedance, and power consumption may be sensed or inferred. These parameters may be compared to predetermined target amounts to form error amounts that are then used to adjust an operating parameter of a vehicle electrical system. For example, if ambient air temperature increases and a voltage amount, measured or inferred, at a valve is lower than desired, a signal may be sent to the vehicle electrical system to increase the supply voltage. In this way, operating conditions of the valve may be used to adjust an operating condition of a vehicle electrical system so that valve operation is improved. The routine then proceeds to step 1530.

In step 1530, operating conditions of a vehicle electrical system are assessed. If electrical system available power, available current, and/or available voltage is below a predetermined amount or is degraded, the routine proceeds to step 1532. Furthermore, if an external electrical load, e.g., a computer or video game powered by the vehicle electrical system, or an ancillary, lower priority electrical load, e.g., a vehicle component, such as an air pump or fan, is loading the vehicle electrical system more than a predetermined amount or more than a fraction of the total available electrical system capacity, the routine proceeds to step 1532. The routine then proceeds to exit.

In step 1532, cylinder and valve modes are deactivated based on electrical system operating conditions. Copying zeros from selected matrices into the mode matrix deactivates cylinder and valve modes. If electrical system available power, available current, and/or available voltage are below a first set of predetermined amounts, matrix FNV-LVRED zeros are copied into the mode matrix. In this example, the zeros restrict valve operation to the number of engine cylinders with two operational valves per cylinder. If the above-mentioned electrical parameters are below a second set of predetermined amounts, matrix FNCYLRED zeros are copied into the mode matrix. In this example, the zeros restrict valve operation to a reduced number of active cylinders and a reduced number of valves in active cylinders.

Further, if power to external or ancillary loads exceeds predetermined amounts, controlling a power switch, e.g., a relay or transistor, deactivates power to these devices. The combination of deactivating cylinder and valve modes along with reducing the affect of external and ancillary electrical loads can improve likelihood of starting during conditions of reduced electrical system capacity. For example, during cold ambient temperatures, engine friction increases and battery power may be reduced. By deactivating lower priority electrical loads and selecting a reduced number of active cylinders and valves, additional electrical power is available for an engine starter and active valves during starting. In addition, vehicle range may be increased if electrical system performance degrades during engine operation by deactivating lower priority electrical loads and reducing active cylinders and valves.

Referring to FIG. 16, a flowchart of a method to deactivate cylinder modes based on frequencies of modal vibration of a vehicle chassis and components. The method evaluates engine speed and predicts future engine speed so that excitation of modal frequencies of the vehicle chassis and components can be reduced. Components whose modal frequencies are desirable to reduce or avoid include, for example: drive shafts, brackets, and transmission housing. The method deactivates cylinder modes if the engine combustion frequency approaches a predetermined modal frequency.

Engine speed is anticipated because cylinder mode transitions take a period of time to initiate and because it also may take time to allow a torque converter to exit lock-up mode and begin to slip, reducing driveline torque surges. In other words, when transitioning between different valve and/or cylinder modes, in one example, the torque converter is unlocked before the transition, to dampen any uncompensated torque disturbance.

In step 1610, engine speed is determined. Engine speed is determined from engine position sensor 118. The routine then proceeds to step 1612.

In step 1612, variables for current transmission gear, CUR_GR, and target (future) transmission gear, TAR_GR, are evaluated to determine if a gear shift is pending. The transmission controller determines current and target gears from engine speed, driver brake torque demand, transmission temperature, and signals alike, for example. If CUR_GR and TAR_GR are different, a transmission shift is pending or is in progress. If a gear shift is pending or is in progress the routine proceeds to step 1614. If a gear shift is not in progress or pending, the routine proceeds to step 1616.

In step 1614, engine speed is predicted into the future by multiplying the current engine speed by the ratio of current and target gear ratios. In automatic transmissions, the slip of a torque converter can also be incorporated into gear based anticipation. This allows engine combustion frequencies that are influenced by transmission gears to be reduced or avoided.

When a transmission shifts gears, the engine speed can change quickly as the engine speed and vehicle speed are brought together through the transmission gear set. Engine speed is anticipated during gear shifting by the equation:

$$\text{Ant\_Eng\_N} = \text{Eng\_N} \cdot \frac{\text{Tar\_Gr\_Rto}}{\text{Cur\_Gr\_Rto}}$$

Where Ant_Eng is the anticipated engine speed, Eng_N is, the current engine speed, Tar_Gr_Rto is the target (future)

gear ratio, and Cur_Gr_Rto is the current gear ratio. The equation predicts engine speed during up and down shifting so that excitation of modal frequencies can be avoided. The routine then proceeds to step 1618.

In step 1616, engine speed is predicted based on current and past engine speed measurements. Engine speed is predicted by the equation:

$$\text{Ant\_Eng\_N} = \text{Eng\_N}(k) + \text{Ant\_Tm} \cdot \frac{\text{Eng\_N}(k) - \text{Eng\_N}(k-1)}{\Delta t}$$

Where Ant_Eng is the anticipated engine speed, Eng_N(k) is the current engine speed, Eng_N(k−1) is engine speed of the previous engine speed sample, Ant_Tm is the anticipation time, i.e., period of time anticipated into the future, and Δt is the time duration between samples. The anticipation time, Ant_Tm, should be less than 0.5 seconds.

Alternatively, engine speed may be used in place of predicted engine speed, but speed thresholds of each cylinder and valve mode are lowered to avoid encountering NVH areas. The routine then continues to step 1618.

In step 1618, anticipated engine speed is converted into combustion frequencies that are associated with cylinder modes. For example, an anticipated engine speed of 0.1500 RPM for an engine operating in four-stroke mode with eight active cylinders translates to a firing frequency of 100 Hertz (1500 Rev/min*1 min/60 sec*4 firing/Rev).

These frequencies are then compared to a predetermined undesirable cylinder mode frequency so that excitation of modal frequencies is avoided or reduced by activating or deactivating cylinders and/or valves. Further, the number of strokes in a cycle of a cylinder may also be changed to avoid undesirable frequencies. For example, if the modal frequency of a vehicle chassis is 15 Hz it is desirable to avoid this and lower frequencies. An engine operating at 800 RPM has a V8 combustion frequency of 53.3 Hz, a V4 combustion frequency of 26.6 Hz, and a V2 combustion frequency of 13.3 Hz. Therefore, in this example, V2 cylinder mode can be deactivated. Further, step 1620 provides an offset to the predetermined desired frequency of step 1618. If the cylinder load, or cylinder air amount, is low, the predetermined desired frequency can be lowered as a function of the cylinder load. Typically, a cylinder load below 30% of cylinder load capacity will lower the predetermined frequency capacity. The routine then exits.

In addition, the number of valve events during a cycle of an active cylinder may also be used to avoid frequencies (or reduce the impact) that are a result of valve operations. In other words, when a valve is operated it generates a different frequency than the cylinder combustion frequency because the valve operates at least twice in an active cylinder, one time opening and one time closing. These frequencies may also be avoided or reduced in step 1618 by identifying valve frequencies based on valve and cylinder modes.

Further, frequencies that affect driveline and drive shaft vibration or are affected by the state of a torque converter lock-up clutch may be avoided or reduced by simply changing combustion frequency and valve events as described above.

Further yet, a signal may be output from step 1618 to change a damping ratio of a motor mount having variable characteristics. As cylinder combustion frequency and valve operating frequency approach a predetermined value, a signal may be sent to an external routine to alter motor mount damping ratios to further reduce any noise or vibration.

Figure 17:
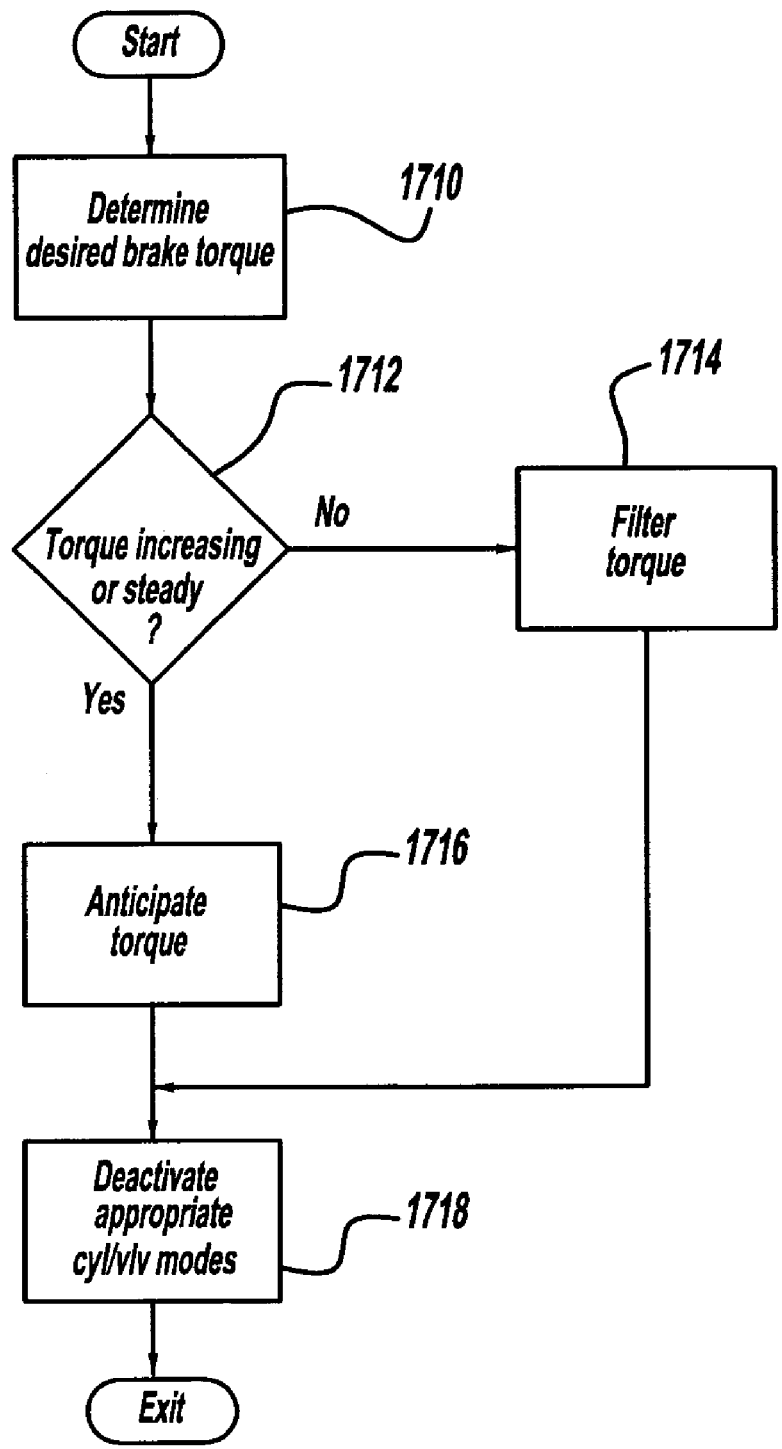
FIG. 17 is a flowchart of a routine to determine cylinder and valve modes based on desired engine brake torque.

Referring to FIG. 17, a flowchart of a method to deactivate cylinder modes based on desired engine brake torque is described. The method evaluates desired engine brake torque and predicts future engine brake torque so that torque is smoothly applied between cylinder and valve mode transitions.

In step 1710, desired engine brake torque is determined from accelerator pedal 119. The routine then proceeds to step 1712. Note that other engine output parameters could be used in place of engine brake torque, such as wheel torque, transmission input torque, transmission output torque, engine indicated torque, and others. Further, it can also be based on engine or vehicle speed.

In step 1712, the method determines if desired brake torque is increasing or decreasing. In one example, the current desired brake torque is subtracted from the previous sample value of desired engine brake torque. If the sign of the result is positive, brake torque is (or determined to be) increasing. If the result is negative, desired brake torque is (or determined to be) decreasing. If the desired brake torque is increasing, the method proceeds to step 1716. If the desired brake torque is decreasing the method proceeds to step 1714. Further, the routine can also have a third option that looks to whether the torque is remaining substantially steady (e.g., not changing within 0–5%, for example). If such a condition is detected, in this example, the routine continues to step 1716.

In step 1714, the desired engine brake torque signal is filtered by a first order filter and a predetermined time constant, although higher order filters could be used, or other types of filters could be used. By filtering the decreasing desired brake torque signal, potential of increased frequency of switching between multiple cylinder and valve modes can be reduced. For example, if the vehicle driver depresses and then releases the accelerator 119 multiple times over a short period, the filter can reduce the number of mode changes because the filtered desired torque signal decays, i.e., goes to a lower value, at a slower rate than the unfiltered desired torque signal. In an alternative embodiment, both increasing and decreasing signals can be filtered and then used with a dead-band to reduce the amount of unnecessary valve or cylinder mode switching in response to driver changes. The method then continues to step 1718.

In step 1716, the increasing desired brake torque signal is predicted into the future by an anticipation algorithm. Desired engine torque is anticipated by the equation:

$$\text{Ant\_Eng\_Tor} = \text{Eng\_Tor}(k) + \text{Ant\_Amt} \cdot \frac{\text{Eng\_Tor}(k) - \text{Eng\_Tor}(k-1)}{\Delta t}$$

Where Ant_Eng_Tor is the anticipated desired engine torque, Eng_Tor(k) is the current desired engine torque, Eng_Tor(k−1) is desired engine torque of the previous desired engine torque sample, Ant_Amt is the anticipation time, i.e., period of time anticipated into the future, and Δt is the time duration between samples. The anticipation time, Ant_Amt, in one example, is less than 0.5 seconds.

Alternatively, desired engine torque may be used in place of predicted desired engine torque, but torque thresholds of each cylinder and valve mode are lowered to avoid encountering the torque capacity of a mode. The routine then continues to step 1718.

In step 1718, desired engine torque is compared to a matrix, Eng_Mod_Tor, of torque capacity amounts for cylinder and valve modes. Each cell of the cylinder and valve mode matrix has a corresponding cell in the Eng_Mod_Tor matrix. If the desired engine torque is greater than the torque capacity of a cylinder and valve mode, then the cylinder and valve mode is deactivated. In other words, the desired torque is compared against the torque capacity of each cylinder and valve mode. If the desired torque is greater than a cylinder and valve mode, the mode is deactivated. The routine then exits.

Figure 18:
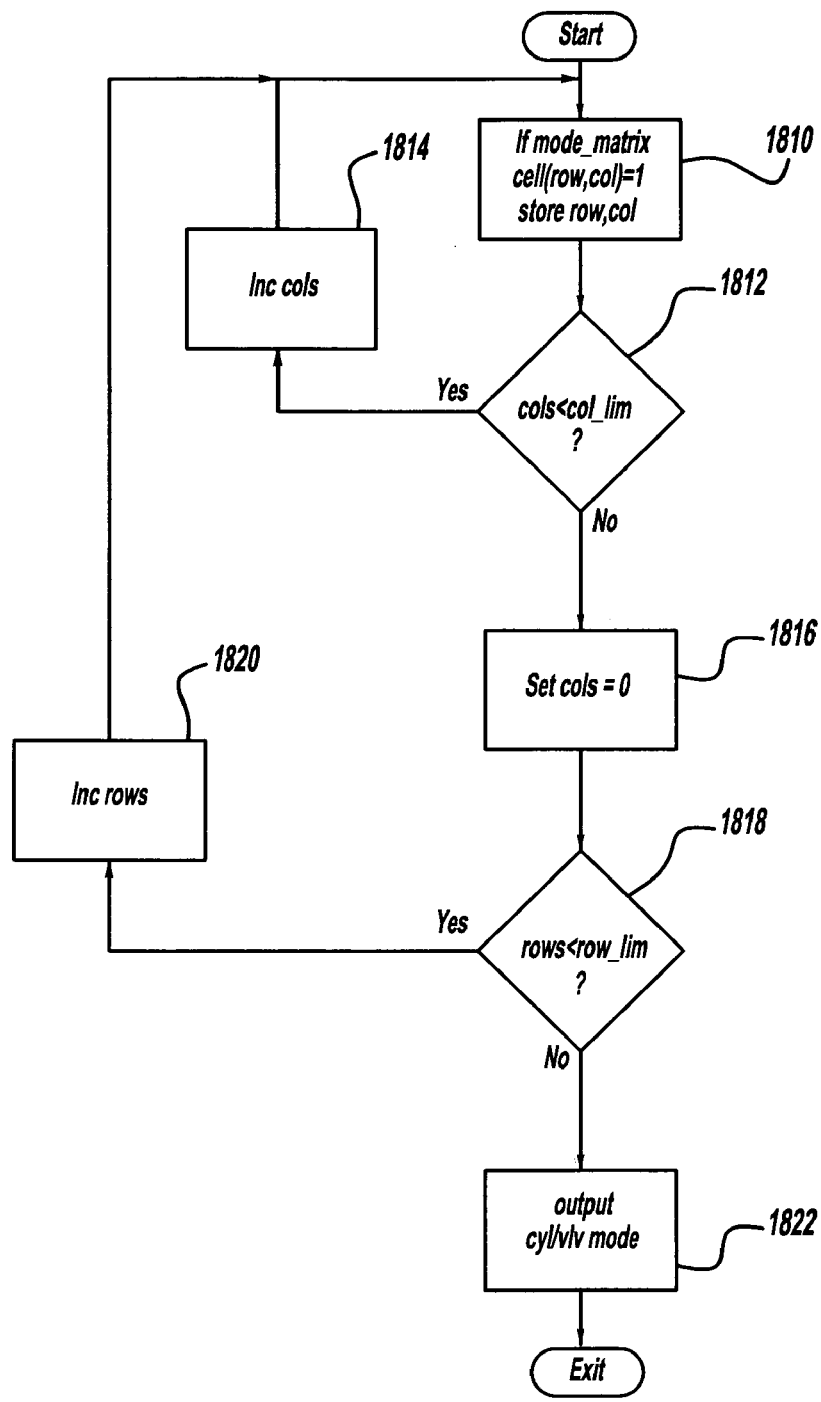
FIG. 18 is a flowchart of a routine to select cylinder and valve modes.

Referring to FIG. 18, a method to select a cylinder and valve mode from a matrix of available cylinder and valve modes is described. In one example, the method searches the entire mode matrix for a mode with the least number of active cylinders and valves. Since the before-mentioned steps have already deactivated cylinder and valve modes based on operating conditions of the engine and vehicle, this step provides a second example criteria for selection of cylinder and valve modes, namely, fuel economy. By selecting the fewest number of active cylinders and valves, fuel economy is increased by improving cylinder efficiency and reducing electrical power consumption. However, alternative search schemes can be used by structuring the columns and rows of the matrix differently to emphasize other goals, or combinations of different goals.

In step 1810, row and column indexes are initialized each time the routine is executed and the routine stores the current row and column index if the mode matrix cell pointed to by the indexes contains a value of one. In this example, only one row and column index is stored at a time. The routine proceeds to step 1812 after the current mode matrix cell is evaluated.

In step 1812, the current column number, cols, is compared to the number of columns of the mode matrix, col_lim. If the currently indexed column is less than the total number of mode matrix columns the routine proceeds to step 1814. If the indexed column is not less than the total number of mode matrix columns the routine proceeds to step 1816.

In step 1814, the column index value is incremented. This allows the routine to search from column zero to column col_lim of each row. The routine then continues to step 1810.

In step 1816, the column index is reset to zero. This action allows the routine to evaluate every column of every row of the mode matrix if desired. The routine then proceeds to step 1818.

In step 1818, the current row number, rows, is compared to the number of rows of the mode matrix, row_lim. If the currently indexed row is less than the total number of mode matrix rows the routine proceeds to step 1820. If the indexed row is not less than the total number of mode matrix rows the routine proceeds to step 1822.

In step 1820, the row index value is incremented. This allows the routine to search from row zero to column row_lim of each row. The routine then continues to step 1810.

In step 1822, the routine determines the desired cylinder and valve mode. The last row and column indexes are output to the torque determination routine, FIG. 2, step 212. The row number corresponds to the desired cylinder mode and the column number corresponds to the desired valve mode. The routine then exits.

Referring to FIG. 19, a timing chart that illustrates alternating intake valve control is shown. The x-axis is designed to show two engine revolutions, or one cylinder firing cycle (combustion cycle) for a cylinder in four-stroke mode (although other strokes can be used). In this example, a cylinder with two intake valves (labeled "A" and "B") is controlled according to the timing diagram of FIG. 19. The position of intake valve A opens prior to the 360 degree crankshaft marking, and it does not open at the next 360 degree crankshaft marking, but it opens again at the following 360 degree crankshaft marking. In other words, the A valve opens every other combustion event, in the case where the engine is operating in a four-stroke mode, the cylinder firing every 720 degrees of crankshaft rotation, or every two revolutions. The second intake valve also opens at a 360 degree crankshaft marking too, but valve B opens 720 degrees out of phase with valve A. Also, this valve sequence is possible for both intake and/or exhaust valves. Alternatively, some cylinders of the engine can operate with alternating valves while others operate with the same single valve, or dual valves.

The (full or partial) alternating valve sequence can advantageously reduce valve wear, reduce exhaust valve temperature, and/or reduce power consumption. Further, the valve sequence can alter engine breathing characteristics, i.e., the amount of air inducted, when different length intake or exhaust manifold runners are available for the different intake and exhaust valves. The valve sequence is one of many sequences and operating patterns available for electromagnetically actuated valves and may be selected by the method of FIG. 10.

Referring to FIG. 20, a timing chart that illustrates an example of intake valve phasing control is described. A cylinder with two intake valves is controlled according to the timing diagram of FIG. 20. Intake valve A opens prior to each 360 degree crankshaft marking. On the other hand, valve B opens at the 360 degree crankshaft marking. The angular difference between the valve openings is a valve phase difference, and can be varied based on engine or vehicle operating conditions, including valve operating conditions. Further, the valve opening location, valve lift, and duration of each of valves A and B can also be adjusted based on these conditions. It is also possible to open valve A before valve B or to operate valve B before valve A based on engine speed and load, or other conditions, such as valve operating conditions. Thus, in some operating modes, valve A opens (or closes) before valve B, and in other modes (at other conditions, such as temperature, speed, load, catalyst storage amounts, etc.) valve B opens (or closes) before valve A.

Further, the amount of phasing can also be based on engine speed and load, or other conditions, such as valve operating conditions. Valve phasing has potential benefits for both intake and exhaust valves. For intake valves, valve phasing can increase charge motion at idle and lower engine speeds. This increased charge motion can be combined with a lean air-fuel mixture to reduce expelled engine hydrocarbons during a start, for example. Further, valve phasing can also alter intake breathing which may improve the signal to noise ratio of sensors that are used to estimate engine air amount, such as the manifold pressure sensor, and/or mass air flow sensor.

Exhaust valves may also be phased (e.g. opening phasing and/or closing phasing can be used, as with intake valves) to improve engine operation. For example, exhaust valve phasing offers the opportunity to reduce electrical power consumption. By opening a single valve followed by a second valve, as opposed to simultaneously opening two valves, during an exhaust stroke when cylinder pressures are elevated, less energy goes into opening the second exhaust valve. Alternatively, in some conditions, simultaneous opening and/or closing can be used. Further, combination of intake and exhaust phasing can be used, at least on some cylinders, if desired.

Intake and exhaust valve phasing may also be combined with cylinder grouping, multi-stroke, and alternating valves, and combinations and subcombinations thereof, to further enhance engine performance and fuel economy. Valve phasing is one of many sequences available for electromagnetically actuated valves and may be selected by the method of FIG. 10 by including it as an available valve mode, if desired.

Figure 21:
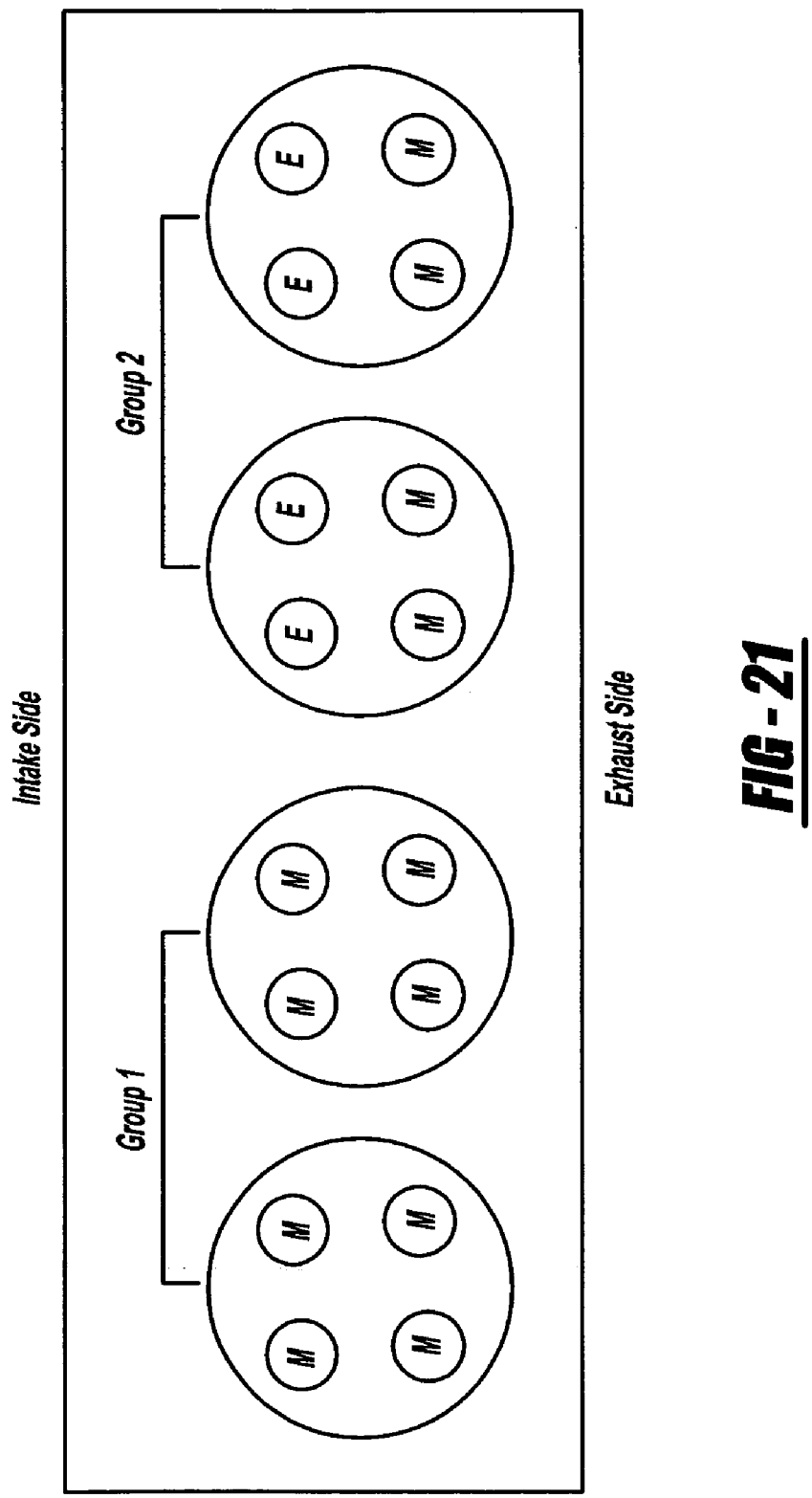

Referring to FIG. 21, a cylinder and valve configuration that offers flexible control options with reduced cost is shown. The M label designates a mechanical valve operated by a camshaft (optionally having hydraulically actuated variable cam timing) while the E designates an electromechanical valve. The figure shows two cylinder groups, one group with electromechanically actuated intake valves and the other group with mechanically actuated intake valves. It is also possible to configure group two with mechanical intake valves and electromechanical exhaust valves. Yet another configuration may be where one group of cylinders has one or more electromechanically actuated valves and the remaining valves in the engine are mechanically activated. This allows the cylinder groups to have different valve configurations for different objectives. For example, one cylinder group may operate with four valves while the other group operates with two valves. This allows the four valve cylinders to have a higher torque capacity during some conditions, such as speed and load conditions, and allows the engine to have multiple torque capacity amounts by selectively activating the electromechanically actuated valves.

By operating two cylinder groups with different valve configurations, engine fuel economy can also be increased. For example, a V10 engine with two cylinder banks can be configured with a mechanically actuated valve bank and either an electromechanically actuated or combination mechanical/electromechanically actuated valve bank. Cylinders in the electromechanical bank may be deactivated as desired without the cost of installing electromechanical valves in all cylinders.

Further, engine emissions may be improved in an exhaust configuration where catalyst bricks are located at different distances from cylinder heads. A bank of cylinders with electromechanically actuated valves can retard exhaust valve timing, thereby increasing heat for the cylinder bank where the catalyst bricks are located further away from the cylinder head. Consequently, the different cylinder banks can be configured based on engine design to improve emissions.

Referring now to FIG. 21A, an alternative configuration is shown with electrically actuated intake valves, and mechanically cam actuated exhaust valves (optionally with hydraulically actuated variable cam timing). Note that while two intake and two exhaust valves are shown, in yet another alternative embodiment, one electrically actuated intake, and one cam actuated exhaust valve can be used. Further, two electrically actuated intake valves, and one cam actuated exhaust valve can also be used.

Figure 22:
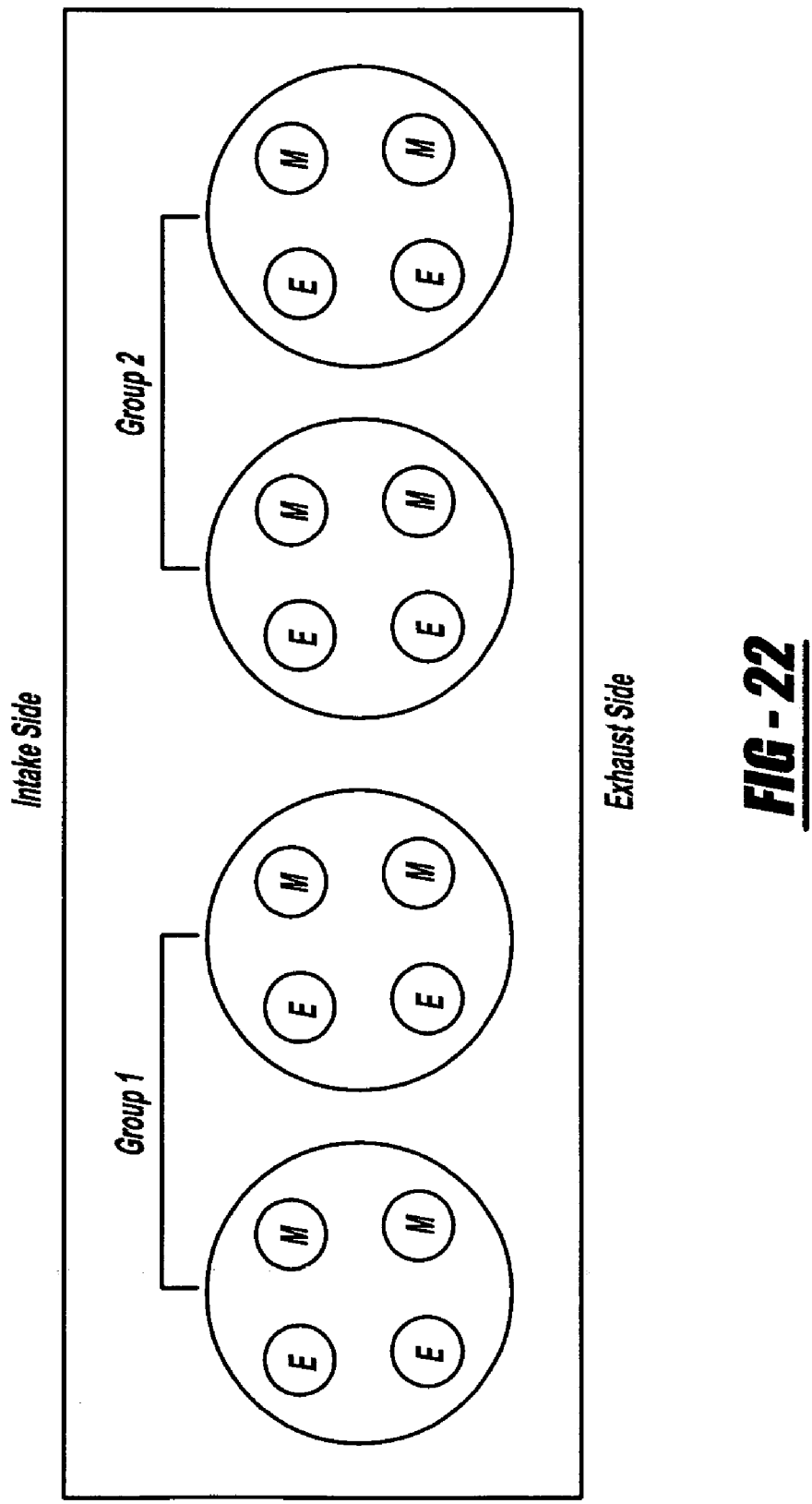
FIG. 22 is another mechanical/electromechanical valve and cylinder grouped configuration.

Referring to FIG. 22, an alternative grouped cylinder and valve configuration is shown. The configuration of FIG. 22 offers some of the same benefits as those described for FIG. 21, but all cylinders are shown with mechanical and electromechanically actuated valves. This configuration offers further control flexibility by allowing all cylinders to be mechanically controlled or by operating a mechanical group and a mechanical/electromechanical group. Placing the electromechanical valves and mechanical valves in different locations in the different cylinder groups can further alter this embodiment. For example, group one could be configured with electromechanical intake valves and mechanical exhaust valves while group two is configured with mechanical intake valves and electromechanical exhaust valves.

The cylinder and valve configurations of FIGS. 21, 21A, and 22 may be further altered by changing electromechanical valve locations for mechanical valve locations or by rearranging valve patterns. For example, one cylinder group arrangement may configure electromechanical intake and exhaust valves into a diagonal configuration that promotes cylinder charge swirl instead of the illustrated opposed valve configuration.

Figure 23:
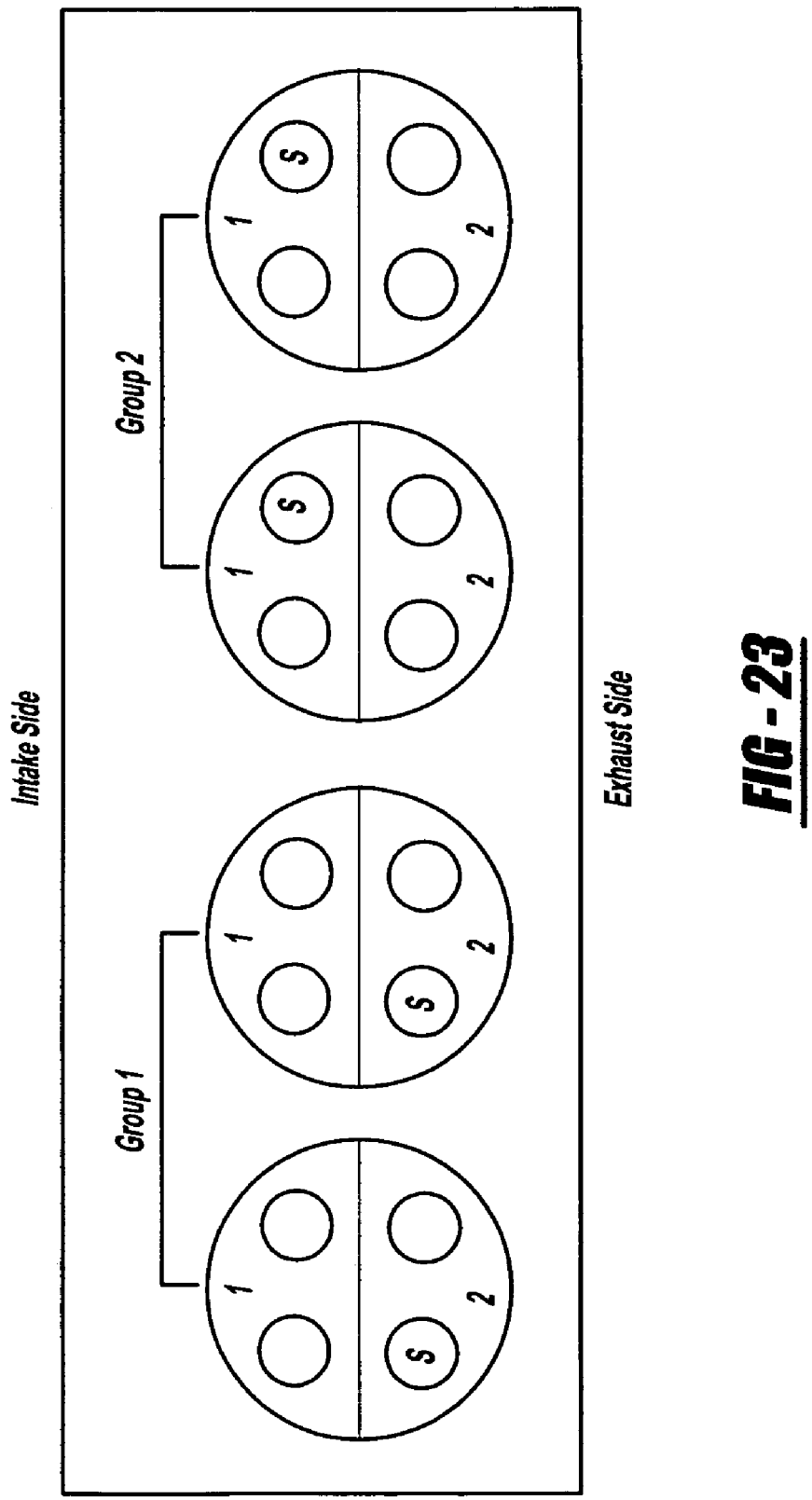
FIG. 23 is grouped cylinder and valve control configuration of selected valves.
Figure 24:
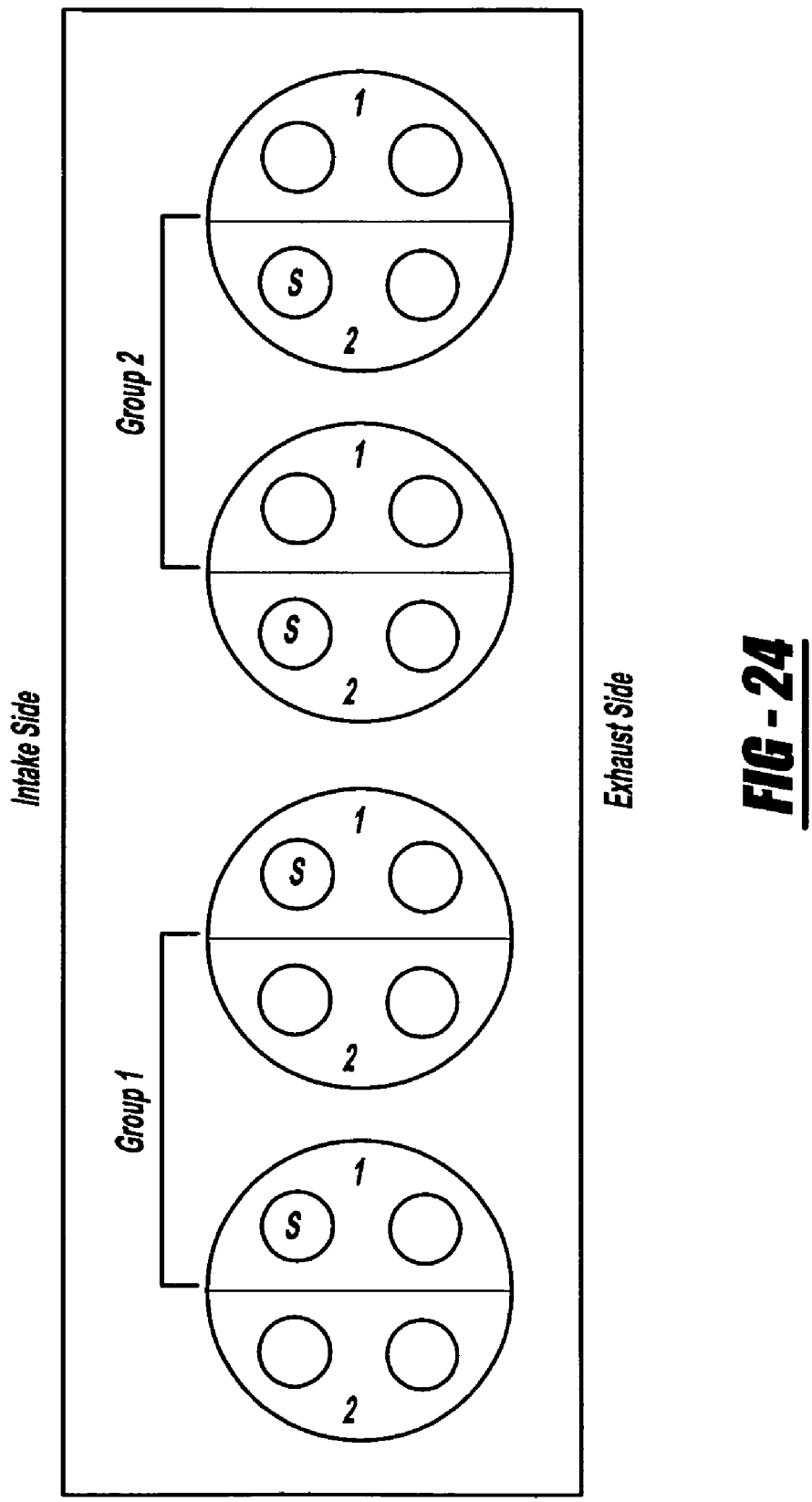
FIG. 24 is another cylinder and valve control configuration of selected valves.

Referring to FIGS. 23 and 24, additional embodiments of grouped cylinder and valve configurations are shown. The valve locations designated by an S, the selected valve, are operated during a cycle of the engine. Note that additional valves may be mechanically operated by a cam, in some examples. The cylinder and valve configurations shown divide the cylinder into two regions (between intake and exhaust valves in FIG. 23, and between groups of intake and exhaust valves in FIG. 24). Further, additional configurations can be used where the selected valve is in the same region but is not selected in the figure. These configurations can have at least some of the same benefits as the configurations as those described for FIGS. 21–22, for example.

Figure 25:
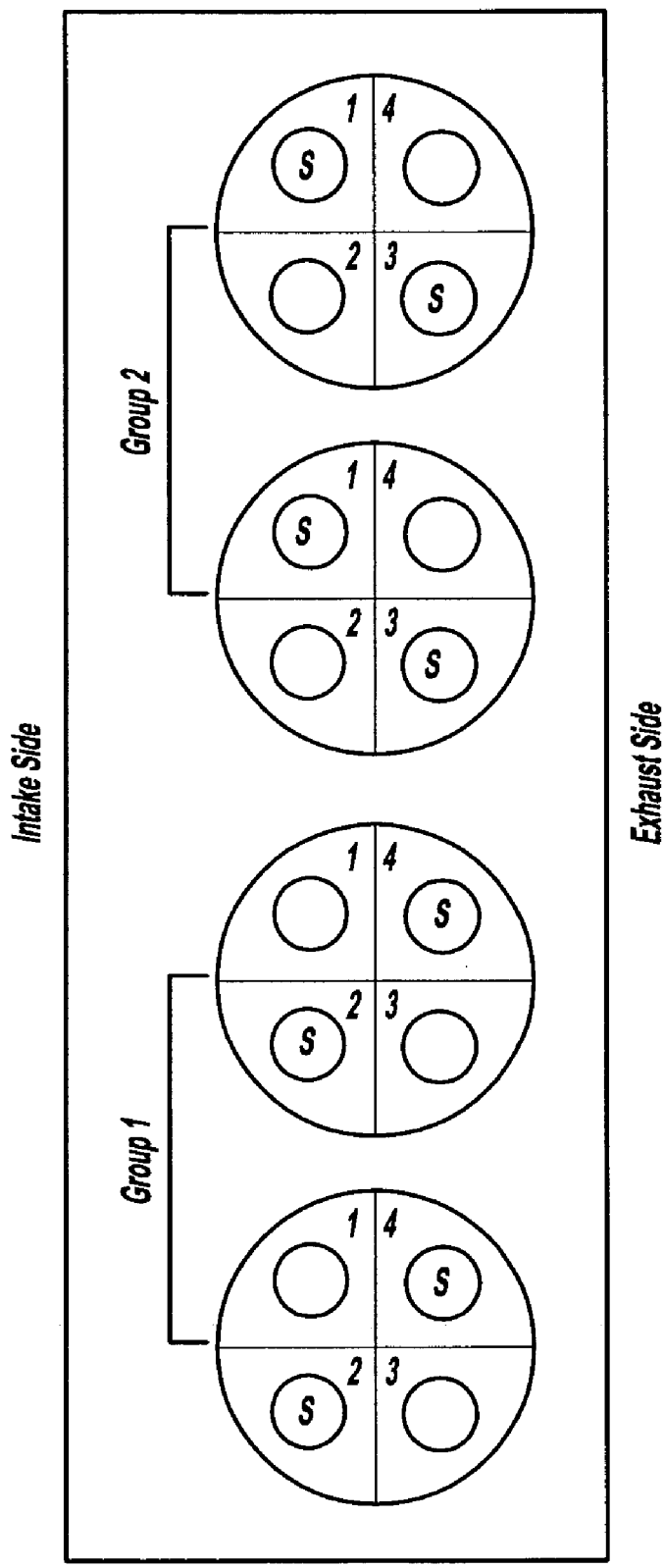
FIG. 25 is another cylinder and valve control configuration of selected valves.
Figure 26:
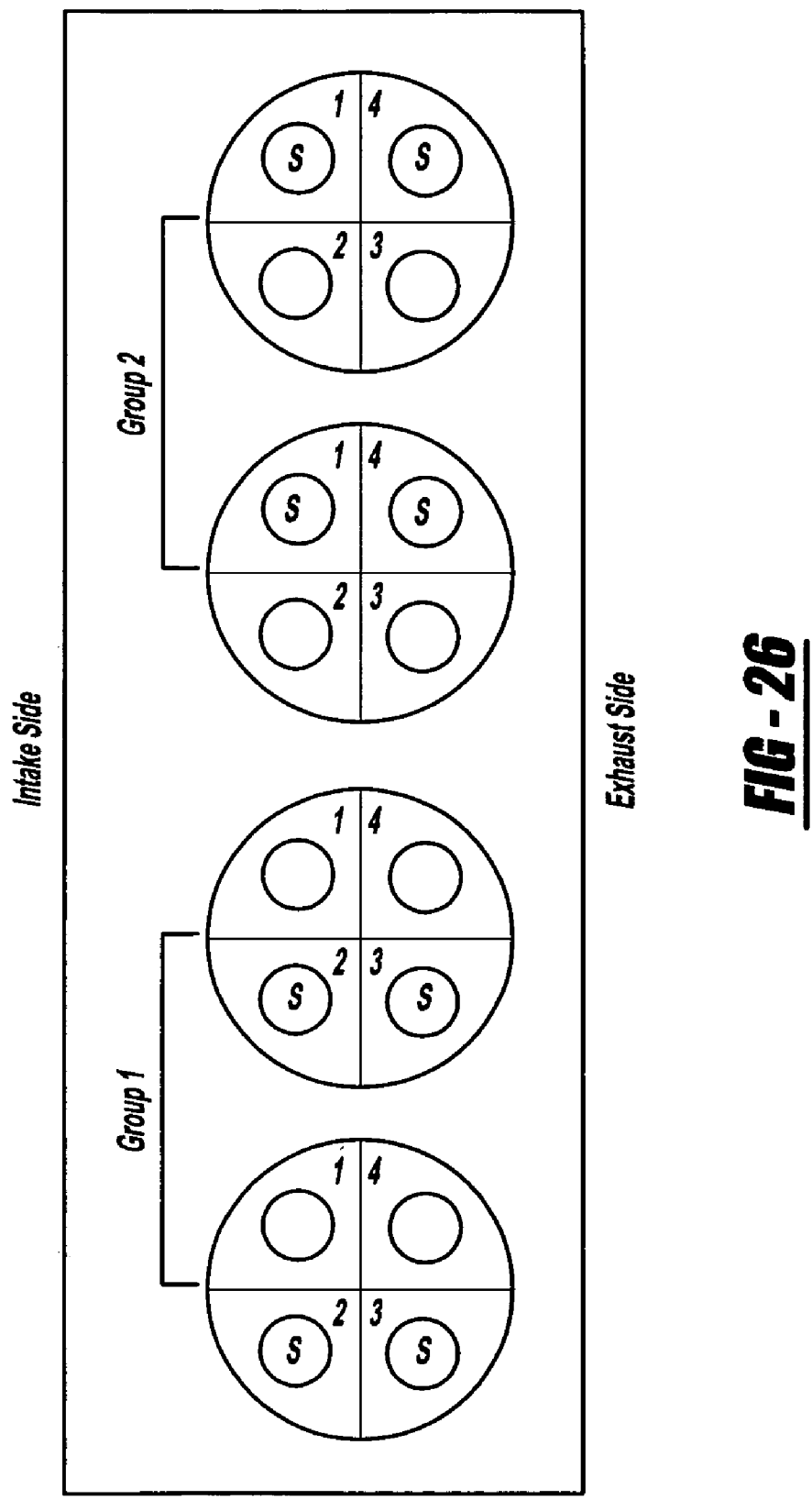
FIG. 26 is another cylinder and valve control configuration of selected valves.
Figure 27:
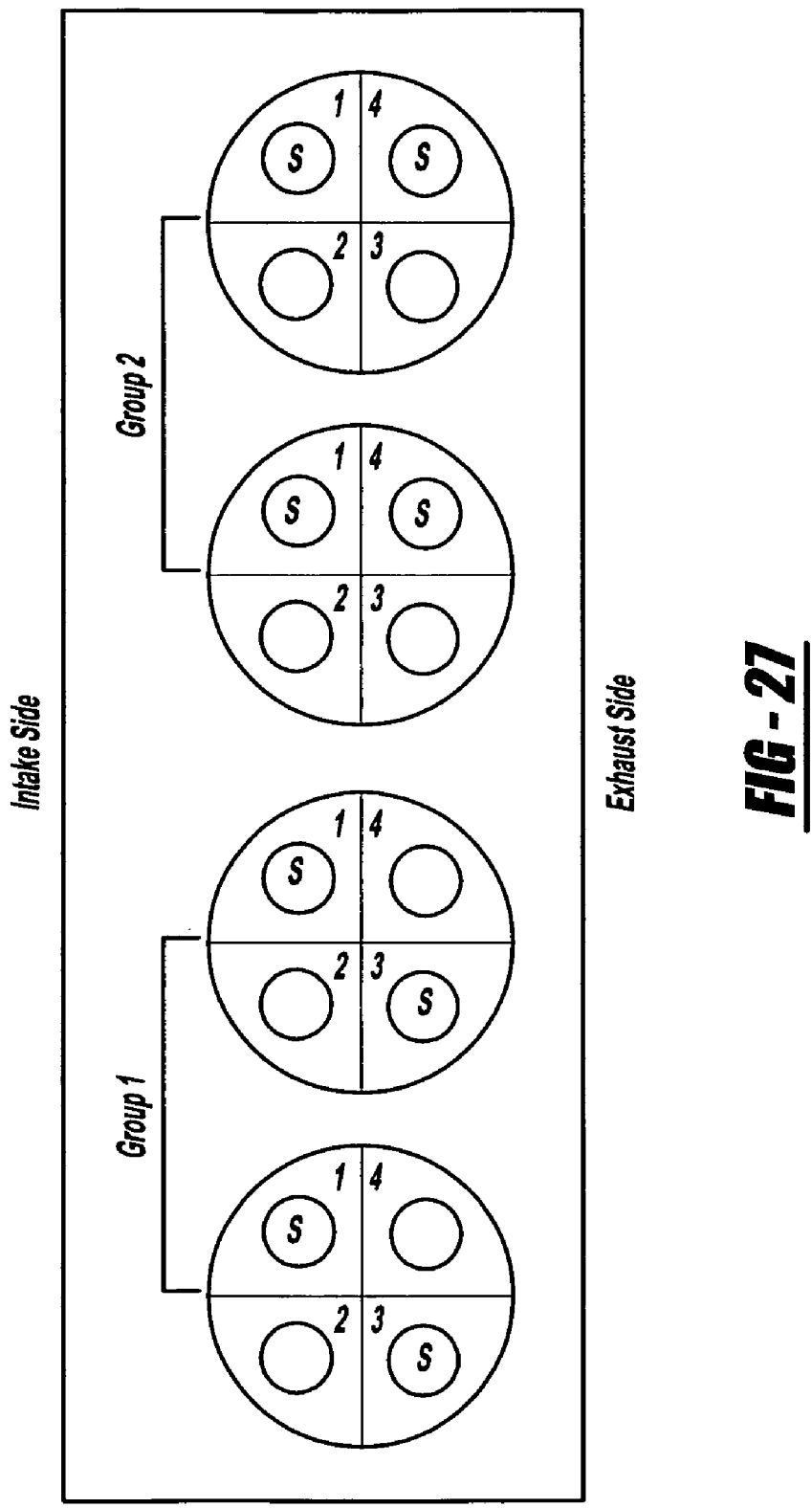
FIG. 27 is another cylinder and valve control configuration of selected valves.

Referring to FIGS. 25, 26 and 27, yet further embodiments of grouped cylinder and valve configurations are shown. The valve locations designated by an S, the selected valve, are operated during a cycle of the engine. The cylinder and valve configurations shown break the cylinder into four regions, each region having an electromagnetically actuated valve, regions 1 and 2 containing intake valves, and regions 3 and 4 containing exhaust valves. Further, additional configurations can be used where the selected valve is in an alternate region but is not selected in the figure. These configurations can have the same benefits as the configurations described for FIGS. 21–24, but the configurations can also offer more control flexibility. For example, multi-stroke, valve phase control, alternating valves, and combinations thereof, as described by FIGS. 19 and 20, can be implemented in grouped cylinder control. Further, the selected valve patterns can be altered to provide 2, 3, and 4 valve operation.

Figure 28:
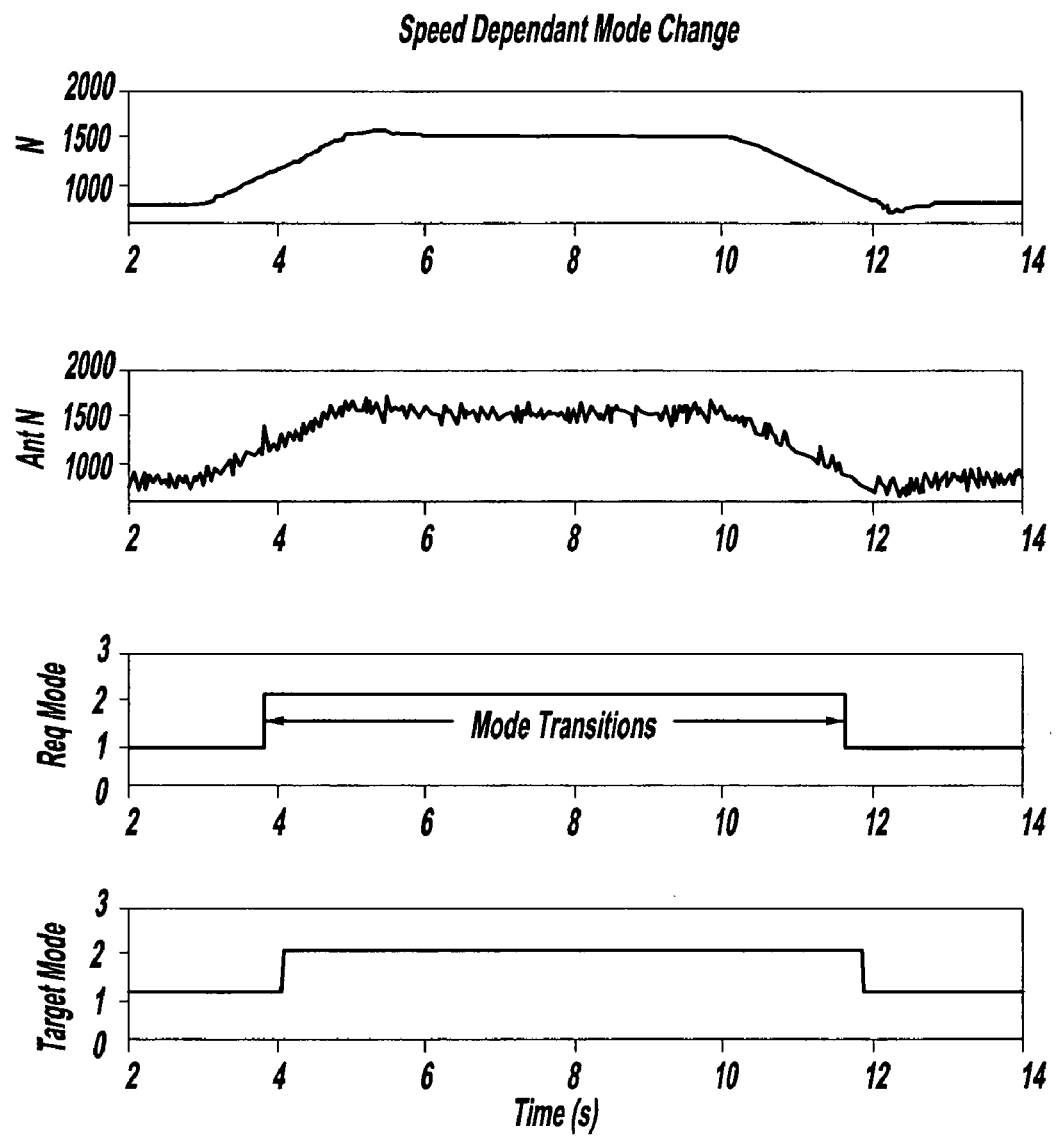
FIG. 28 is a plot of a speed dependent cylinder and valve mode transition.

Referring to FIG. 28, a plot of a speed dependent cylinder and valve mode change by the method of FIG. 10 is shown. The plot shows four separate plots of signals of interest during a speed dependent mode change. The top plot shows actual engine speed referenced to time. Engine speed starts at approximately 800 RPM and is ramped up to 1500 RPM then ramped back down to 800 RPM. The third plot of requested mode verses time shows speed dependent mode hysteresis. That is, a mode request is initiated at 1100 RPM for increasing engine speed and another mode request is initiated at 950 RPM for decreasing engine speed. The engine speed based cylinder and valve mode transition points for increasing and decreasing engine speed are calibrated as desired. The second plot from the top is a plot of anticipated engine speed. There is increased variation in the engine speed signal as compared to the top plot. This variation is due to the differentiation used in the anticipation algorithm. This signal is the basis for speed dependent mode changes. Anticipated engine speed leads the actual speed during accelerations and decelerations, allowing mode transitions to be executed before the actual engine speed reaches the predetermined cylinder and valve mode transition speed. The third and fourth plots from the top show the requested mode and the target mode. The requested mode leads the target mode. This lead time allows the transmission torque converter to begin slipping so that the torque disturbance of a cylinder and valve mode change is dampened in the vehicle driveline.

Figure 29:
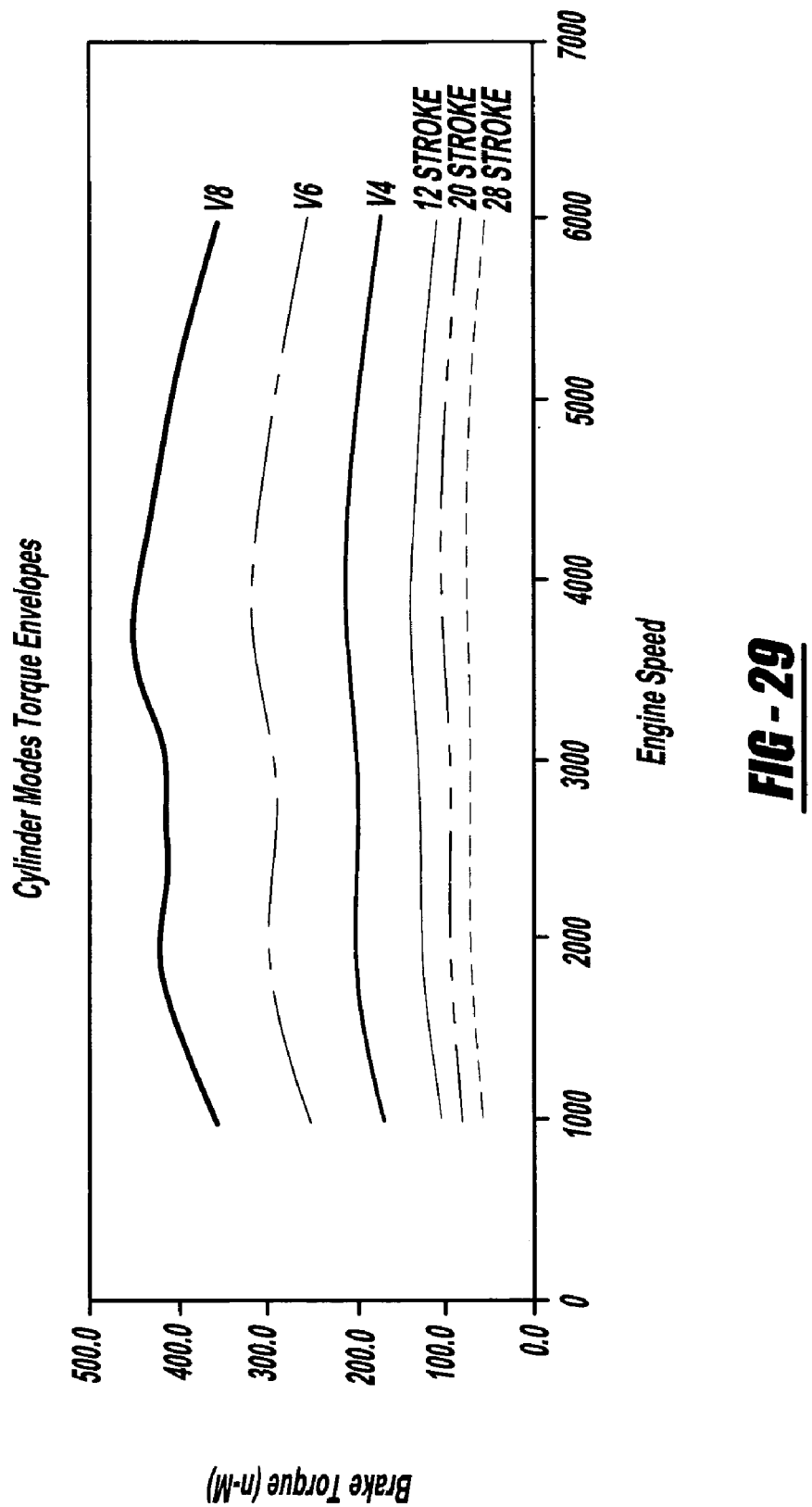
FIG. 29 is a plot that shows torque capacity of a V8 engine operating in a variety of cylinder modes.

Referring to FIG. 29, a plot shows engine torque capacity of a V8 engine operating in a variety of cylinder modes. The torque modes shown illustrate the different torque capacity of an engine as cylinders are deactivated and the number of cylinder strokes is increased. Further, additional torque capacities could be shown for specific valve modes. For example, two valve V8 operation would have a different torque capacity curve than four valve V8 operation. In one example, a strategy of mode transition is employed where a transition between modes is performed before the torque capacity of a given cylinder and valve mode is reached. By doing this, the driver can experience a more continuous torque progression through the various available modes.

Figure 30:
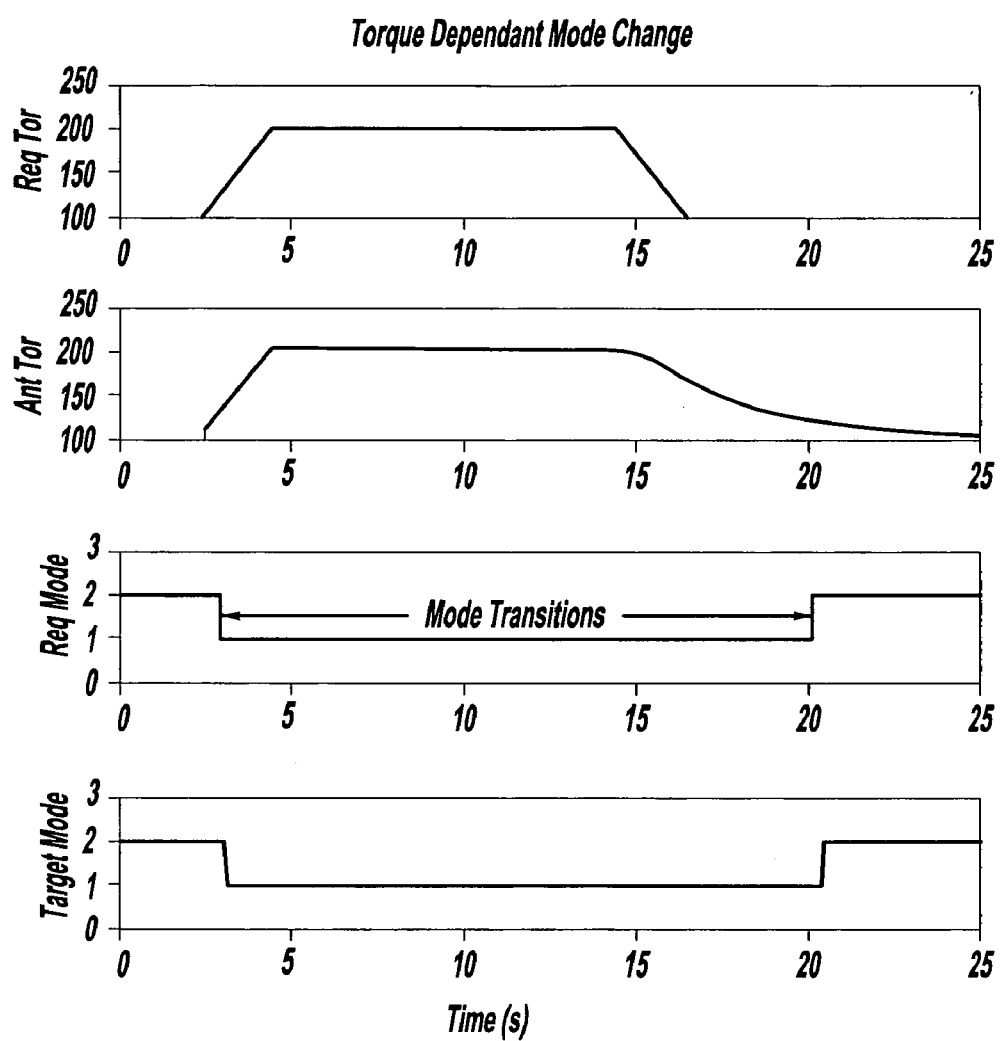
FIG. 30 is a plot of torque dependent cylinder and valve mode changes.

Referring to FIG. 30, a plot of a torque dependent cylinder and valve mode change by the method of FIG. 10 is shown. The Figure shows four separate plots of signals of interest during a torque dependent mode change. The top plot shows actual desired engine torque referenced to time. Engine torque starts at approximately 100 N-M and is ramped up to 200 N-M then ramped back down to 100 N-M. The third plot of requested mode verses time shows engine torque dependent mode hysteresis and filtering of desired torque. That is, a mode request is initiated at 130 N-M for increasing desired engine torque and another mode request is initiated at 110 N-M for decreasing desired engine torque that is also delayed in time. The engine torque cylinder and valve mode transition points for increasing and decreasing desired engine torque are calibrated as desired. The second plot from the top is a plot of anticipated and filtered desired engine torque (anticipated torque when desired torque increases and filtered torque when desired engine torque decreases). Notice, anticipated and filtered torque leads desired torque for increasing desired engine torque and lags, due to filtering, decreasing engine torque. The third and fourth plots from the top show the requested mode and the target mode. Notice, that the requested mode leads the target mode. Also, the requested mode transition during decreasing desired torque occurs long the after desired engine torque reaches 100 N-M. This lead time allows the transmission torque converter to begin slipping so that the torque disturbance of a cylinder and valve mode change is dampened in the vehicle driveline. The calibration of the filter time constant and the torque hysteresis allows the mode transition logic to avoid multiple mode transitions if the driver rapidly cycles the accelerator pedal 119.

Figure 31:
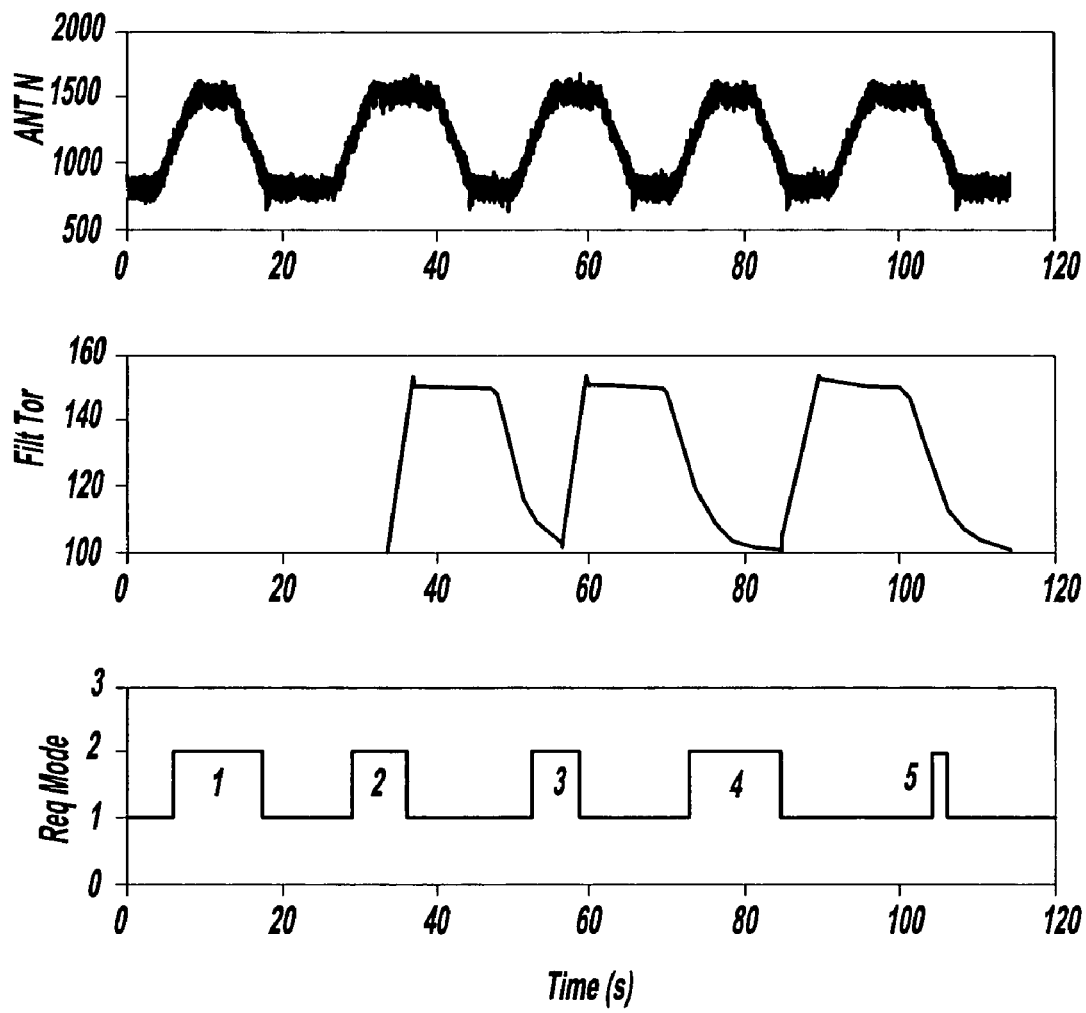
FIG. 31 is a plot of independent speed and torque based cylinder and valve mode changes.

Referring to FIG. 31, a plot of independent speed and torque based cylinder and valve mode changes initiated by the method of FIG. 10 is shown. The top plot shows anticipated engine speed while the second plot shows anticipated and filtered desired engine torque. The third plot from the top shows the actual desired mode change request. The first mode transition, labeled #1, is based on anticipated engine speed alone. The second, third, fourth, and fifth transitions are based on anticipated engine speed and desired anticipated filtered engine torque. The competing engine speed and torque requests are thus able to be handled by the mode selection approach.

While electromechanically actuated valves present various opportunities to increase fuel economy and engine performance, they can also improve engine starting, stopping, and emissions in other ways. FIG. 32 illustrates a method to improve engine starting by controlling intake and exhaust valves.

As one example, electromechanically actuated valves allow the ability to select the first cylinder to carry out combustion during a start. In one example, at least during some operating conditions, a consistent cylinder is selected for performing the first combustion, which can provide reduced emissions. In other words, when an engine is started on the same cylinder, at least during two subsequent starts under selected conditions, variation in the amount of fuel delivered into each cylinder during a start can be decreased. By beginning fuel injection in the same cylinder, unique fuel amounts can be repeatedly delivered into each cylinder. This is possible because fuel may be scheduled from the same reference point, i.e., the first cylinder selected to combust an air-fuel mixture. In general, because of packaging constraints, no two cylinders have identical intake ports in a multi cylinder engine. Consequently, each cylinder has a unique fuel requirement to produce a desired in cylinder air-fuel mixture. Fortunately, one example of the method described herein allows fuel injected into each individual cylinder to be tailored to each unique port geometry, port surface finish, and injector spray impact location, thereby, reducing air-fuel variation and engine emissions.

In another example, to reduce wear caused by repeatedly carrying out a first combustion, the cylinder selected for repeatedly carrying out the first combustion is varied. It can be varied based on various sets of operating conditions, such as a fixed number of starts, engine temperature, a combination thereof, or others. Thus, for a first number of starts, cylinder 1 is repeatedly used to start the engine. Then, for a second number of starts, another cylinder (e.g. a first available cylinder, or the same cylinder such as cylinder number 2) is repeatedly used to start the engine. Alternative, a different cylinder is selected based on engine or air temperature. In still another example, different cylinders for starting are selected based on barometric pressure (measured or estimated, or correlated to other parameters that are measured or estimated).

Referring to FIG. 32, in step 3210, the routine determines if a request to start the engine has been made. A request may be made by an ignition switch, a remotely transmitted signal, or by another subsystem, e.g., a voltage controller of a hybrid power system. If not, the routine exits. If so, the routine proceeds to step 3212.

In step 3212, all exhaust valves are closed. The valves may be simultaneously closed or may be closed in another order to reduce power supply current. Also, in an alternative embodiment, less than all of the exhaust valves can be closed. The closed valves remain closed until a combustion event has occurred in the respective cylinder of the valves. That is, the exhaust valve for a cylinder remains closed until a first combustion event has occurred in the cylinder. By closing the exhaust valve, residual hydrocarbons can be prevented from exiting the cylinder during engine cranking and run-up (a period between cranking and before achieving a substantially stable idle speed). This can reduce emitted hydrocarbons and thereby can reduce vehicle emissions. The routine then proceeds to step 3214.

In addition, intake valves may be set to a predetermined position, open or closed. Closing intake valves during cranking increases pumping work and starter motor current, but can trap hydrocarbons in a cylinder. Opening intake valves during cranking decreases pumping work and starter motor current, but may push hydrocarbons into the intake manifold. As such, various combinations of open and closed intake valves can be used for example. In another example, closed intake valves are used. And, in still another example, open intake valves are used. The descriptions of FIGS. 49–53 provide detailed explanations of additional valve sequencing embodiments that may be used to start an engine by the method of FIG. 32.

Alternatively, all exhaust valves may be set to an open position and the intake valves set to a closed position until engine position is established. Then exhaust valves in respective cylinders are closed at bottom-dead-center of piston travel and intake valves are operated based on a desired combustion order. The exhaust valves are operated after a first combustion event in the respective cylinders based on the desired engine cycle. Hydrocarbons are pumped out of a cylinder and then drawn back into the cylinder, being combusted in a subsequent cylinder cycle by this method. This can reduce emitted hydrocarbons when compared to mechanical four-stroke valve timing.

In step 3214, the engine is rotated and engine position is determined by evaluating the engine position sensor 118. A sensor that can quickly identify engine position can be used to reduce engine crank time and is therefore preferred. The routine then proceeds to step 3216.

In step 3216, engine indicated torque, spark advance and fuel are determined by the method of FIG. 10. The engine is started using a predefined desired engine brake torque, engine speed, spark advance, and Lambda. Lambda is defined as follows:

$$\text{Lambda}(\lambda) = \frac{\frac{Air}{Fuel}}{\frac{Air}{Fuel_{stoichiometry}}}$$

This is in contrast to conventional engines that are started by matching the fuel to an engine air amount estimate that is based on fixed valve timing. The method of FIG. 10 adjusts valve timing and spark angle to produce the desired torque and engine air amount. By adjusting the valve timing and/or lift to meet torque and air amount requirements during cranking and/or starting, the engine can be made to uniformly accelerate up to idle speed, start after start, whether at sea level or altitude. FIGS. 35 and 36 show example valve timing for producing uniform sea level and altitude engine starts.

Further, the method of FIG. 32 can reduce variation in the mass of air and fuel required to start an engine. Nearly the same torque can be produced (if desired) at altitude and sea level by adjusting valve timing, injecting an equal amount of fuel, and similar spark timing. Only small adjustments for altitude are made to compensate for fuel volatility and engine back pressure differences. The method continues on to step 3218.

Providing uniform engine starting speeds can also be extended to engine strategies that are not based on engine torque. For example, a predetermined target engine air amount may be scheduled based on a number of fueled cylinder events and/or engine operating conditions (e.g., engine temperature, ambient air temperature, desired torque amount, and barometric pressure). The method of step 222 uses the ideal gas law and cylinder volume at intake valve closing timing to determine the valve timing and duration. Next, fuel is injected based on the target engine air amount and is then combusted with the inducted air amount. Because the target engine air amount is uniform or nearly uniform between sea level and altitude, valve timing adjustments are made while the fuel amount remains nearly the same (e.g. within 10%). In another example, a target fuel amount based on the number of fueled cylinder events and/or engine operating conditions (e.g., engine temperature, ambient air temperature, catalyst temperature, or intake valve temperature) may also be used to start an engine. In this example, a cylinder air amount based on the target cylinder fuel amount is inducted by adjusting valve timing to achieve the desired air-fuel ratio. The desired air-fuel ratio (e.g., rich, lean, or stoichiometric) is then combusted to start the engine. In addition, spark advance may be adjusted based on the cylinder air amount, valve timing may be further adjusted based on ambient air temperature and pressure, and fuel may be directly injected or port injected using this starting method.

Note that while it may be desirable to provide uniform engine starting speeds under various conditions, there may be conditions in which other approaches are used. Further, it may be desired to provide a desired air amount during a start based on an operating condition of an engine by adjusting valve timing based on engine position and desired cylinder air amount, or a desired torque, etc., even if a consistent engine speed trajectory is not used.

In step 3218, the routine determines if combustion will be initiated in a predefined cylinder or in a cylinder that can complete a first intake stroke (e.g. a first available cylinder for combustion). If combustion is selected in a predefined cylinder the cylinder number is selected from a table or function that may be indexed by an engine operating condition or engine characteristic.

By selecting a cylinder to begin combustion, and by selecting the first combusting cylinder based on engine operating conditions, (start after start if desired) engine emissions can be improved. In one example, if a four-cylinder engine is started at 20° Celsius, cylinder number one may be selected to produce a first combustion event each time the engine is started at 20° Celsius. However, if the same engine is started at 40° Celsius, a different cylinder may be selected to produce a first combustion event, this cylinder may be selected each time the engine is started at 40° Celsius, or alternatively, a different cylinder may be selected depending on engine control objectives. Selecting a starting cylinder based on this strategy can reduce engine emissions. Specifically, fuel puddles are commonly created in intake ports of port fuel injection engines. The injected fuel can attach to the intake manifold walls after injection and the amount of fuel inducted can be influenced by intake manifold geometry, temperature, and fuel injector location. Since each cylinder can have a unique port geometry and injector location, different puddle masses can develop in different cylinders of the same engine. Further, fuel puddle mass and engine breathing characteristics may change between cylinders based on engine operating conditions. For example, cylinder number one of a four-cylinder engine may have a consistent fuel puddle at 20° Celsius, but the puddle mass of cylinder number four may be more consistent at 40° Celsius. This can occur because the fuel puddle may be affected by engine cooling passage locations (engine temperature), ambient air temperature, barometric pressure, and/or a characteristic of the engine (e.g., manifold geometry and injector location).

Also, the location and temperature of a catalyst may also be used to determine a first cylinder to combust. By considering the location and temperature of a catalyst during a start engine emissions can be reduced. For example, in an eight cylinder, two bank engine, it may be beneficial to produce a first combustion event in cylinder number four (bank one) for one of the above-mentioned reasons. On the other hand, after the engine is warm, it may be beneficial to start the same engine on cylinder number five (bank two) if the catalyst in bank two is located closer to cylinder number five, compared to the catalyst in bank one, relative to cylinder number four. The closer and possibly warmer catalyst in bank two may convert hydrocarbons, produced during a higher temperature start, more efficiently, compared to the catalyst in bank one.

In addition, engine hardware characteristics may also influence selection of a first cylinder to combust. For example, cylinder location relative to a motor mount, and/or oxygen sensor location may be factors at one set of engine operating conditions and may not be used as factors at a different set of engine operating conditions. This strategy may be used if a cylinder selected for a first combustion event reduces engine noise and vibration at a lower temperature, but another cylinder has improved characteristics at a different temperature.

Also, the amount of lost fuel, fuel that is injected into a cold engine but not observed in exhaust gases due to fuel puddles and migration into the crankcase, can change each time a cylinder combusts due to cylinder ring expansion. Further, the amount of lost fuel in a specific cylinder may change depending on the engine operating conditions. Therefore, it can be beneficial to select one cylinder for a first combustion event based on one set of engine operating conditions, and to select a different cylinder for a first combustion event based on a second set of operating conditions. Then, individual fuel amounts can be delivered to individual cylinders, in the same order, starting with the first cylinder to combust, such that fuel amount variability may be reduced. Thus, the same fuel amount can be injected into the same cylinder that has nearly the same (such as within 1%, within 5%, or within 10%) puddle mass, start after start.

Thus, it may be beneficial to select and/or change a first cylinder to combust, during a start, based on engine operating conditions and/or engine characteristics.

Note that combustion can also be started in multiple cylinders, if desired.

Also, in an engine of "I" configuration, i.e., I4 or I6, selecting a predetermined cylinder located closest to the flywheel or near the center of the engine block can reduce torsional vibration created by crankshaft twist during a start, at least under some conditions. Crankshaft twist is a momentary angular offset between the crankshaft ends that may occur during a start due to engine acceleration. Generally, the first cylinder to fire inducts a high air charge in an effort to accelerate the engine from crank to run speed, thereby producing a large acceleration. If an engine is started on a cylinder that is furthest from the location of the engine load, i.e., the flywheel, the crankshaft may twist due to the force exerted on the crankshaft by the piston and the distance from the combusting cylinder to the load. Therefore, selecting a predetermined cylinder that is located closest to the engine load or that has more support, i.e., a location central to the engine block, can reduce engine vibration during a start. And, by selecting a cylinder to start an engine on that reduces vibration, customer satisfaction may be improved.

However, selecting a predetermined cylinder closest to the flywheel in which to carry out a first combustion event may increase engine crank time given a conventional mechanically constrained valve train. Nevertheless, an engine with electromechanical valves is not mechanically constrained. Rather, engine valve timing can be adjusted to create an intake stroke on the first cylinder, closest to the engine flywheel, where the piston is capable of producing a vacuum in the cylinder. For example, this can be the cylinder closest to the flywheel with a downward moving piston where sufficient vacuum is created to pull the injected fuel into the cylinder, enabling an engine output to be produced. Subsequent combustion can then proceed based on conventional four-stroke valve timing.

Thus, in one example, after processing a signal indicative of an engine start (or engine position), the routine sets an intake stroke on the first cylinder with sufficient piston downward movement to produce an engine output (e.g., engine torque, or a desired cylinder charge). Once this is set, the remaining cylinders can have their respective valve timings positioned relative to the set intake stroke of said cylinder. Then, the first combustion can be carried out in the first cylinder with sufficient piston downward movement, and subsequent combustion can be carried out in the remaining cylinder based on the position valve timings in the selected firing order.

Returning to FIG. 32, if combustion is desired in a predefined cylinder the routine proceeds to step 3222. If combustion in a predefined cylinder is not desired the routine proceeds to step 3220.

In step 3220, the routine determines which cylinder can capture or trap the desired cylinder air amount first. The position of a piston and its direction of motion, up (traveling toward the cylinder head) or down (traveling away from the cylinder head) can also factor into this determination, as indicated below in the description of FIG. 54. By selecting a cylinder that is capable of first capturing the desired cylinder air amount, starting time can be reduced. Alternatively, selecting a cylinder capable of a first combustion event may also reduce engine starting time. However, engine starting speed and emissions variability can be affected. The type of fuel injection can also affect the cylinder selection process. Port fueled engines rely on an intake stroke to induct fuel and air into a cylinder. However, late intake valve closing is also possible but inducting the desired cylinder fuel amount can be more difficult. Therefore, selecting a cylinder for a first combustion event, for a port injected engine, can be defined by a capacity of a cylinder to induct both air and fuel.

On the other hand, direct injection engines inject fuel directly into the cylinder providing an opportunity to combust fuel with air that is trapped by closing the intake and exhaust valves. Given a sufficient trapped volume of air, an intake cycle of the valves may not be necessary to facilitate combustion in a cylinder because air trapped in the cylinder can be mixed with fuel that is directly injected into the cylinder. Therefore, engine valve timing can be adjusted based on engine position to facilitate combustion in the first cylinder, nearest the flywheel, capable of capturing and compressing a desired air amount.

In addition, engines commonly have two pistons that are in the same cylinder position, relative to one another. Combustion in the cylinders can be defined by selecting the appropriate valve timing for the respective cylinders. Since electromechanical valves can be operated without regard to crankshaft position, an engine control strategy can select which of the two cylinders will combust first by applying the appropriate valve timing. Therefore, in step 3220, the strategy selects a cylinder based on its ability to capture a desired cylinder air amount and then sets the appropriate valve timing between competing cylinders. For example, a four-cylinder engine with pistons in cylinders 1 and 4 in position to complete a first induction stroke, cylinder 1 is selected to produce a first combustion event. In addition, example criteria to select one of two cylinders competing for a first combustion event include cylinder position, starting noise and vibration, and cylinder air-fuel maldistribution. For example, in a four-cylinder engine, cylinder number four is located closest to the engine flywheel. The crankshaft may experience less twist during a start if cylinder four fires before cylinder one. This may reduce engine noise and vibration during a start. In another example, a certain cylinder may be located closer to engine mounts. The proximity of a cylinder to engine mounts may also influence which cylinder to select for a first combustion event. In yet another example, manufacturing processes and/or design limitations may affect air-fuel distribution in cylinders of an engine. Selecting a cylinder based on engine characteristics may improve air-fuel control during a start. The routine continues on to step 3222.

In step 3222, fuel is injected based on engine position and desired torque, spark, and Lambda from step 3216 above. In the method of FIG. 32, fuel can be injected on open or closed valves, delivered to all cylinders at the same time, or be delivered to individual cylinders in individual amounts. However, in one example, fuel is preferentially injected on an individual cylinder basis so that the fuel amount can be tailored to a cylinder event. The period of the cylinder event signal is the crank angle duration wherein a cycle of a cylinder repeats, in the case of a four-stroke cylinder cycle a cylinder event in degrees is: 720/number of engine cylinders.

In one example, fuel is injected based on the number of fueled cylinder events and controlled individual cylinder air amounts are used to improve engine air-fuel control. By controlling individual cylinder event air amounts and counting the number of fueled cylinder events, then delivering the amount of fuel based on the number of fueled cylinder events counted and cylinder event air amounts, engine starting can be improved. In other words, since engine air amount can be controlled during a start and since the amount of fuel to achieve a desired air-fuel ratio changes based on the number of fueled cylinder events, fuel delivery based on the number of cylinder events and individual cylinder air amounts can improve engine air-fuel control. Consequently, fueling based on fueled cylinder events and controlling individual cylinder air amounts can be used to lower engine emissions and to provide uniform engine run-up speed during starting.

Furthermore, engine fuel requirements can be a function of the number of fueled cylinder events rather than solely based on time. Cylinder events can be associated with mechanical dimensions; time is a continuum, which lacks spatial dimensions and linkage to the physical engine. Therefore, engine fueling based on the number of fueled cylinder events can reduce the fuel variation associated with time based fueling.

Typically, the amount of fuel injected in step 3222 produces a lean mixture during cold starts. This can reduce hydrocarbons and catalyst light off time. However, the amount of fuel injected may also produce a stoichiometric or rich mixture. The routine proceeds to step 3224.

In step 3224, the valves are operated starting with setting the stroke (intake) of the cylinder selected to produce a first combustion event. Alternately, another stroke (exhaust, power, compression) may be set in the first cylinder selected to combust. Depending on the valve train configuration (e.g., full electromechanical or a mechanical/electromechanical hybrid), and the control objectives (e.g., reduced emissions or reduced pumping work, etc.), valves are sequenced based on a predetermined order of combustion, see FIGS. 33–34 and 49–53 for example. Typically, during starting, all cylinders are operated in a four-stroke mode to reduce engine emissions and catalyst light off time. However, multi-stroke or a fraction of the total cylinders may also be used during starting. The routine proceeds to exit.

Figure 33B:
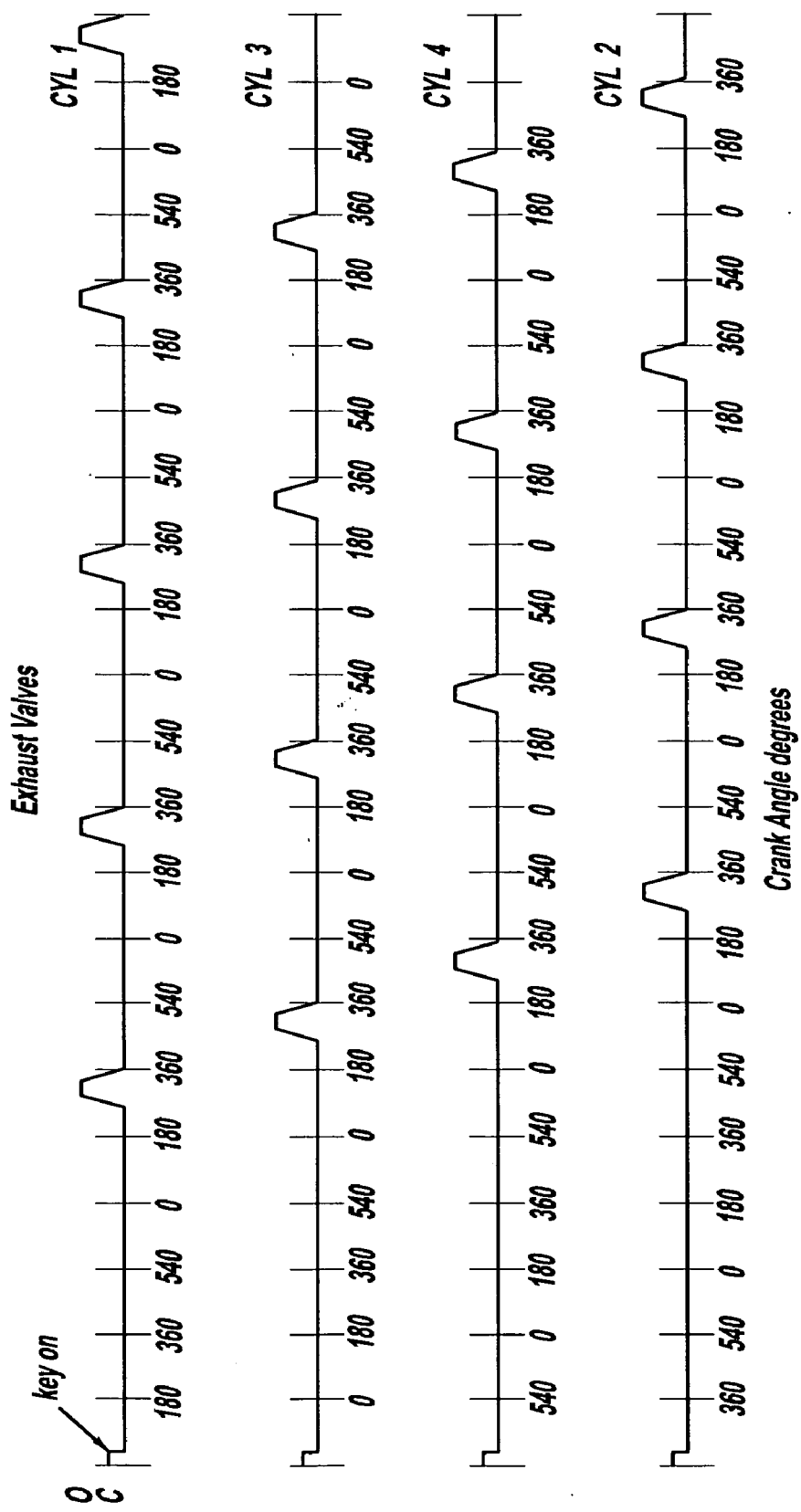
FIG. 33$a$ is a plot that shows representative intake valve timing at a relatively constant desired torque.

FIGS. 33*a* and 33*b* are plots that show representative intake and exhaust valve timing at a relatively constant desired torque, spark, and Lambda for a four-cylinder engine operated in four-stroke mode by the method of FIG. 32. Valve opening and closing positions are identified by a legend on the left side of the valve sequences, O for open and C for closed.

At key on, or at an operator generated signal indicative of a request to start the engine, electromechanically controlled intake and exhaust valves are set to a closed position from the deactivated mid position. Alternatively, intake valves may also be set to an open position in respective cylinders until the onset of a first intake event to reduce cranking torque and starter current. In this illustration, cylinder 1 is the cylinder selected for a first combustion event, but cylinder 3 or 2 may be selected if a quicker start is desired. Once the first cylinder for combustion is selected and the first induction event occurs, the remaining cylinders follow with four-cylinder, four-stroke, engine valve timing, i.e., 1-3-4-2.

In the sequence, exhaust valves are set to a closed position and remain in a closed position until a combustion event has occurred in the respective cylinder. The exhaust valves begin operation at the shown exhaust valve timing thereafter. By closing exhaust valves until combustion has occurred in a cylinder, hydrocarbons from engine oil and residual fuel are captured in the cylinder and combusted in the first combustion event. In this way, the amount of raw hydrocarbons expelled into the exhaust system can be reduced. Further, the combusted hydrocarbons can provide additional energy to start the engine and warm a catalyst.

In addition, cylinders with mechanical valve deactivators may deactivate exhaust or intake valves in a similar manner to produce similar results.

Figure 34A:
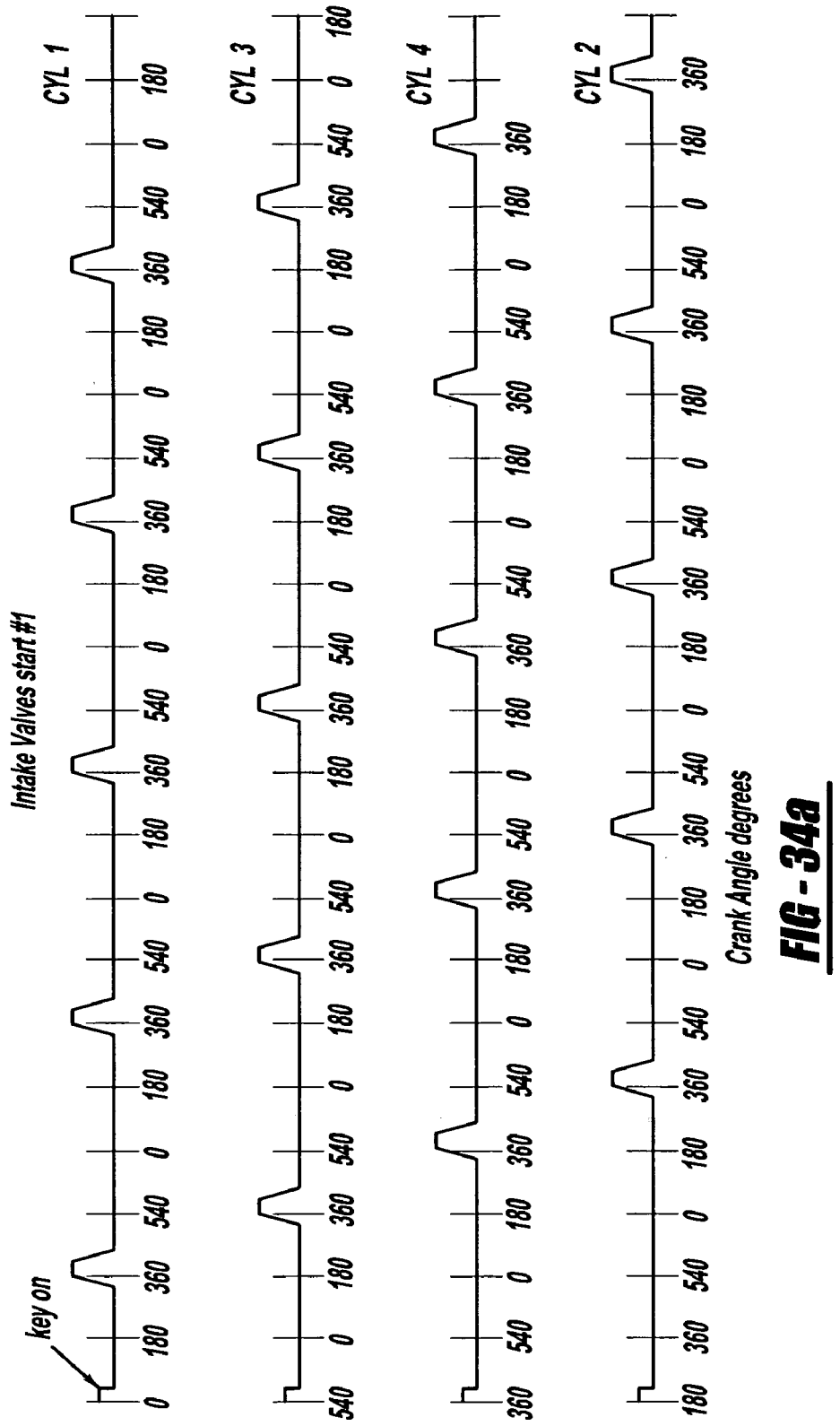
FIG. 34$a$ is a plot that shows representative intake valve timing for the first of two different engine starts.
Figure 34B:
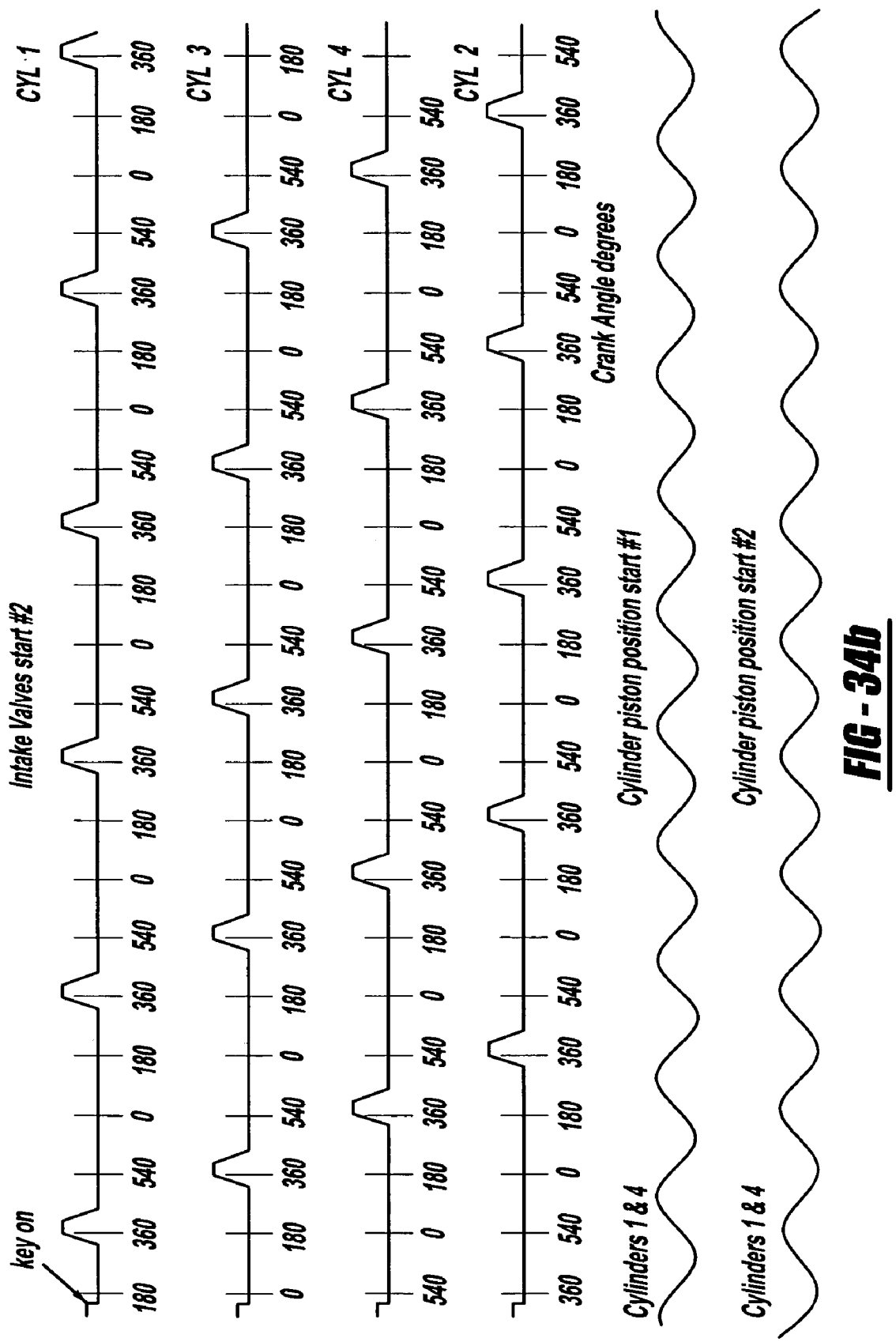

FIGS. 34*a* and 34*b*, are plots that show representative intake valve timing for two engine starts, at different engine positions, of a four-cylinder engine by the method of FIG. 32. Cylinder 1 is selected as the starting cylinder and the engine is started at a substantially constant desired torque, spark, and Lambda (although in alternative examples, these can be variable). Valve opening and closing positions are identified by a legend on the left side of the valve sequences, O for open and C for closed.

At key on, intake and exhaust valves are set to a closed position from the deactivated mid position. Alternatively, intake valves may also be set to an open position in respective cylinders until the onset of a first intake event to reduce cranking torque and starter current. From top to bottom, the first four valve timing events are for start #1, the second four valve timing events are for start #2, cylinder position is shown for start #1, and cylinder position is shown for start #2.

The figure shows an engine stop position for start #1 that is approximately 50 degrees after top dead center of cylinders 1 and 4. Also, the plot of cylinder 1 shows from piston position that the piston is already partially through its downward stroke motion. Key on occurs at this point, and fuel could be injected at this point on an open valve so that the mixture would then be compressed and combusted as the piston travels up in the following stroke. However, engine cranking speed at this point may be low because of engine inertia and friction which may lead to poor fuel atomization and combustion. Therefore, the engine controller, in this example, waits to open the intake valve until an entire intake stroke of cylinder 1 can be completed, roughly 280 engine crank angle degrees. The remaining cylinder valve events follow cylinder 1 in the combustion order illustrated.

On the other hand, the first valve event of start #2 is approximately 180 degrees after key on. The valve event occurs earlier because the engine stop position permits a full intake stroke in cylinder #1 earlier than the engine stop position of start #1.

Start #2 also shows how to align valve timing for a strategy that selects a cylinder for a first combustion event based on a cylinder that can complete a first full induction stroke. Cylinders 1 and 4 are the first cylinders capable of a full intake stroke because of the engine stop position. Pistons 2 and 3 are 180 degrees out of phase with pistons 1 and 4 and are therefore partially through a downward stroke in the engine stop position.

Valve timing can be adjusted for direct injection (DI) engines using the same principles. For example, fuel is injected into a cylinder of a DI engine. Further, a cylinder that is selected for a first combustion event could also be based on piston position and direction of movement. Then the intake valve timing of the first cylinder can be adjusted to achieve a desired torque. However, fuel injection is not constrained in a DI by valve timing. Therefore, the desired engine air amount may be obtained by adjusting valve timing to open the intake valve before or after bottom dead center of an intake stroke.

Figure 35A:
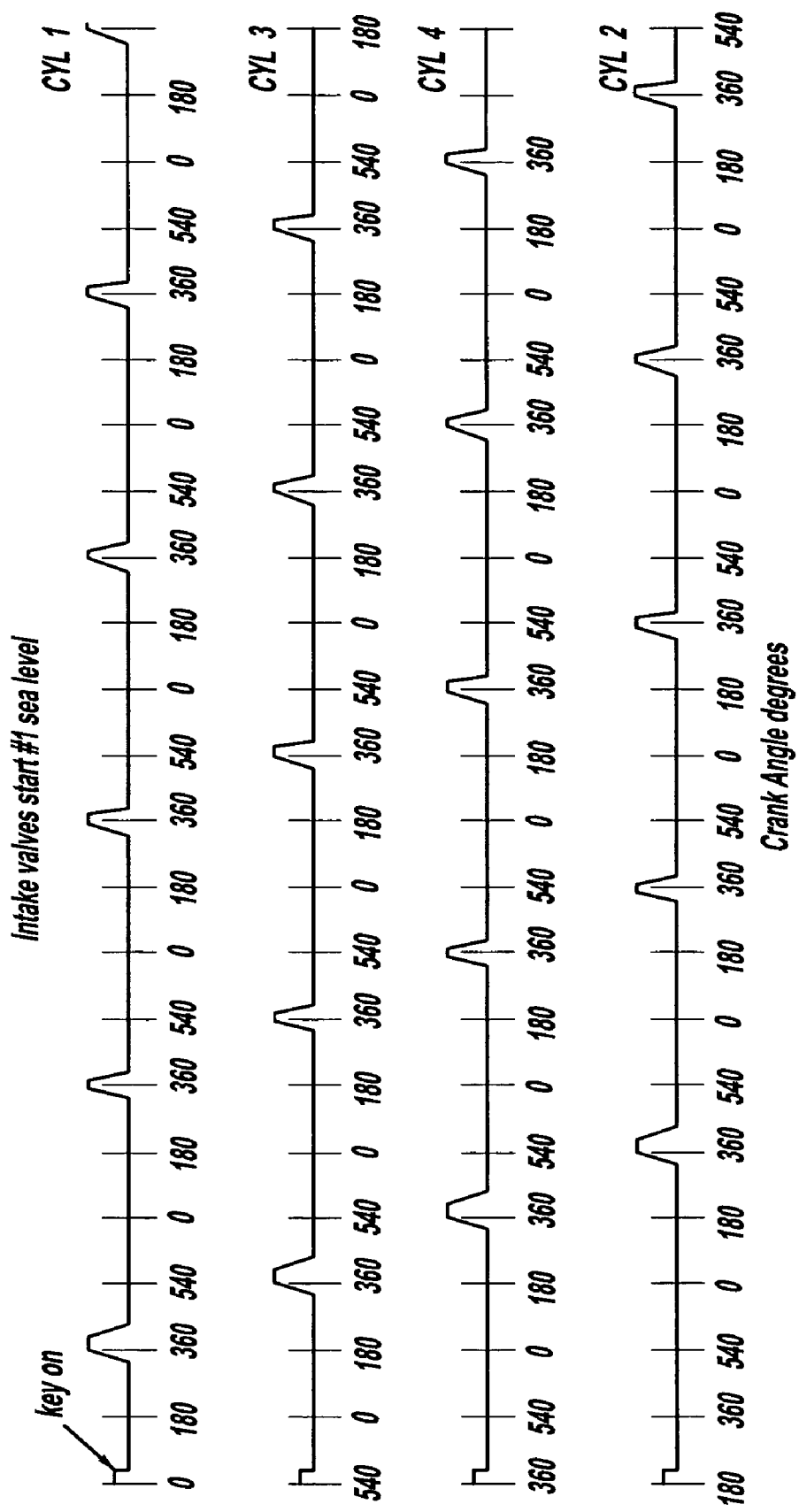
FIG. 35$a$ is a plot of representative intake valve timing during a start at sea level by the method of FIG. 32.
Figure 35B:
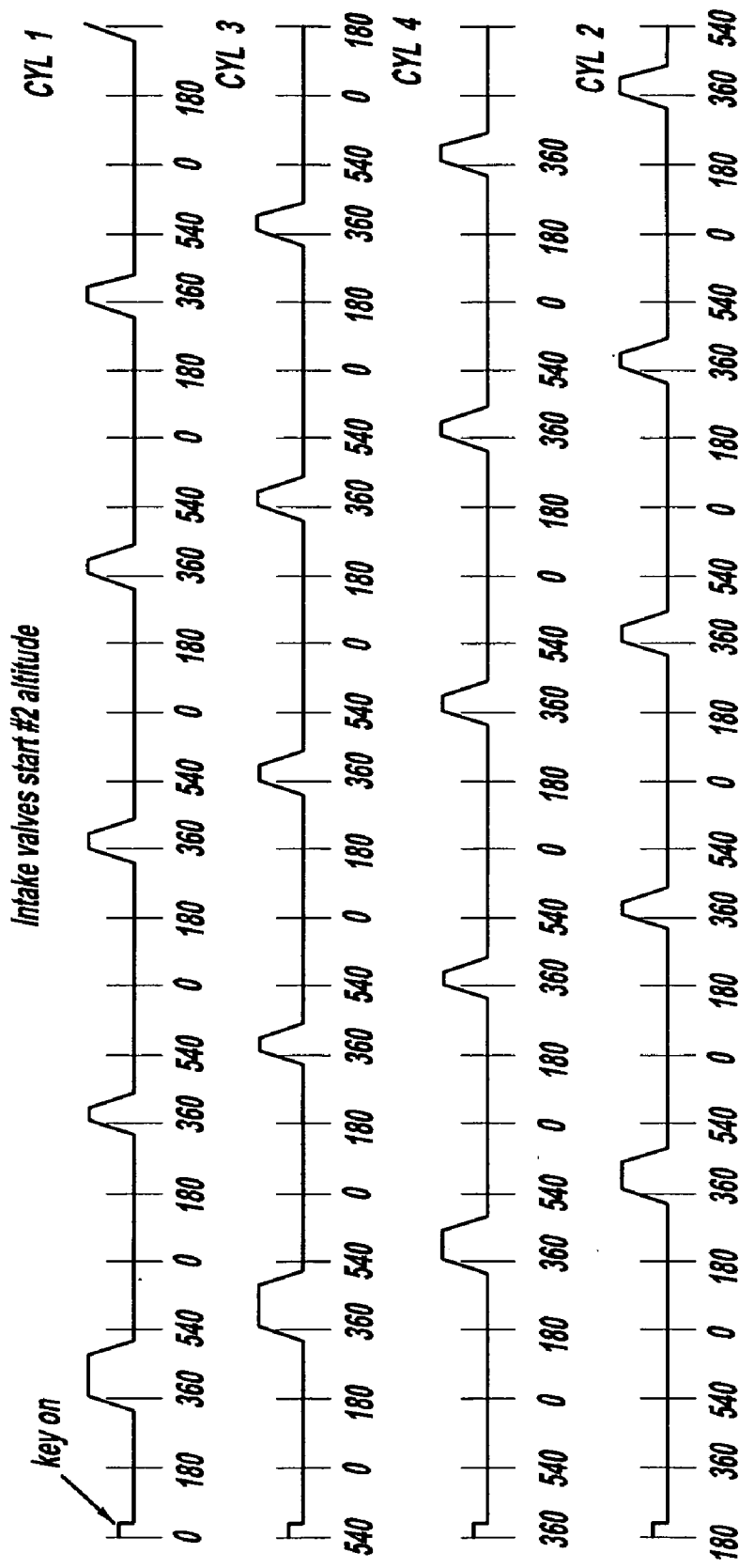

FIGS. 35a and 35b are plots of representative intake valve timing during an engine start at sea level and a plot that shows representative intake valve timing during an engine start at altitude by the method of FIG. 32. For simplicity of explanation, both starts begin at the same engine starting position and represent valve timing that follows a desired torque request that is used for both altitude and sea level. Substantially the same torque request is scheduled for altitude and sea level so that the fuel delivery remains nearly constant between altitude and sea level. However, as noted above, different torque requests could also be used, if desired.

In contrast, a conventional engine adjusts the amount of fuel delivered based on an engine air amount, which differs between sea level and altitude due to variations in barometric pressure. This may result in different starting torque between sea level and altitude starts, resulting in different starting speeds between altitude and sea level. The change in engine speed and in the amount of fuel injected can then lead to air-fuel and emissions differences between sea level and altitude.

By adjusting valve timing as shown in FIG. 35 so that engine torque and air amount is nearly the same between altitude and sea level (e.g., within 1%, 5%, or 10%), variation of air-fuel ratio and engine emissions between altitude and sea level are reduced. And while previous hydraulic VCT systems were able to adjust valve timing, these actuators typically were not functional during a start (since there was little to no hydraulic pressure available). Thus by using electric valves, improved starting can be obtained.

The engine start #1 of FIG. 35a is at sea level and begins with a longer valve event so that the engine will accelerate quickly from crank. The subsequent valve events are shorter as engine friction decreases and less torque is necessary to bring the engine up to idle speed. After the first four events, the valve duration remains substantially constant reflecting a substantially constant torque demand (although if torque demand changed, the durations could change, for example). Also, in one alternative, the valve opening durations can begin to decrease after the first event. Alternatively, decreasing valve duration may be carried out over a fewer or greater number of cylinder events. Further, the engine desired torque might change due to cold start spark retard or from combusting lean air-fuel mixtures.

The engine start #2 is at altitude and begins with a longer valve event, when compared to the sea level valve event, so that the engine will accelerate at approximately the same rate from crank. The subsequent valve events are longer than the corresponding sea level valve events, but shorter than the initial valve event for the above-mentioned reasons.

Referring to FIG. 36, a plot representative of cylinder #1 valve events at altitude and sea level along with representative desired torque request and engine speed trajectories is shown. The plot shows example engine starting differences between starting at sea level and altitude, while obtaining a uniform engine speed with little over-shoot that remains steady after idle speed is reached. Maintaining these engine speed and torque trajectories between altitude and sea level can reduce air-fuel variability and emissions. Further, the driver experiences more consistent engine performance during a start, and therefore customer satisfaction can be improved.

Also, valve timing can be adjusted for direct injection (DI) engines using the same principles. For example, fuel can be injected into a cylinder of a DI engine based on piston position and direction of movement, after valve timing has been adjusted to achieve a desired torque at the present altitude.

Figure 37:
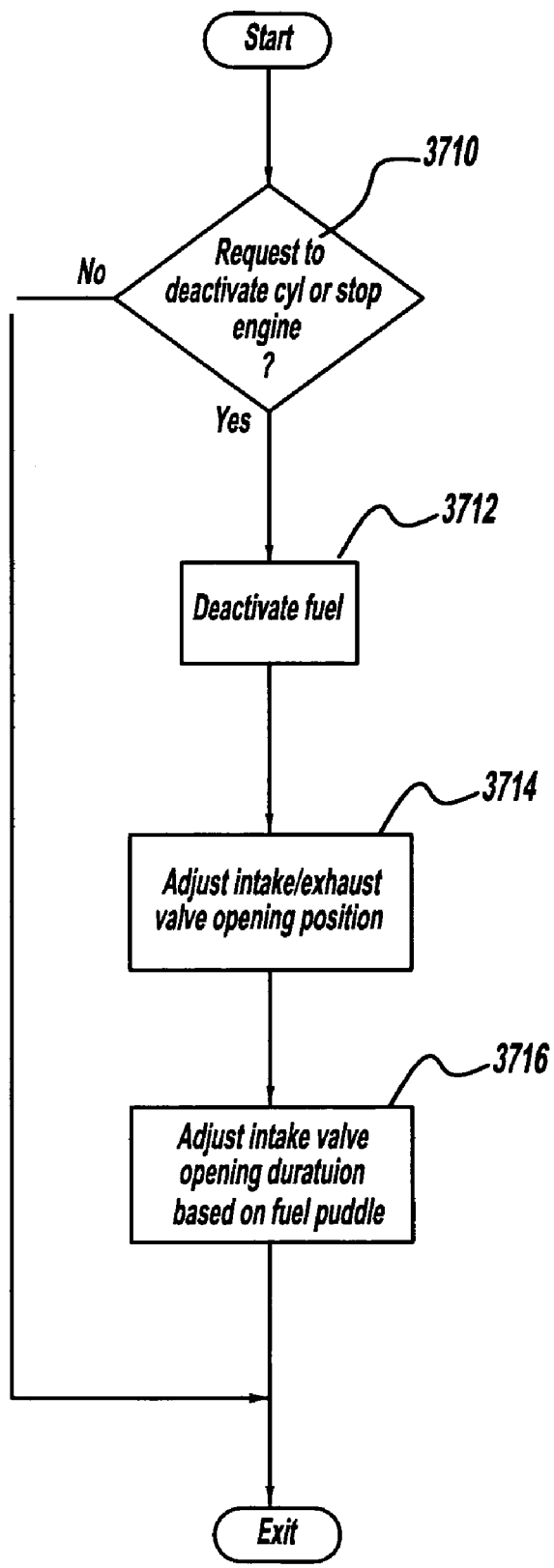
FIG. 37 is a flowchart of a method to control valve timing after a request to stop an engine or to deactivate a cylinder.

Referring to FIG. 37, a flowchart of a method to control valve timing after a request to stop an engine or to deactivate a cylinder is shown.

In step 3710, the routine determines if a request has been made to stop the engine or deactivate one or more cylinders. The request may be initiated by the driver of the vehicle or from within the vehicle control architecture, such as a hybrid-electric vehicle. If a request is present the routine proceeds to step 3712. If no request is present the routine proceeds to exit.

In step 3712, fuel is deactivated to individual cylinders based on the combustion order of the engine. That is, fuel injections that are in progress complete injection, and then fuel is deactivated. Further, calculations that determine the cylinder port fuel puddle mass continue and the intake valve duration is adjusted in step 3714 to produce the desired air-fuel ratio. Fuel puddle mass is determined with the method in accordance with U.S. Pat. No. 5,746,183 and is hereby fully incorporated by reference. The fuel mass after the last injection is determined from:

$$m_p(k) = \frac{\tau}{\tau + T} \cdot m_p(k-1)$$

Where $m_p$ is the mass of the fuel puddle, k is the cylinder event number, $\tau$ is a time constant, and T is sampling time. Subsequent fuel puddle mass is obtained from:

$$\Delta m_p = m_p(k) - m_p(k-1) = m_p(k-1) \cdot \left(\frac{-T}{\tau + T}\right)$$

Where $\Delta m_p$ is the fuel puddle mass entering a cylinder. Alternatively, a predefined puddle mass or a puddle mass determined from a look-up table can be substituted for the puddle mass entering a cylinder.

In addition, spark may be adjusted in this step based on the request to stop the engine. Preferably, spark is adjusted to a value retarded from MBT to reduce engine hydrocarbons and increase exhaust heat. For example, adjusting spark during shut-down, catalyst temperature may be increased so that if the engine is restarted sometime soon, higher catalyst conversion efficiency may be achieved, due to a higher catalyst temperature. In another example, retarding spark during engine shut-down may reduce evaporative emissions. Since hydrocarbon concentrations in exhaust gas may be reduced, exhaust gases that escape to the atmosphere during an engine stop may have fewer hydrocarbons.

Thus, in some examples, during an engine shut-down operation, computer readable code can be used to retard ignition timing on at least one of a group of final combustion events during the shut-down to increase exhaust temperature thereby improving emissions on a subsequent engine re-start. In one example, upon receiving a command to shut-down the engine, one or several combustion events are still carried out, e.g., 1, 2, 3, 4, or a range of combustion events depending on operating conditions, e.g., 1–5,1–3, 1–2, etc. By adjusting the ignition timing of at least some of these (e.g., the last one, the last two, one of the last two or three), it is possible to improve later re-starts that are performed before the catalyst has cooled. Further, as noted above, adjusting of exhaust (or intake) valve opening and/or closing timing (or lift) can also be used (or alternatively used) to further increase exhaust gas heat to the catalyst during a shut-down.

In step 3714, valve timing is adjusted. Upon indication of a request to stop or cylinder deactivation, intake and exhaust valve timing can be adjusted. The intake valve opening (IVO) is moved to the engine position where a high intake port velocity is obtained, typically 45 degrees after the intake stroke begins. Moving the valve opening position to this location draws more fuel into the cylinder from the intake port puddle for a last combustion event. This can reduce the fuel puddle when the cylinder is deactivated or when the engine is stopped. Furthermore, a smaller fuel puddle contributes less fuel to a cylinder when the engine is restarted, thereby leading to more accurate air-fuel control during a start. The routine proceeds to step 3716.

In step 3716, fuel mass and valve opening location are then substituted into the method of FIG. 2 which then determines valve opening duration and spark.

The valves are operated with adjusted timing for at least an intake event, but may be operated longer if desired. Furthermore, the intake valve opening is typically adjusted to a location of between 30 and 180 crank angle degrees after top-dead-center of the intake stroke. The intake valve closing timing can also be adjusted to compensate air charge differences that may result from adjusting intake valve opening timing.

The cylinder air-fuel mixture during engine shut-down may be lean, rich, or stoichiometric depending on control objectives.

In addition, the exhaust valves and spark advance may also be adjusted during engine shut-down. For example, exhaust valves are adjusted to an opening location of between 0 and 120 crank angle degrees after top-dead-center of the exhaust stroke. When this exhaust valve timing is combined with a spark angle adjustment, additional heat can be added to the catalyst prior to engine shut-down. As mentioned above, this can increase catalyst temperature in anticipation of a subsequent start. Further the exhaust valve closing timing can also be adjusted based on the adjusted exhaust valve opening time. The routine then exits.

Figure 38:
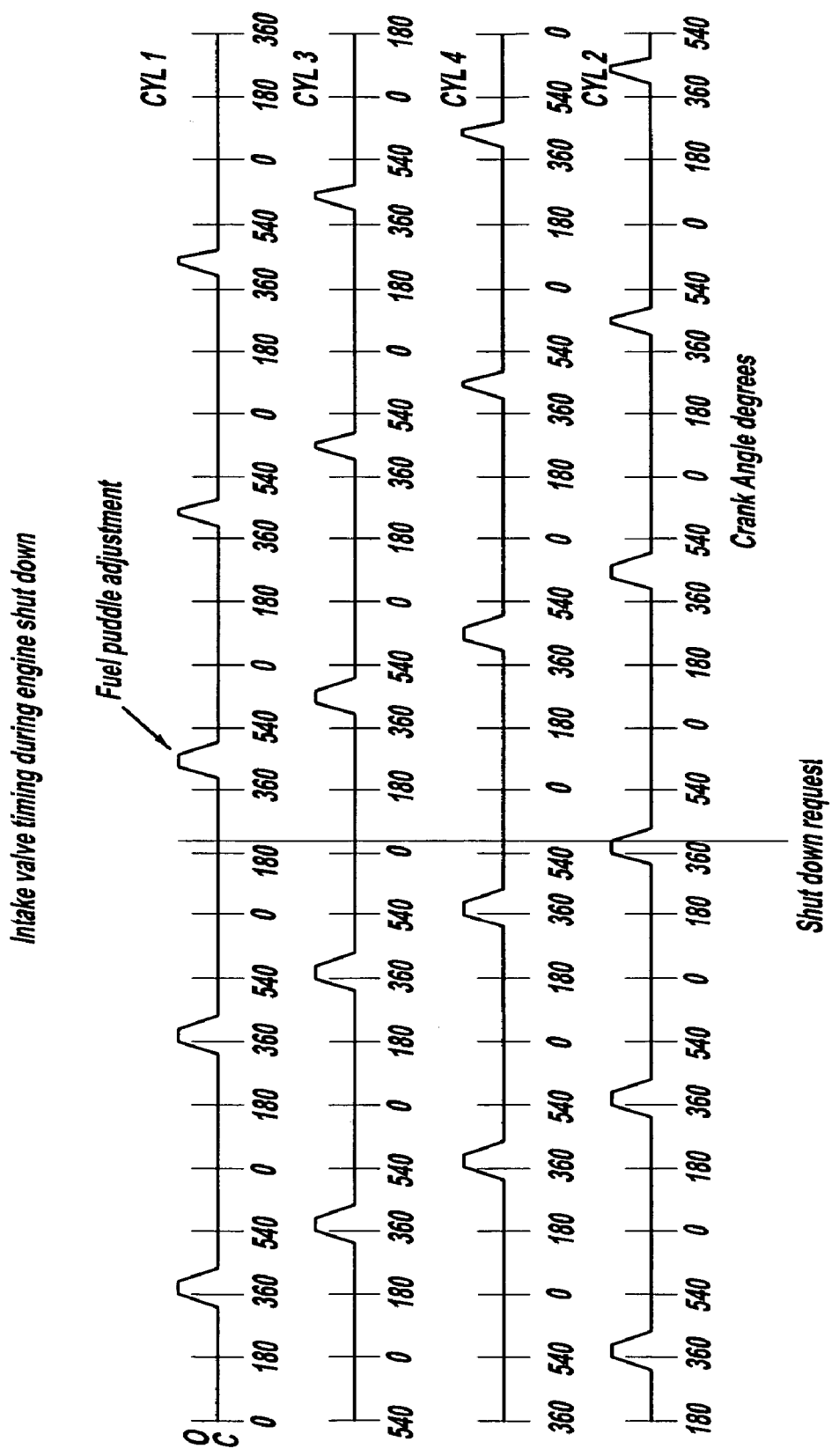
FIG. 38 is a plot of an example of a representative intake valve timing sequence during a stop of a four-cylinder engine.

Referring to FIG. 38, an example of a representative intake valve timing sequence during a stop of a four-cylinder engine is shown. The valve sequences begin on the left-hand side of the figure where the valve crank angle degrees are marked relative to top-dead-center of the combustion stroke of respective cylinders. The intake valves open at the end of the exhaust stroke indicating internal EGR flow into the cylinder. At an indication of a shut down request, the vertical line, intake valve timing is adjusted for the first cylinder where fuel injection is deactivated after the shut down request, cylinder 1 in this example. Both the valve opening and valve duration are adjusted. The valve duration adjustment is based on an estimated fuel puddle fraction that enters the cylinder. The valve duration adjustment provides the desired exhaust air-fuel ratio. Alternatively, valve opening location can be adjusted along with scheduling a stoichiometric or lean final injection before deactivating fuel injection. Further, before fuel injection is deactivated, a specific number of injections can be scheduled coincident with the valve opening position adjustment.

The figure illustrates three induction events after the valve timing adjustment is made. However, fewer or additional combustion or even non-combustion cylinder events after each intake event can be used.

Figure 39:
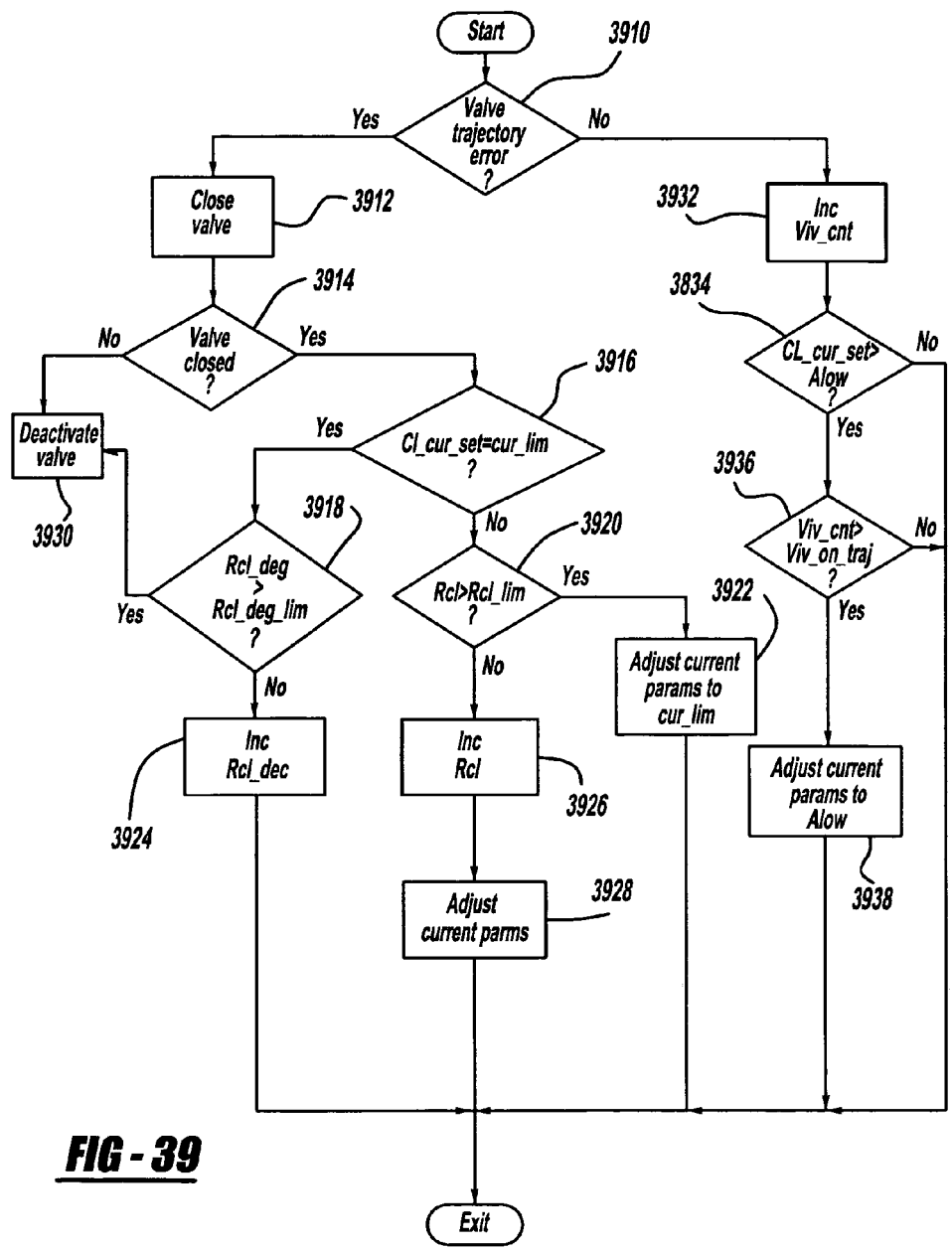
FIG. 39 is a flowchart of a method to restart electromechanical valves in an internal combustion engine.

Referring to FIG. 39, a method of restarting electromechanical valves in an internal combustion engine is shown. In some cases, electromechanical valve actuators contain mechanical springs and electrical coils that act as electromagnets, both of which are used to regulate valve position. However, during cylinder operation pressure in a cylinder may work for or against valve operation. For example, exhaust valves overcome cylinder pressure to open, but are assisted by cylinder pressure when closing. As a result, capturing current, current necessary to overcome spring force, and holding current, current that holds a valve open or closed, varies with operating conditions of the engine. The method described herein can restart a valve in and internal combustion engine if a predetermined current does not overcome an opening or closing spring force, permitting the valve to open or close during a cycle of the cylinder. In an inactive state (no applied voltage or current), the mechanical springs position valves in a mid position that is partially open. The valves can also assume the mid position if conditions in an engine do not permit the predetermined current to open or close the valve, i.e., the valve trajectory (position) deviates from a desired path. If the path of a valve deviates from the desired valve trajectory, one or more attempts may be made to restart the valve so that it can resume the desired trajectory. One approach is described below.

Valve trajectory may be determined directly from sensor measurements, sensor 50 for example, or by inference from crankshaft position.

Specifically, the following method can be applied to each electromechanical valve in an engine to provide for valve restarting. Thus, the variables of FIG. 39 are arrays that contain data for each of the respective valves, although it can be applied to a subset of valves, or a single valve, if desired.

In step 3910, valve trajectory is read from valve position sensor 51 and is evaluated to determine if an error in valve trajectory has occurred. Valve position sensor 51 may be a discrete or continuous position sensor. Desired valve position and current are determined by interrogating four matrices that contain look-up pointers for desired valve trajectories and associated currents. Matrices FNVLVCURO and FNVLVCURC hold numerical pointers that identify valve current vectors for valve opening and closing respectively. Matrices FNVLVPOSO and FNVLVPOSC hold numerical pointers that identify valve position for valve opening and closing respectively. Both the position and current matrices are indexed by engine speed and load. The pointers contained within the matrices then determine a specific vector that contains position or current information based on the valve position regions designated in FIG. 40, CL_pos_set and CL_cur_set respectively. A separate valve control method accesses CL_cur_set to actuate the electromechanical valves. If an error in valve trajectory is determined the routine proceeds to step 3912. If no trajectory error is determined the routine proceeds to step 3932.

In step 3912, predetermined current is applied to close the off-trajectory valve. The applied current is an upper current limit based on the valve and power supply. Alternatively, the valve may be moved to an open or mid position. In addition, a variable that represents the number of on-trajectory valve openings and closings, Vlv_cnt, is zeroed. Further, fuel injection into the cylinder housing the off-trajectory valve may be disabled until the valve has completed a predetermined number of on-trajectory operations. The method proceeds to step 3914.

In step 3914, the routine determines if the off-trajectory valve has closed. If the valve has closed, the routine proceeds to step 3916. If the valve has not closed the routine proceeds to step 3930.

Alternatively, steps 3912 and 3914 can be eliminated. In this case, if a valve is off-trajectory, valve current will be increased in the region where the trajectory error was detected. The valve will stay in a mid position until a command to open or close the valve is given based on the base valve timing. In other words, the current that drives the off-trajectory valve is increased in the region of the detected trajectory error, but the valve is restarted by the base valve timing, e.g., the valve timing based on desired torque and engine operating conditions.

In step 3930, deactivation of the off-trajectory valve and of the cylinder containing the valve occurs. The cylinder and valve are deactivated by the cylinder and valve mode selection method of FIG. 10. The cylinder number containing the degraded valve is loaded into variable CYL_DEG during step 3930 and is passed to step 1528 of FIG. 15. The routine then exits.

Figure 40:
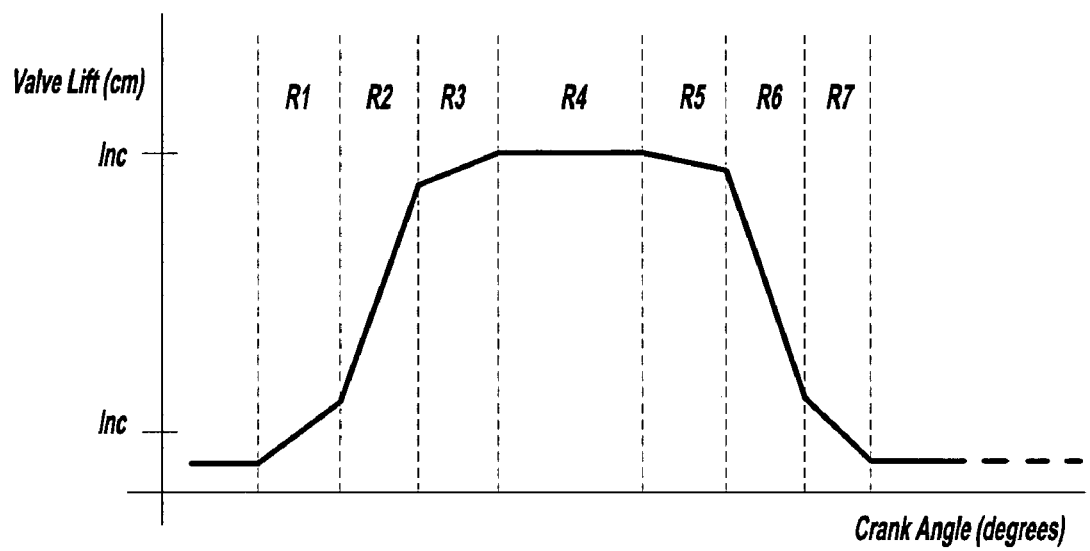
FIG. 40 is a plot of an example of valve trajectory regions during a valve opening and closing event.

In step 3916, valve current, CL_cur, is compared against a predetermined variable, cur_lim. Each region of the valve trajectory profile, as illustrated in FIG. 40, begins at a predefined current level. If a valve trajectory error occurs, valve current in all the regions of an opening (R1–R4) or closing (R4–R7) valve event is increased, steps 3930 and 3922.

In addition, valve operation is resynchronized with engine timing. For example, valve timing is aligned with the desired cycle of the respective cylinder. Further, the resynchronization may be attempted after a predetermined number of cylinder cycles.

If the valve does not follow the desired valve trajectory and the valve current in each region is greater than cur_lim, the routine proceeds to step 3918. If the valve current is less than cur_lim the routine proceeds to step 3920.

In step 3918, the number of valve restart attempts at a current level of cur_lim, Rcl_dec, is compared to a predetermined variable, Rcl_deg_lim. If the number of restart attempts is greater than Rcl_deg_lim, the routine proceeds to step 3930. If the number of restart attempts is less than Rcl_deg_lim the routine proceeds to step 3924. This decision logic allows the routine to make a predetermined number of valve restart attempts before deactivating the cylinder and valve.

In step 3924, a count representing the number of valve restart attempts at the current amount in the cur_lim variable is incremented. Each time the routine executes this logic the variable Rcl_deg is incremented. This variable allows the routine to deactivate the off-trajectory valve and the cylinder in which it resides to be deactivated if a predetermined number of attempts are exceeded, steps 3918 and 3930. The routine proceeds to exit after incrementing the variable.

In step 3920, valve restart attempts are compared to a predetermined value. A variable, Rcl, representing the number of restart attempts at a current amount below cur_lim is compared to a predetermined value, Rcl_lim. If the number of restart attempts is greater than the predetermined value the routine proceeds to step 3922. If the number of restart attempts is less than the predetermined value the routine proceeds to step 3926.

In step 3926, a count representing a number of valve restart attempts below a current amount stored in Rcl_lim is incremented. After incrementing Rcl the routine proceeds to step 3928.

In step 3928, valve current is adjusted. The beforementioned valve control current vector, CL_cur_set, is adjusted by a predetermined amount, $\Delta$_adjust_up, each time a valve restart is attempted. Further, if a valve is restarted below the nominal engine operating temperature, CL_adjust is not adjusted, but valve current compensation based on temperature, Vt_adjust, is incremented by a predetermined amount at the temperature where the valve restart attempt is made. The valve current adjustment is adjusted by the equation:

$$CL\_cur\_set = Vt\_adjust \cdot (CL\_base\_set + CL\_adjust)$$

Where CL_cur_set is current vector at the engine operating conditions, Vt_adjust is a function that is indexed by engine or valve temperature, CL_base_set is a vector containing base current amounts, and CL_adjust is a vector of adjustment current amounts at the engine operating conditions. Following the current adjustment the routine exits.

In step 3922, valve current is set to a predetermined amount. After attempting to restart an off-trajectory valve a predetermined number of times, CL_cur_set is set to cur_lim. This may allow a valve to restart sooner than by continuing to make small incremental current increases. In addition, a variable vector, Alow, is loaded with the latest value of CL_cur_set. By loading CL_adjust into Alow the routine adapts the valve current based on engine operating conditions. The routine then proceeds to exit.

In step 3932, on-trajectory valve event counter is incremented. The number of on-trajectory valve events, openings and closings, Vlv_cnt, is incremented when no trajectory error is detected. By accounting for the number of on-trajectory valve operations the method may reduce valve current from the amount stored in cur_lim. The routine then proceeds to step 3934.

In step 3934, valve current is compared to a predetermined amount. If the valve current is greater than the amount stored in cur_lim the routine proceeds to step 3936. If the valve current is less than the amount stored in cur_lim the routine exits.

In step 3936, the number of on-trajectory valve events, Vlv_cnt, is compared to a predetermined amount, Vlv_on- _traj. If Vlv_cnt is greater than Vlv_on_traj the routine proceeds to step 3938. If Vlv_cnt is less than Vlv_on_traj the routine exits.

In step 3938, valve current, CL_cur_set is adjusted to a lower amount. After a predetermined number of on-trajectory valve events the valve current is lowered by a predetermined amount, Δ_adjust_dn. By lowering the valve current after a predetermined number of on-trajectory events the routine can quickly restart valves and then locate a current amount that operates the valve while decreasing electrical losses and improving fuel economy. Therefore, step 3938 provides a current adapting operation for the routine. The routine then exits.

Referring to FIG. 40, a plot of valve trajectory regions during an opening and closing valve event is shown. In the method of FIG. 39, valve trajectories during opening and closing events are compared to predefined valve trajectories such as those shown in FIG. 40 to determine valve error trajectories. The valve trajectory is separated into seven regions, regions 1–4 describe valve opening and regions 4–7 describe valve closing. By comparing regions of the valve trajectory for valve trajectory errors, the valve restart method can increase or decrease valve current in specific regions. This allows the method of FIG. 39 to adjust valve current in a desired region without increasing valve current in other regions, thereby improving engine and electrical efficiency.

Valve current during valve opening and closing is also separated into regions, similar to those shown in FIG. 40. Valve current in and around valve trajectory error regions can be adjusted to reestablish on-trajectory valve operation. Furthermore, valve trajectories and current amounts can be divided into a fewer or greater number of regions than shown in FIG. 40.

Figure 41:
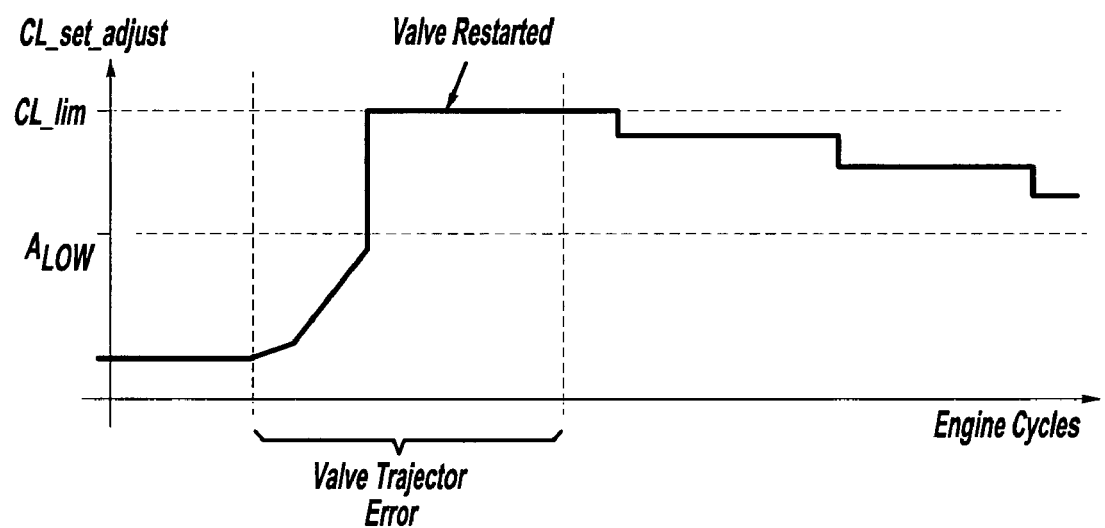
FIG. 41 is a plot of example current during several valve restart attempts.

Referring to FIG. 41, a plot of an example valve current produced by the method of FIG. 39 is shown. Once a valve trajectory error is indicated, valve current is adjusted slowly and then steps up to CL_lim. Further, after the valve is restarted, the valve current is reduced in the direction of Alow.

Figure 42:
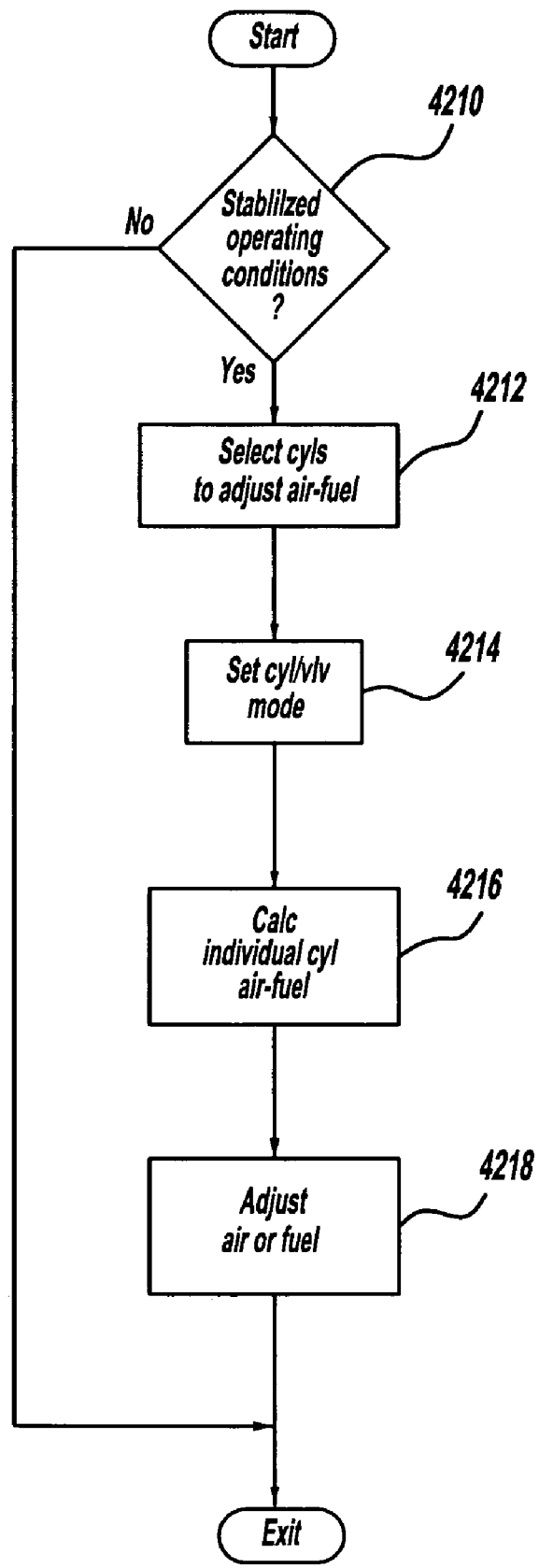
FIG. 42 is a flowchart of a method to improve individual cylinder air-fuel detection and control.

Referring to FIG. 42, a flowchart of a method to improve individual cylinder air-fuel detection and control is shown. The method takes advantage of the opportunity electromechanical valves present to improve individual cylinder air-fuel detection and control by providing separation, at least under some conditions, between individual cylinder exhaust pressure events.

Combustion in a cylinder produces pressures above atmospheric pressure that act on a piston, moving the piston, and expanding the cylinder volume. Exhaust valves open to release cylinder pressure and exhaust the combusted gas mixture. The pressure differential between the exhaust manifold and the end of the tailpipe, which is at atmospheric pressure, causes exhaust to flow from a cylinder head to the tailpipe. The exhaust flow rate is a function of the exhausted cylinder pressure, the exhaust system volume, manifold and pipe geometry, and resistance of elements in the exhaust passage. By increasing the number of crank angle degrees between cylinder combustion events, additional time is provided between combustion events. This allows higher-pressure exhaust gases at the cylinder head to migrate toward the tailpipe, equalizing exhaust system pressure. Since exhaust pressure is the mechanism that carries the combusted exhaust gas information, e.g., air-fuel ratio, the additional space between combustion events reduces the amount of residual exhaust gas from previous combustion events at the oxygen sensor location, FIG. 1, 76.

The inventors herein have discovered that electromechanical valves may improve individual cylinder air-fuel separation and control. Electromechanical valves can extend the distance between cylinder vents by altering exhaust valve timing, operating in a multi-stroke cylinder mode while providing the desired amount of engine torque. Also note that in one example, multi-stroke operation can be combined along with varying the number of active valves in the cylinders (or by varying the number of active valves between different cylinder groups operating in multi-stroke), and with deactivating cylinders. Such operation can also improve torque control by enabling finer torque resolution in different modes.

The method of FIG. 42 may be integrated into the cylinder and valve mode selection routine, FIG. 10 or alternately, as shown here, as a stand-alone function that repeatedly executes until all cylinders are adjusted at a given engine speed and load.

In step 4210, operating conditions are determined. For example, the routine evaluates rates of change in engine speed and desired torque to determine if individual cylinder air-fuel detection and control should be permitted. If high rates of change in engine speed or desired torque occur, the routine is exited because individual cylinder air-fuel detection can become more difficult. In addition, engine temperature and valve operating conditions can further restrict entry into the routing. If stabilized operating conditions are present, the routine proceeds to step 4212, if not, the routine proceeds to exit.

In step 4212, cylinder and valve modes to improve individual cylinder air-fuel detection are selected. Based on the desired engine torque, cylinder and valve modes are selected to improve individual cylinder air-fuel detection. The method can choose to modify exhaust valve timing, enter multi-stroke cylinder operation, or deactivate selected cylinders or combinations or sub-combinations thereof. If selected cylinders are deactivated for a period, deactivated cylinders are later reactivated and other cylinders are deactivated. This allows all cylinders to be individually adjusted, if desired, as the routine executes.

Alternatively, the cylinder and valve mode may be selected by the method of FIG. 10. If a selected cylinder and valve mode is appropriate for individual cylinder air fuel detection, the routine is executed.

In step 4214, cylinder and/or valve mode are set. As discussed above, the routine selects cylinder and/or valve modes from a group of available modes that can increase the separation between cylinder events. This can be accomplished by selecting from the above-mentioned cylinder and valve modes or additionally by grouping combinations of cylinder and valve modes. For example, a 4-cylinder engine may be operated with 2 cylinders in four-stroke mode and 2 cylinders in six-stroke mode. Further, the spark timing, air-fuel ratio, and air charge amounts can be increased or decreased between cylinder groups. These variables allow increased signal to noise ratios in the cylinders being evaluated. For example, air-fuel ratio can be made rich or lean in one group of cylinders and stoichiometric in another group. Alternately, one group compared to another may induct an additional air amount that will increase cylinder pressure. Further, spark adjustments may be made between cylinders groups to balance torque generation between the groups.

In addition, grouping valves in different ways enables cylinder specific diagnostics to be performed. For example; all cylinders, with the exception of the cylinder being evaluated, can be operated in a base configuration. The cylinder under evaluation, e.g., the second cylinder group, is operated with additional valves to provide additional flow and potentially a different air-fuel ratio. By operating in this configuration, assessment of the operation of a specific cylinder can be less perceptible than by other methods.

Also, different valve patterns in different cylinder groups may also provide an advantage of different cylinders to producing different combustion products at similar torque levels. This permits engine emissions to be adapted to a specific catalyst system. As mentioned above, asymmetric exhaust systems with different catalyst locations between engine bank is one example. Further, different shape catalysts and different catalyst substrate densities can also be compensated. The selected valve and cylinder configuration is activated, then the routine proceeds to step 4216.

In step 4216, individual cylinder air-fuel ratios are determined. After the individual cylinder events have been separated, by altered valve timing and/or configurations, a predetermined time is allowed to expire that allows the system to reach an equilibrium condition. Then oxygen sensor sampling is adjusted to correspond to the altered cylinder operation and pressure signal. The sampling is adjusted so that a sample is taken after the peak pressure passes the oxygen sensor. This allows the cylinder pressure of the latest combustion event to push a larger fraction of past combustion event gases out the tail pipe before a sample is taken. Next, the method employs the method of U.S. Pat. No. 5,515,828, which is hereby fully incorporated by reference, to determine individual cylinder air-fuel ratio adjustments. These adjustment amounts may be stored in memory to produce continually adaptive cylinder adjustments. Once individual cylinder adjustment amounts are determined, the routine proceeds to step 4218.

In step 4218, engine air or fuel adjustments are made. Because electromechanical valve timing may be adjusted with little restriction, valve timing adjustments may be made to compensate for air-fuel errors. This is accomplished by allowing a small offset between the desired valve timing and the final valve timing. For example, IVC valve timing from FIG. 2, step 226, may be altered by adding an offset to the determined IVC timing, e.g., IVC_final=IVC+ΔIVC. The valve timing adjustment is limited to restrict changes in engine torque production.

Alternatively, the amount of fuel delivered to individual cylinders may also be adjusted. Fuel adjustments are made to balance air-fuel in step 220 of FIG. 2. An offset alters the desired lambda value, e.g., LAM_Fin=LAMBDA+ΔLAM. However, step 222 continues to use the base LAMBDA value to determine the desired air charge. This allows fuel changes without significantly affecting air charge and torque production. Fuel amount adjustments are also limited to ensure system robustness. The routine then exits.

Figure 43:
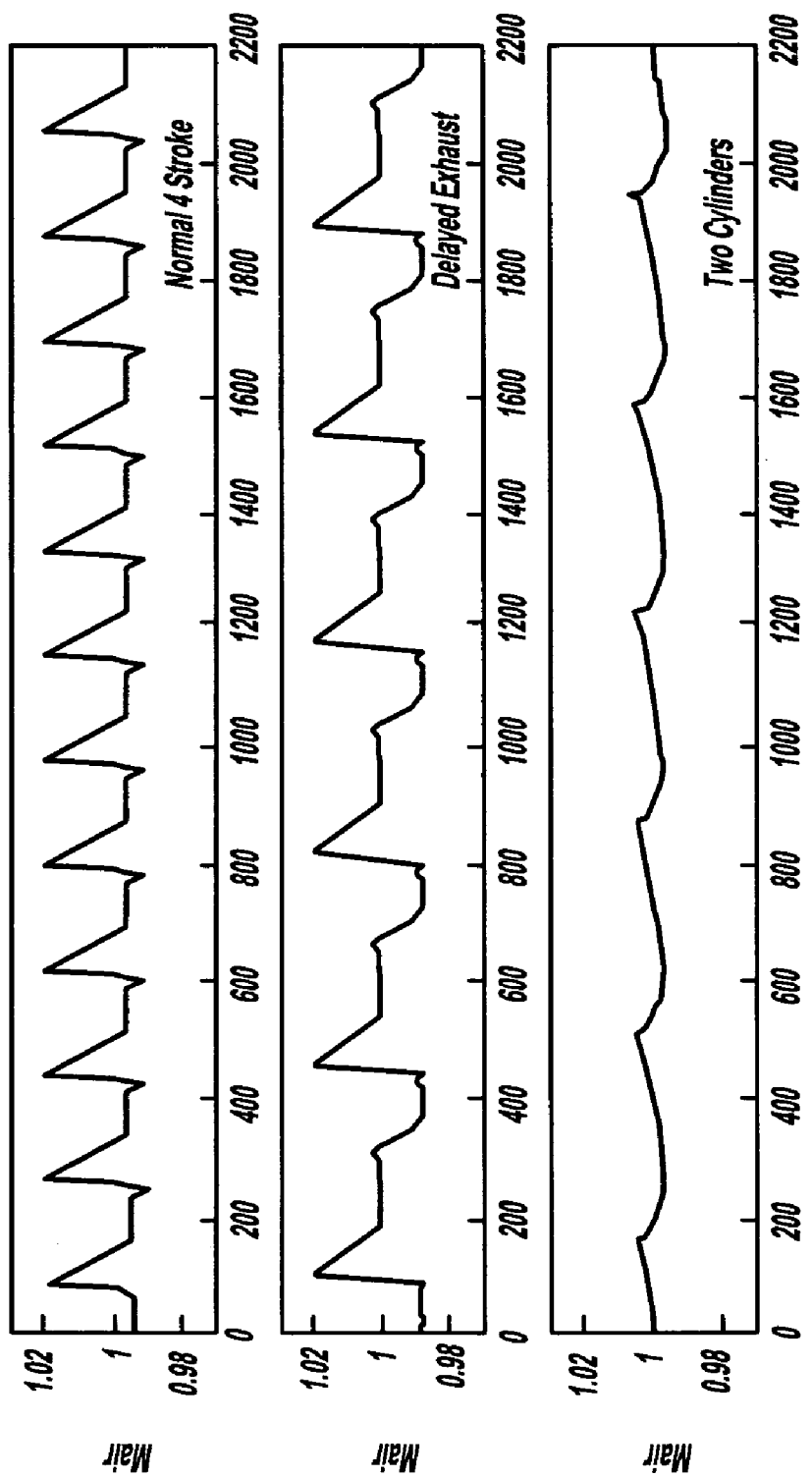
FIG. 43 is a plot of example simulated exhaust mass vs. crankshaft angle produced by the method of FIG. 42.

Referring to FIG. 43, a plot of simulated normalized exhaust mass, which is a function of engine crankshaft angle, from a few of the previously mentioned cylinder and valve modes used to improve air-fuel detection is shown.

The first plot shows normalized exhaust mass in a four-cylinder engine operating in four-stroke cylinder mode. The mass traces are generally symmetric, whereas an actual engine may produce slight phase differences at the confluence point because of transmission distance differences in the exhaust system that result from cylinder and sensor location. Also, the signal peaks, indicative of exhausted combustion events, occur at shorter intervals compared to the other plots.

The second plot shows a four-cylinder engine operating with four active cylinders in four-stroke mode and with two of the four cylinders with delayed exhaust valve timing. Cylinders with delayed exhaust valve timing combust every other combustion event. This mode provides less signal separation than the modes of the third plot, but all four cylinders are active, providing additional torque capacity. Late exhaust valve opening can increase the crank angle duration between combustion in cylinders with nominal exhaust valve timing and cylinders with retarded exhaust valve timing. However, since four-cylinders combust at the same rate as the first plot, the crank angle duration between cylinders with delayed exhaust valve timing and cylinders having nominal exhaust valve timing decreases. Further, delaying exhaust valve timing can improve cylinder air-fuel mixture identification in cylinders with nominal exhaust valve timing because it can provide additional time for exhaust from previous combustion events to be expelled to the atmosphere. Consequently, the exhaust gas sample may be closer to the actual cylinder air-fuel mixture.

The third plot shows a four-cylinder engine operating with 2 active cylinders. Comparing the first plot to the third plot illustrates the separation in the mass peaks. This signal separation can be used to advantage to enable better determination of individual cylinder air-fuel ratios. Again, the separation between cylinder events may add additional time for the exhaust from previous combustion events to be expelled to the atmosphere.

FIGS. 44–48 show various alternative embodiment valve/cylinder configurations which can be used with the above described system and methods.

Figure 44:
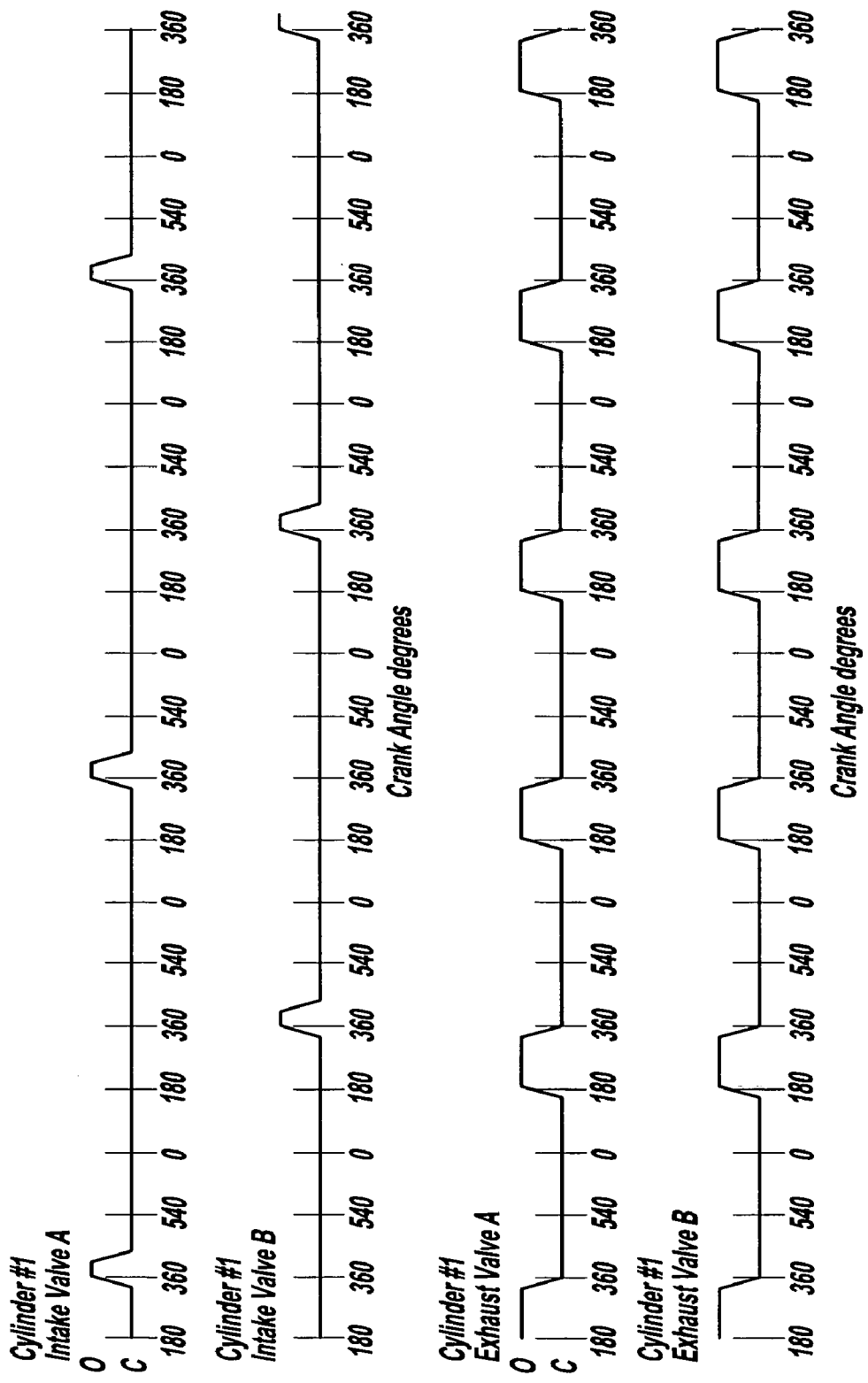
FIG. 44 is a plot of example alternating intake/dual exhaust valve events over a crankshaft angle interval.

Referring now specifically to FIG. 44, a plot shows intake and exhaust events in a cylinder operating in four-stroke cylinder mode, with four valves per cylinder, and the valves operating in a alternating intake/dual exhaust configuration. Valve timing is referenced to top-dead-center of combustion being zero degrees.

The top two traces show intake valves opening in an alternating pattern, every other combustion event. That is, intake valve "A" opens every 1440 crank angle degrees, and intake valve "B" opens every 1440 crank angle degrees. Valve "A" and valve "B" opening events are separated by 720 degrees. Alternatively, a phase angle between intake valve "A" and intake valve "B" may also be added.

The bottom two traces show both exhaust valves opening every 720 degrees. Alternatively, a phase angle difference may be added between exhaust valve events, but in this example both exhaust valves open after a combustion event.

This valve operating configuration may be selected by the mode control matrix to reduce electrical power consumption and to change air induction characteristics. In addition, this valve configuration may be used in other multi-stroke cylinder modes and/or in an engine with at least some deactivated cylinders.

Figure 45:
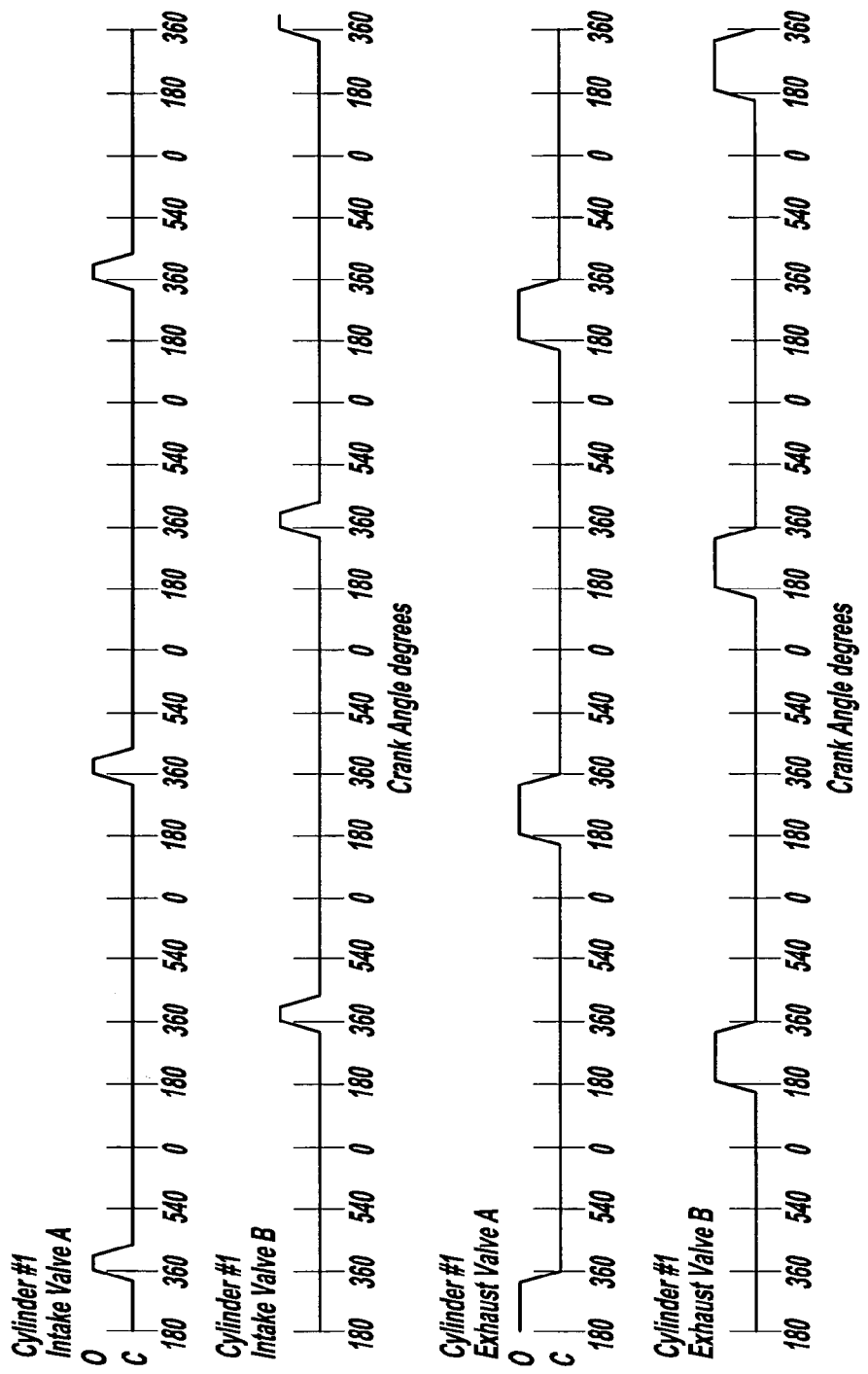
FIG. 45 is a plot of example alternating intake/alternating exhaust valve events over a crankshaft angle interval.

Referring to FIG. 45, a plot shows intake and exhaust events in a cylinder operating in four-stroke cylinder mode, with four valves per cylinder, and the valves operating in a alternating intake/alternating exhaust configuration. Valve timing is referenced to top-dead-center of combustion being zero degrees.

The top two traces show intake valves opening in an alternating pattern, every other combustion event. That is, intake valve "A" opens every 1440 crank angle degrees, and intake valve "B" opens every 1440 crank angle degrees. Valve "A" and valve "B" opening events are separated by 720 degrees. Alternatively, a phase angle between intake valve "A" and intake valve "B" may also be added.

The bottom two traces show exhaust valves opening in an alternating pattern, every other combustion event. That is, exhaust valve "A" opens every 1440 crank angle degrees, and exhaust valve "B" opens every 1440 crank angle degrees, valve "A" and valve "B" opening events are separated by 720 degrees. Alternatively, a phase angle between exhaust valve "A" and exhaust valve "B" may also be added.

This valve operating configuration may also be selected by the mode control matrix to reduce electrical power consumption and to change air induction characteristics. Furthermore, operating valves in an alternating configuration may reduce valve degradation. In addition, this valve configuration may be used in other multi-stroke cylinder modes and/or in an engine with at least some deactivated cylinders.

Figure 46:
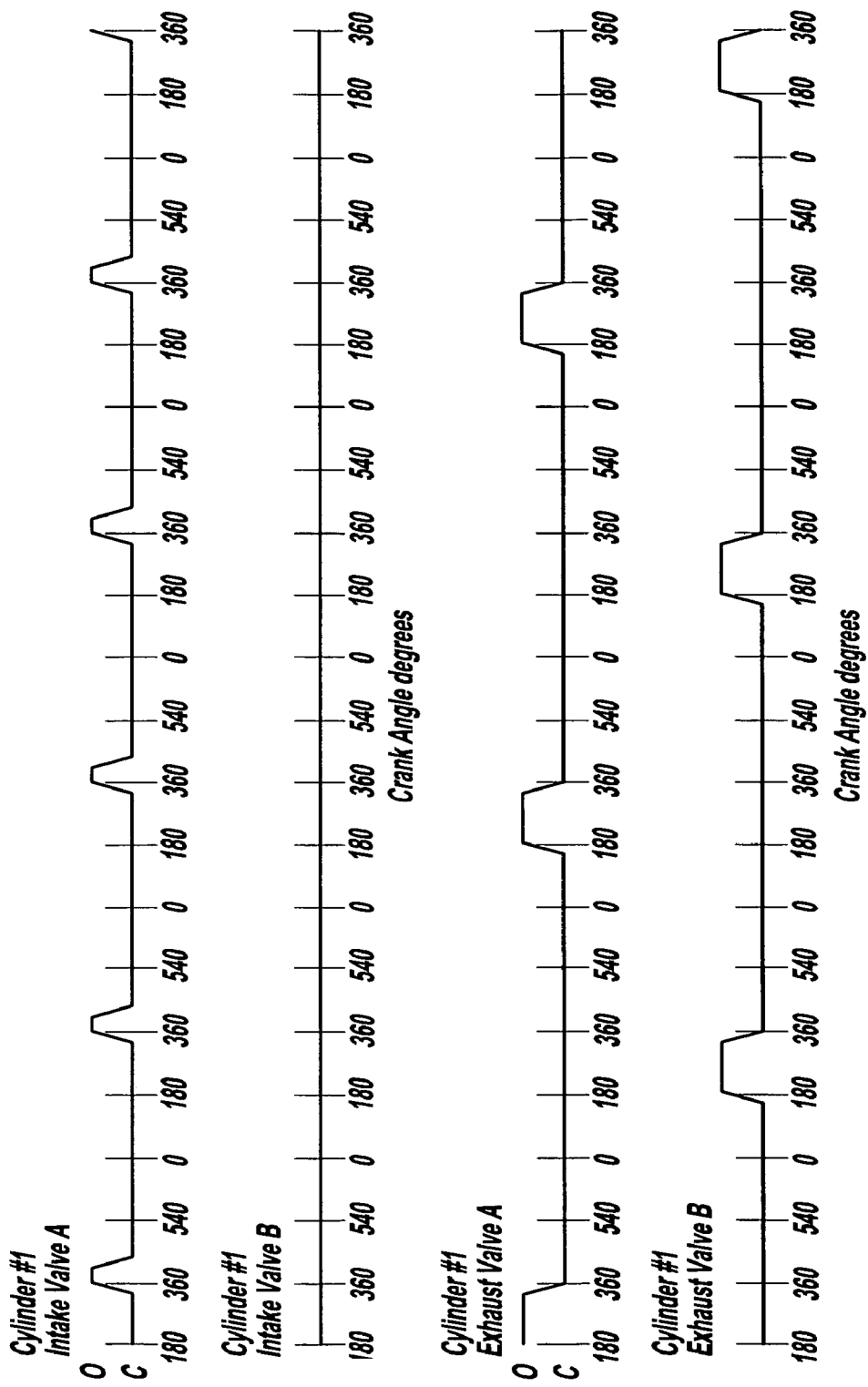
FIG. 46 is a plot of example single intake/alternating exhaust valve events over a crankshaft angle interval.

Referring to FIG. 46, a plot shows intake and exhaust events in a cylinder operating in four-stroke cylinder mode, with four valves per cylinder, and the valves operating in a single intake/alternating exhaust configuration. Valve timing is referenced to top-dead-center of combustion being zero degrees.

The top two traces show intake valve "A" opening before each combustion event. Intake valve "B" is deactivated in a closed position. Alternatively, intake valve "B" may be operated while intake valve "A" is deactivated in a closed position.

The bottom two traces show exhaust valves opening in an alternating pattern, every other combustion event. That is, exhaust valve "A" opens every 1440 crank angle degrees, and exhaust valve "B" opens every 1440 crank angle degrees. Valve "A" and valve "B" opening events are separated by 720 degrees. Alternatively, a phase angle between exhaust valve "A" and exhaust valve "B" may also be added.

This valve operating configuration may also be selected by the mode control matrix to reduce electrical power consumption and to change air induction characteristics.

Figure 47:
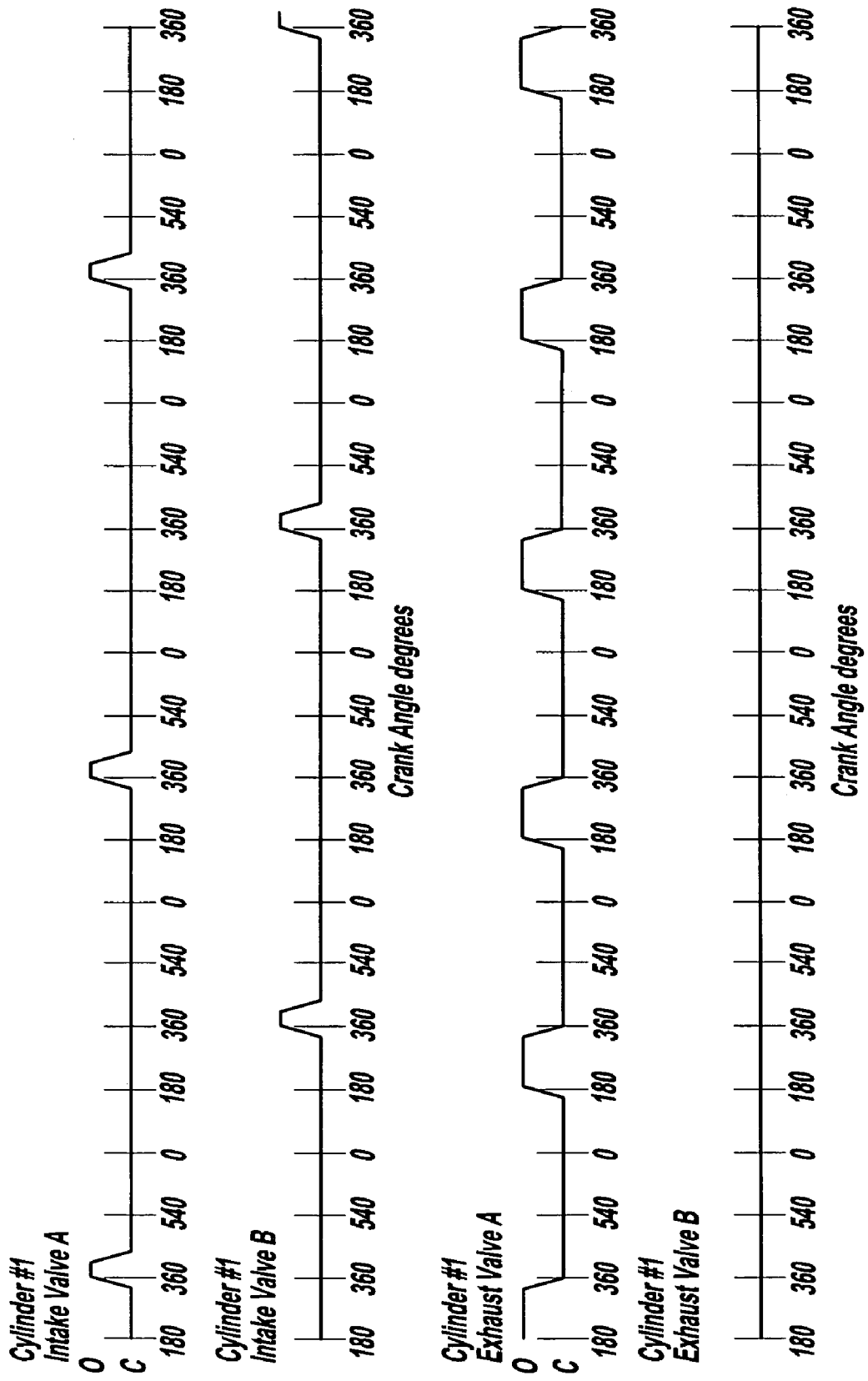
FIG. 47 is a plot of example alternating intake/single exhaust valve events over a crankshaft angle interval.

Referring to FIG. 47, a plot shows intake and exhaust events in a cylinder operating in four-stroke cylinder mode, with four valves per cylinder, and the valves operating in a alternating intake/single exhaust configuration. Valve timing is referenced to top-dead-center of combustion being zero degrees.

The top two traces show intake valves opening in an alternating pattern, every other combustion event. That is, intake valve "A" opens every 1440 crank angle degrees, and intake valve "B" opens every 1440 crank angle degrees, valve "A" and valve "B" opening events are separated by 720 degrees. Alternatively, a phase angle between intake valve "A" and intake valve "B" may also be added.

The bottom two traces show exhaust valve "A" opening after each combustion event. Exhaust valve "B" is deactivated in a closed position. Alternatively, exhaust valve "B" may be operated while exhaust valve "A" is deactivated in a closed position.

This valve operating configuration may also be selected by the mode control matrix to reduce electrical power consumption and to change exhaust flow characteristics.

Figure 48:
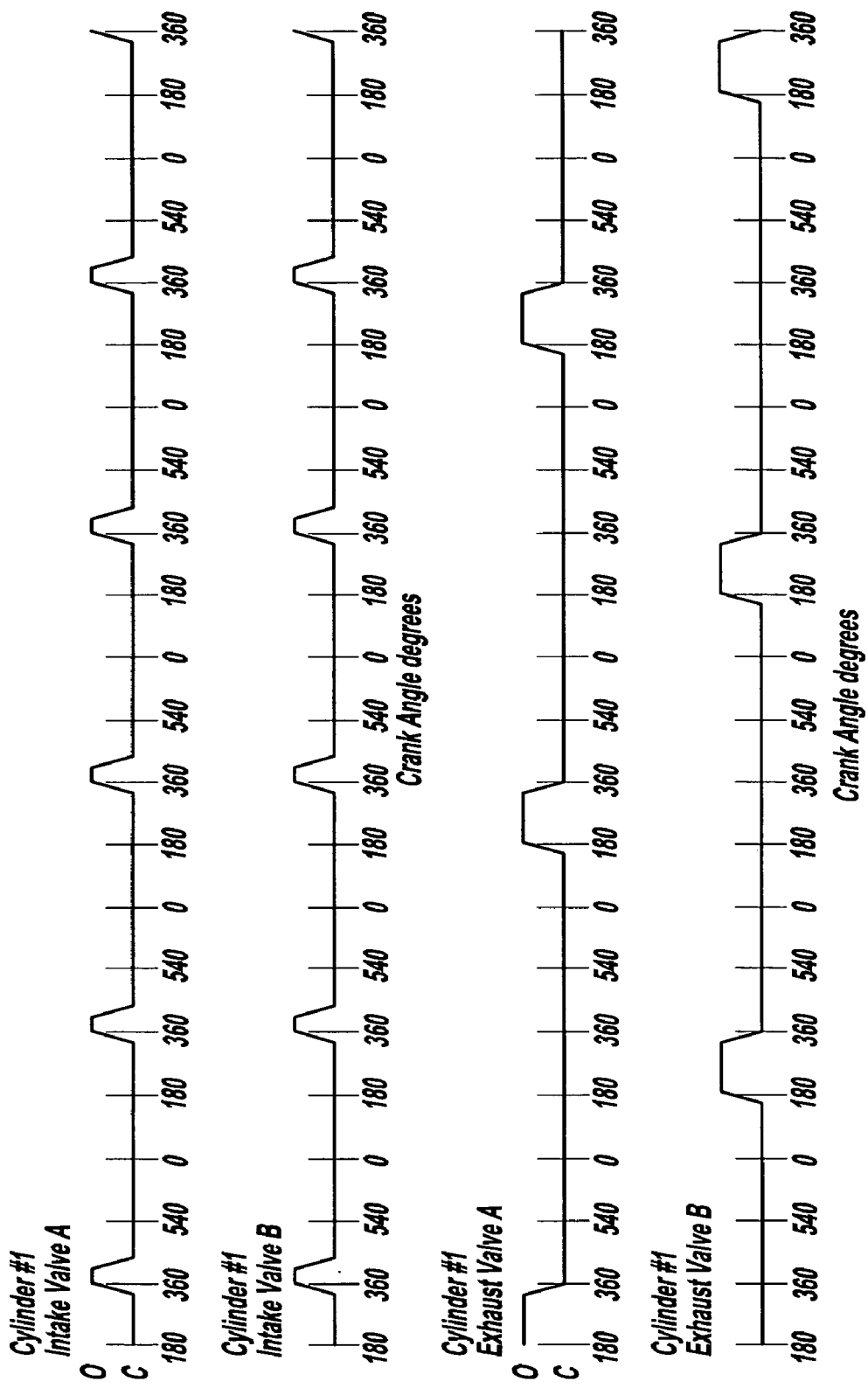
FIG. 48 is a plot of example dual intake/alternating exhaust valve events over a crankshaft angle interval.

Referring to FIG. 48, a plot shows intake and exhaust events in a cylinder operating in four-stroke cylinder mode, with four valves per cylinder, and the valves operating in a dual intake/alternating exhaust configuration. Valve timing is referenced to top-dead-center of combustion being zero degrees.

The top two traces show both intake valves opening every 720 degrees. Alternatively, a phase angle difference may be added between intake valve events, but in this example both intake valves open before a combustion event. Alternatively, a phase angle between intake valve "A" and intake valve "B" may also be added.

The bottom two traces show exhaust valves opening in an alternating pattern, every other combustion event. That is, exhaust valve "A" opens every 1440 crank angle degrees, and exhaust valve "B" opens every 1440 crank angle degrees. Valve "A" and valve "B" opening events are separated by 720 degrees. Alternatively, a phase angle between exhaust valve "A" and exhaust valve "B" may also be added.

This valve operating configuration may also be selected by the mode control matrix to reduce electrical power consumption, increase performance, and to change exhaust flow characteristics.

As described above with regard to FIGS. 33a and 33b, electromechanical valves may be used to improve engine starting and reduce engine emissions. FIGS. 49 through 54 present alternative valve sequences that may be used in engines with electromechanical valves or with valves that may be mechanically deactivated. The figures show four-cylinder operation for simplicity, but the methods can be carried over to engines with fewer or additional cylinders.

As described above and below, any of the above operating modes can be used alone or in combination with one another, and/or in combination with varying the number of strokes of the cylinder cycle, phased intake, and/or phased exhaust valve opening and/or closing.

Figure 49A:
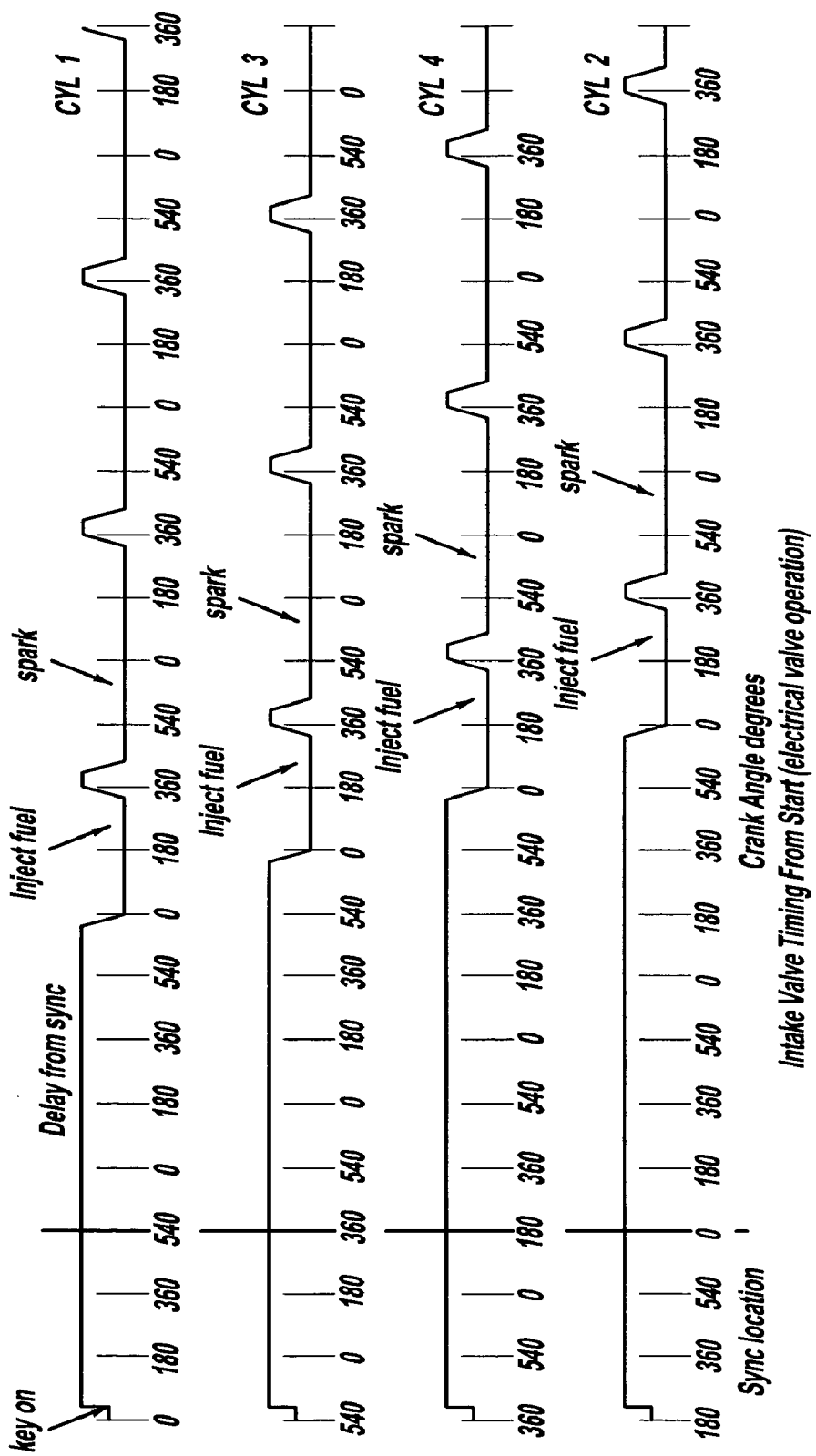
FIG. 49$a$ is a plot of example intake valve events over a crankshaft angle interval during start.
Figure 49B:
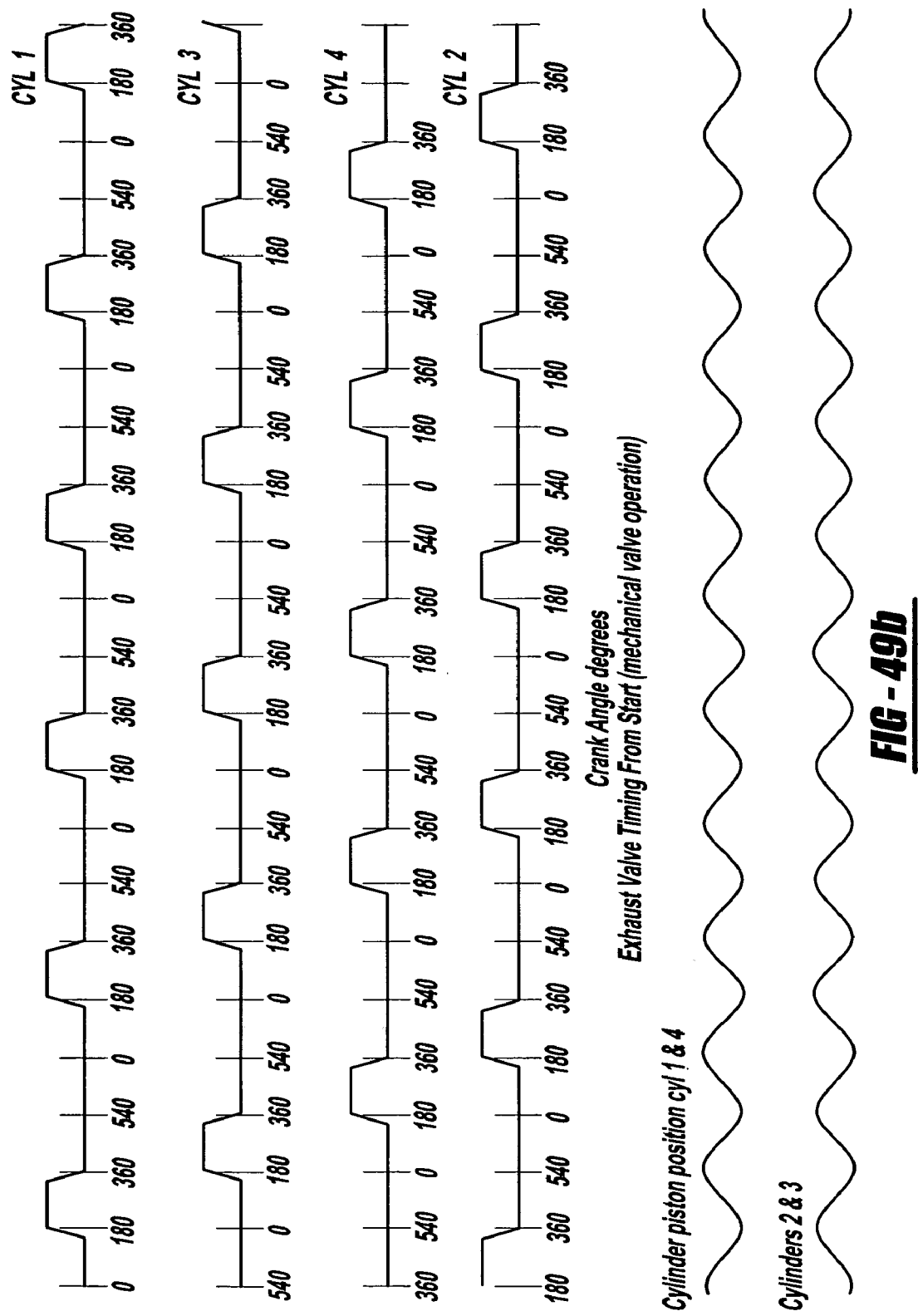

Referring to FIGS. 49a and 49b, the plots show intake and exhaust valve timing during a start for an engine with mechanical exhaust valves and valves that may be held in an open position, electromechanical valves for example.

The intake valves are set to an open position after a key on is observed. As the starter rotates the engine, the mechanically driven exhaust valves open and close based on the engine position and cam timing. At the vertical sync line, a point shown for illustration and that may vary depending on system configuration, the engine controller 12 determines engine position from crankshaft sensor 118. A delay time is shown between sync and the first valve operation (opening/closing), the actual delay may be shorter or longer. After engine position is known, the intake valves are held open until before fuel is injected into an intake port of a cylinder selected for a first combustion event. Alternatively, the intake valve may be held open and fuel injected during a first intake stroke.

By holding the intake valves in an open position, residual hydrocarbons pumped through the engine as the engine rotates can be reduced.

Opening intake and exhaust valves during the same crank angle interval allows a portion of residual hydrocarbons to be pumped into the intake manifold where the hydrocarbons can be inducted and combusted after a first combustion event.

As described above, the individual cylinder intake valves are held open until before fuel is injected into the ports of respective cylinders. After the valve is closed, fuel is injected, and then induction and four-stroke valve sequence begins. Alternatively, cylinders can be operated in multi-stroke modes and/or fuel may be injected on an open valve. Furthermore, fuel may be injected after the induction stroke on direct injection engines.

Figure 50A:
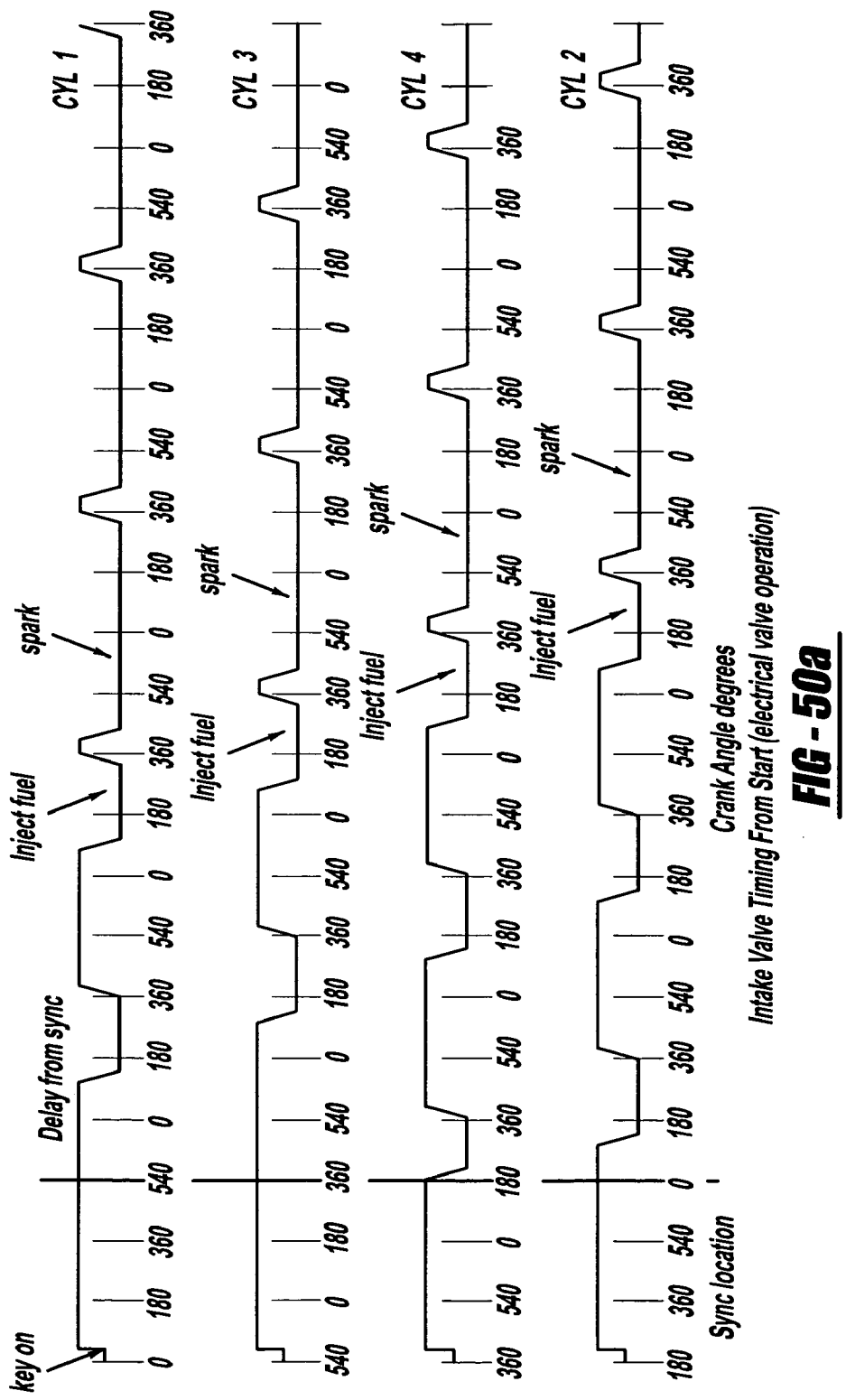
FIG. 50$a$ is a plot of example intake valve events over a crankshaft angle interval during start.
Figure 50B:
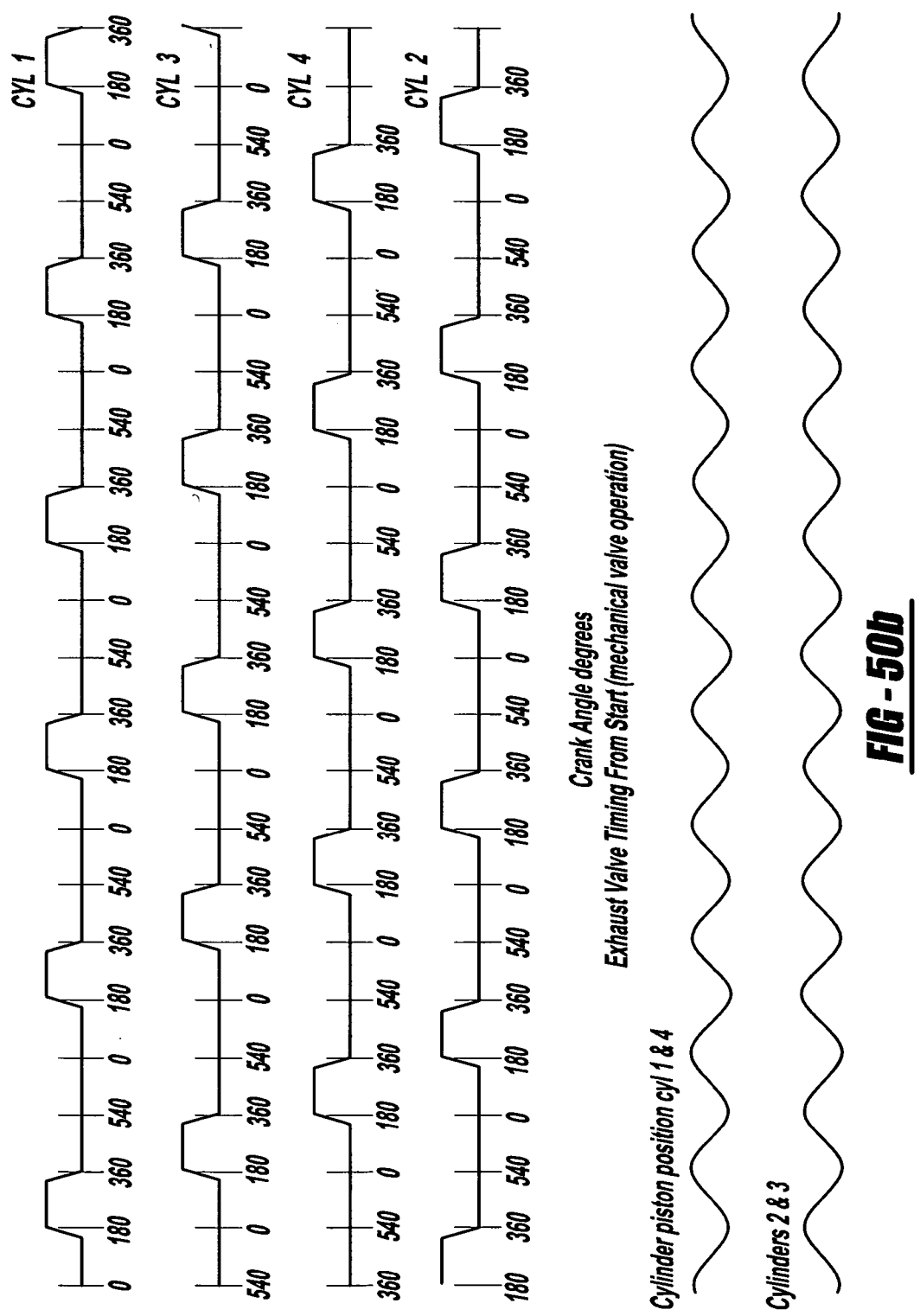

Referring to FIGS. 50a and 50b, the plots show intake and exhaust valve timing during a start for an engine with valves that may be operated before combustion in a selected cylinder occurs, electromechanical valves for example.

The intake valves are set to an open position after a key on is observed. As the starter rotates the engine, the mechanically driven exhaust valves open and close based on the engine position and cam timing. At the vertical sync line, a point shown for illustration and that may vary depending on system configuration, the engine controller 12 determines engine position from crankshaft sensor 118. After engine position is known, the intake valves are closed when the exhaust valves are open, and the intake valves are held open when the exhaust valves are closed, until before fuel is injected into a intake port of a cylinder selected for a first combustion event.

By following this sequence, engine pumping work can be reduced, but there may be some net residual hydrocarbon flow through the engine.

As described above, the intake valves are closed when the exhaust valves are open, and the intake valves are held open when the exhaust valves are closed. Fuel is injected on a closed intake valve prior to an induction event in respective cylinders. Alternatively, cylinders can be operated in multi-stroke modes and/or fuel may be injected on an open valve. Furthermore, fuel may be injected after the induction stroke on direct injection engines.

Figure 51A:
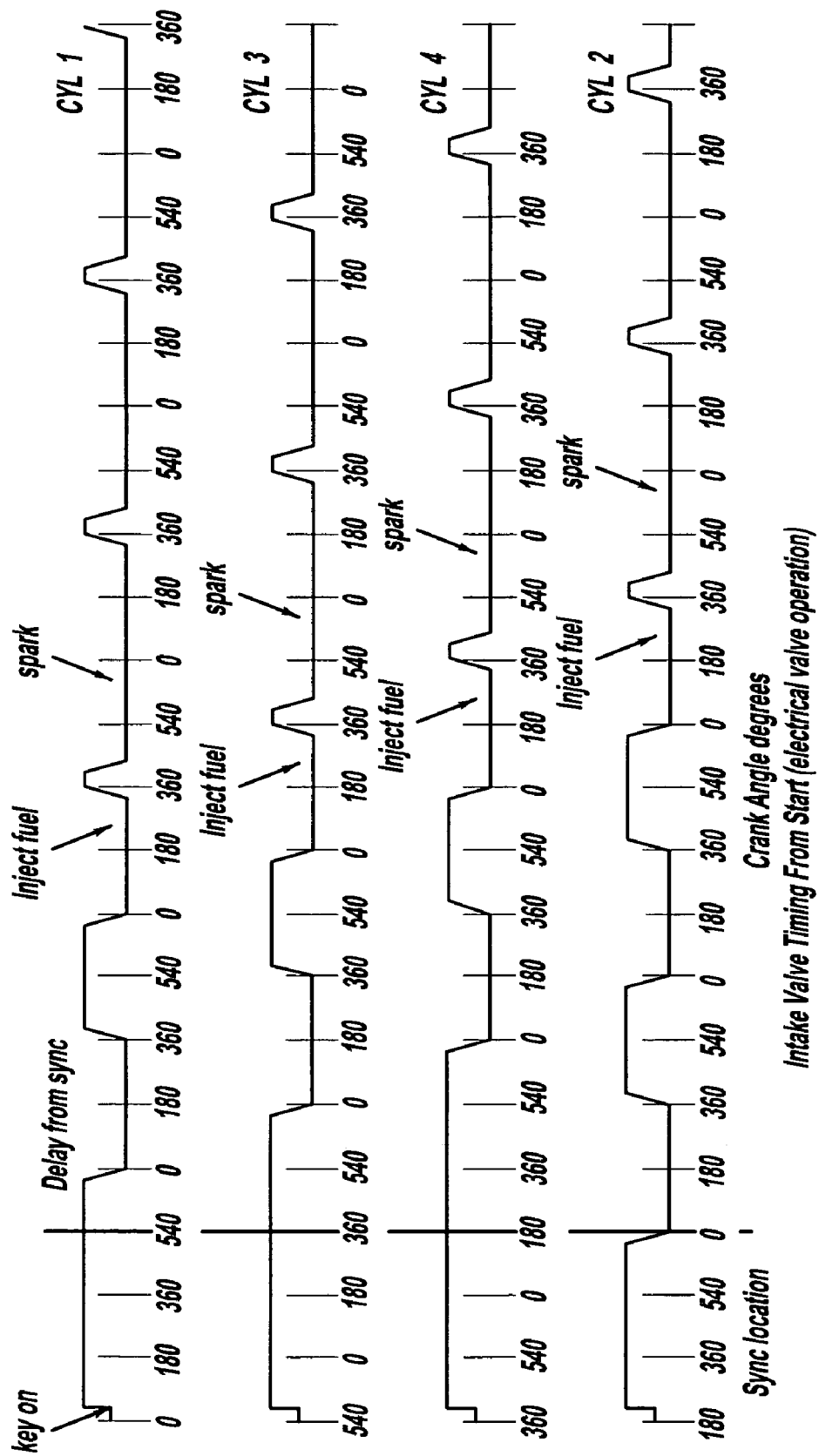
FIG. 51$a$ is a plot of example intake valve events over a crankshaft angle interval during start.
Figure 51B:
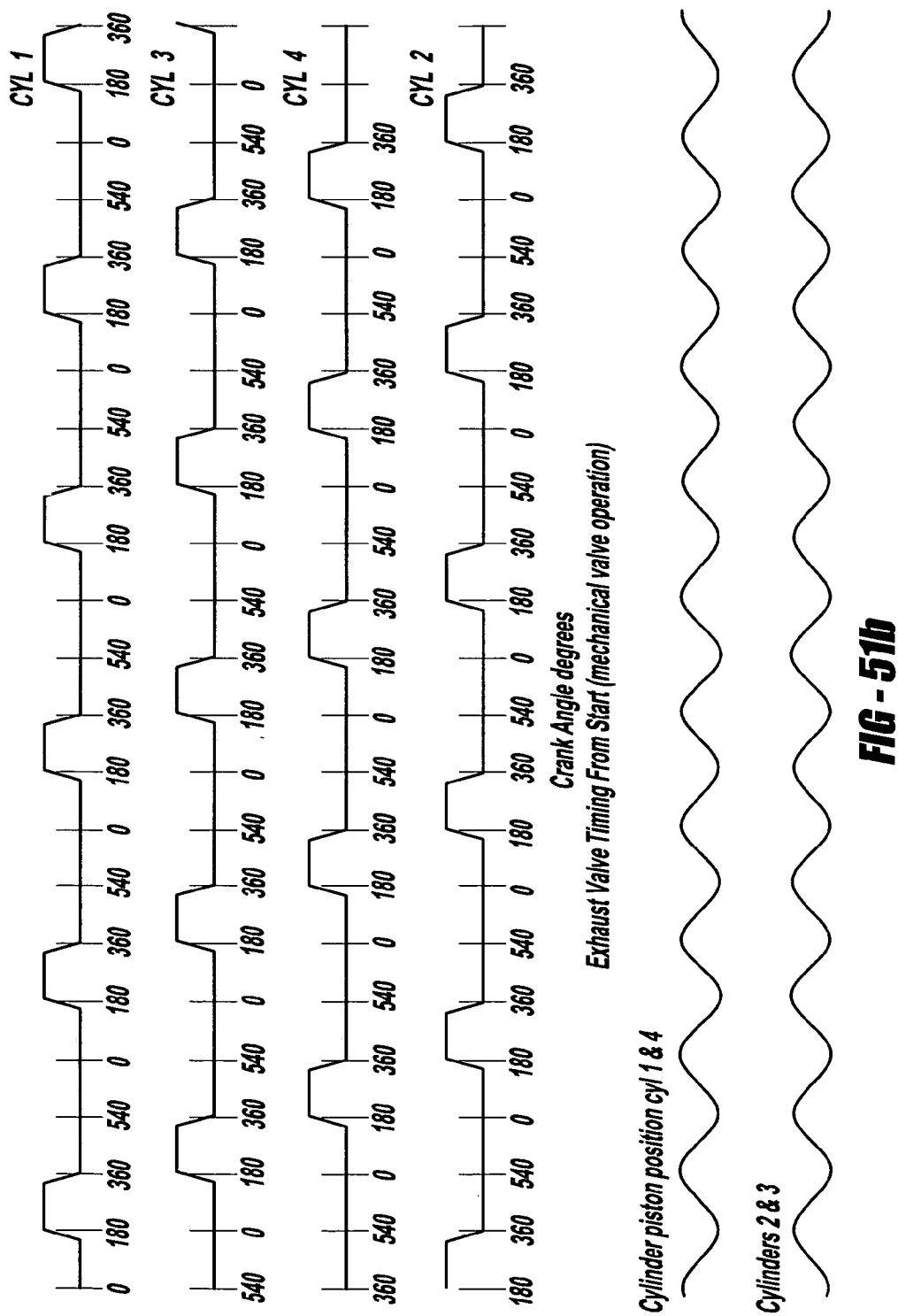

Referring to FIGS. 51*a* and 51*b*, the plots show intake and exhaust valve timing during a start for an engine with valves that may be operated before combustion in a selected cylinder occurs, electromechanical valves for example.

The intake valves are set to an open position after a key on is observed. As the starter rotates the engine the mechanically driven exhaust valves open and close based on the engine position and cam timing. At the vertical sync line, a point shown for illustration and that may vary depending on system configuration, the engine controller 12 determines engine position from crankshaft sensor 118. After engine position is known, the intake valves are open during crank angle intervals that can be intake and compression strokes of four-stroke cylinder operation. During crank angle intervals that can be considered power and exhaust strokes of four-stroke cylinder operation, the intake valves are closed. This sequence occurs until before fuel is injected into the intake port of a cylinder selected for a first combustion event.

By following this sequence, engine pumping work may be increased, but net residual hydrocarbon flow through the engine can be reduced. And, in some cases, net flow through the engine is reversed, such that gasses from the exhaust manifold are pumped into the intake manifold, before fuel injection is commenced.

Fuel is injected on a closed intake valve prior to an induction event in respective cylinders. Alternatively, cylinders can be operated in multi-stroke modes and/or fuel may be injected on an open valve. Furthermore, fuel may be injected after the induction stroke on direct injection engines.

Figure 52A:
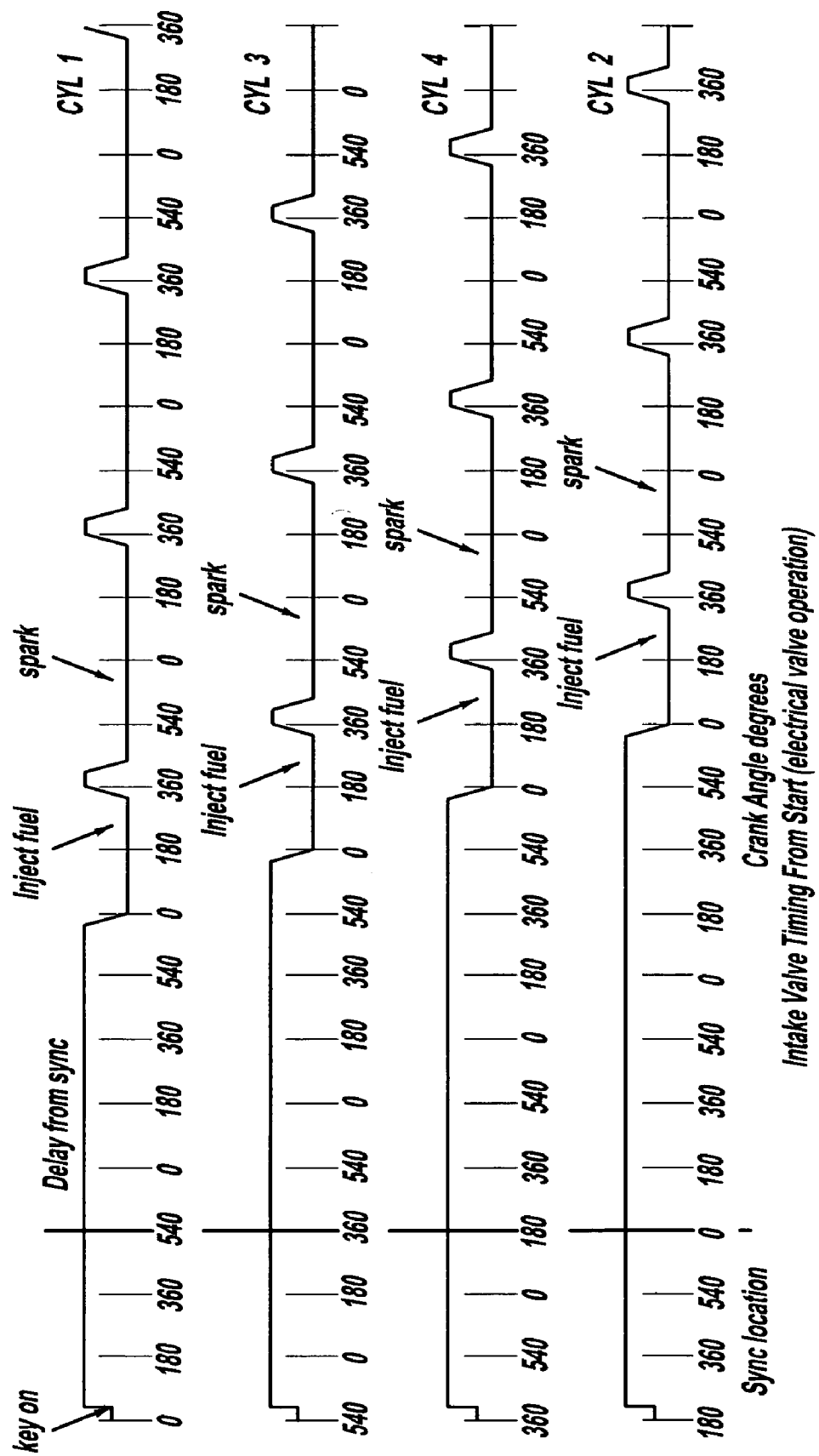
FIG. 52$a$ is a plot of example intake valve events over a crankshaft angle interval during start.
Figure 52B:
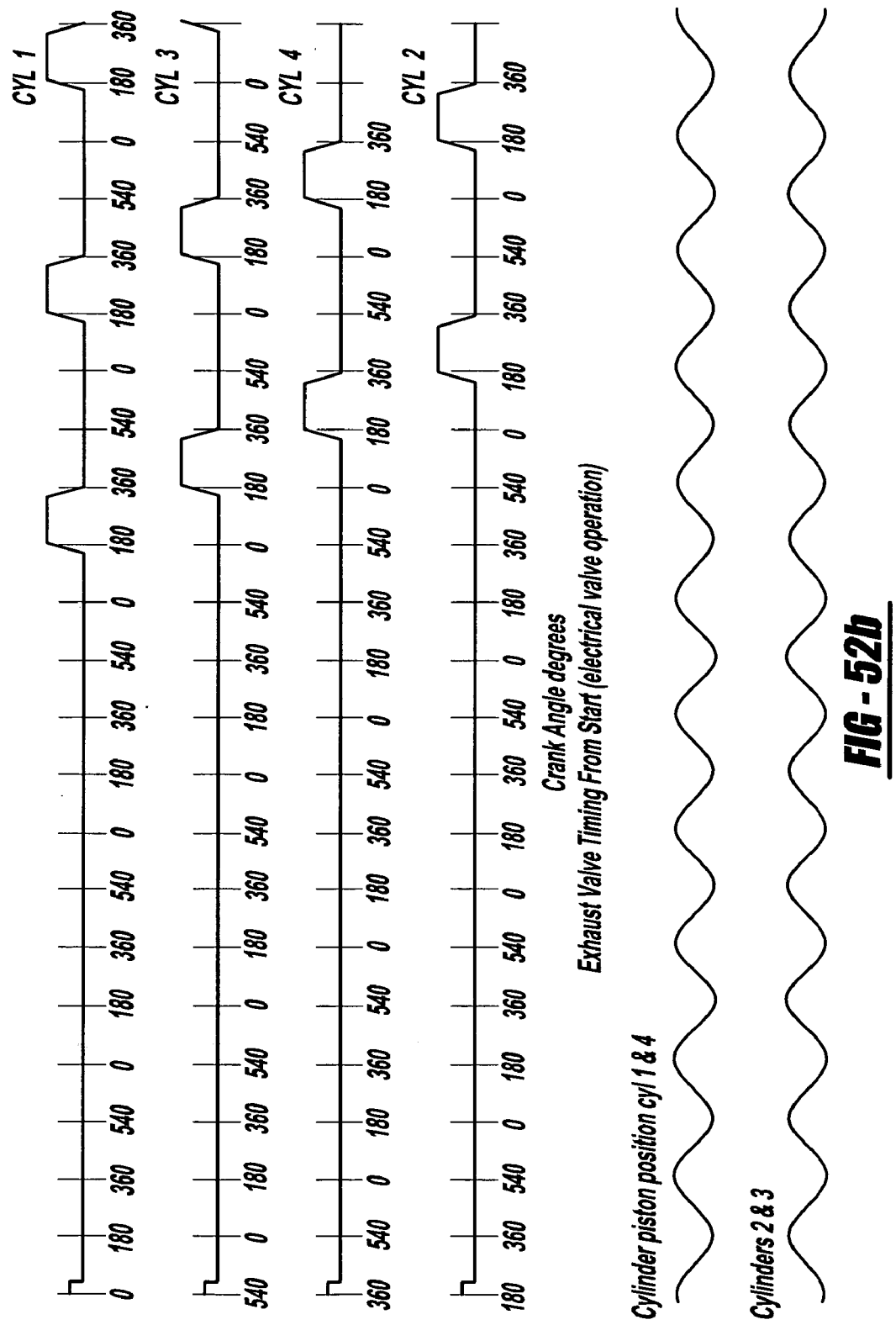

Referring to FIGS. 52*a* and 52*b*, the plots show intake and exhaust valve timing during a start for an engine with valves that may be held in a position, electromechanical valves for example.

The intake valves are set to an open position and the exhaust valves are set to a closed position after a key on is observed. At the vertical sync line, a point shown for illustration and that may vary depending on system configuration, the engine controller 12 determines engine position from crankshaft sensor 118. A delay time is shown between sync and the first valve operation (opening/closing), the actual delay may be shorter or longer. After engine position is known, the intake valves are held open until before fuel is injected into the intake port of a cylinder selected for a first combustion event.

By holding the intake valves in an open position and exhaust valves in a closed position, engine pumping work and residual hydrocarbons pumped through the engine as the engine rotates can be reduced. Opening intake valves can reduce engine pumping work since air can pass in and out of a cylinder as a piston travels toward or away from the cylinder head. Holding residual hydrocarbons in an engine and combusting the hydrocarbons may reduce the amount of hydrocarbons emitted into the exhaust since residual hydrocarbons may be converted into other constituents, namely $CO_2$ and $H_2O$, during combustion.

Figure 53A:
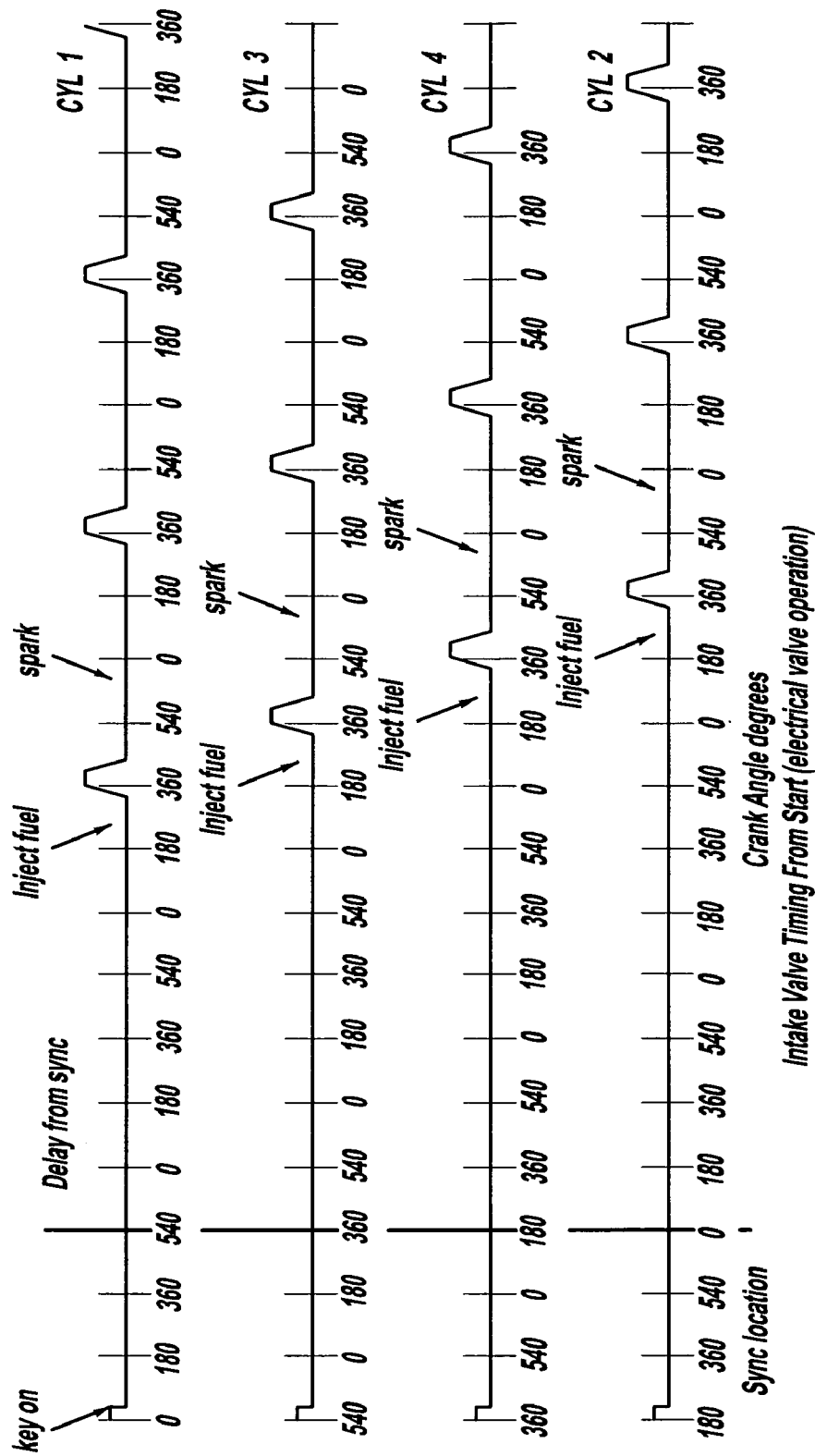
FIG. 53$a$ is a plot of example intake valve events over a crankshaft angle interval during start.
Figure 53B:
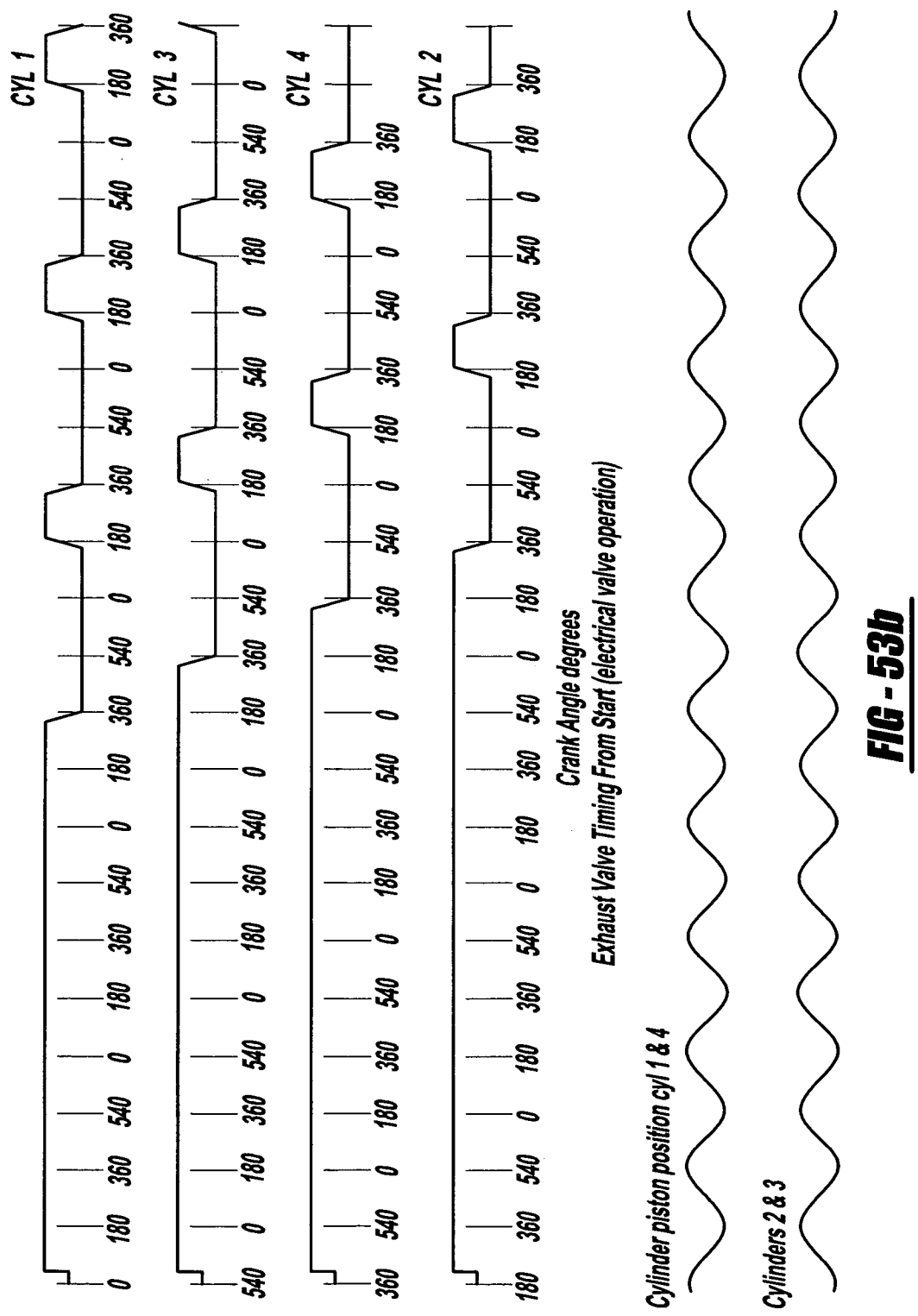

Referring to FIGS. 53*a* and 53*b*, the plots show intake and exhaust valve timing during a start for an engine with valves that may be held in a position, electromechanical valves for example.

The intake valves are set to a closed position and the exhaust valves are set to an open position after a key on is observed. At the vertical sync line, a point shown for illustration and that may vary depending on system configuration, the engine controller 12 determines engine position from crankshaft sensor 118. A delay time is shown between sync and the first valve operation (opening/closing), the actual delay may be shorter or longer. After engine position is known, the intake valve is held closed until fuel is injected into the intake port of the respective cylinder, and then the intake valve opens to induct an air-fuel mixture.

The exhaust valves are held in an open position until before a first induction event in the respective cylinder. After the exhaust valves are closed, exhaust valve operation is based on the operational stroke of the cylinder, four-stroke for example.

By holding the intake valves in a closed position and exhaust valves in an open position, engine pumping work and residual hydrocarbons pumped through the engine as the engine rotates can be reduced. Opening exhaust valves can reduce engine pumping work since air can pass in and out of a cylinder as a piston travels toward or away from the cylinder head. However, the net air flow through the engine remains low since the intake valves are held in a closed position.

Since engines having electromechanical valves are not mechanically constrained to operate at fixed crankshaft positions, valve timing may be set to produce a desired stroke in a selected cylinder. For example, a piston that is traveling toward the cylinder head may be set to a compression or exhaust stroke by adjusting valve timing. In one example, setting the stroke of a cylinder can be described by FIG. 54.

Figure 54:
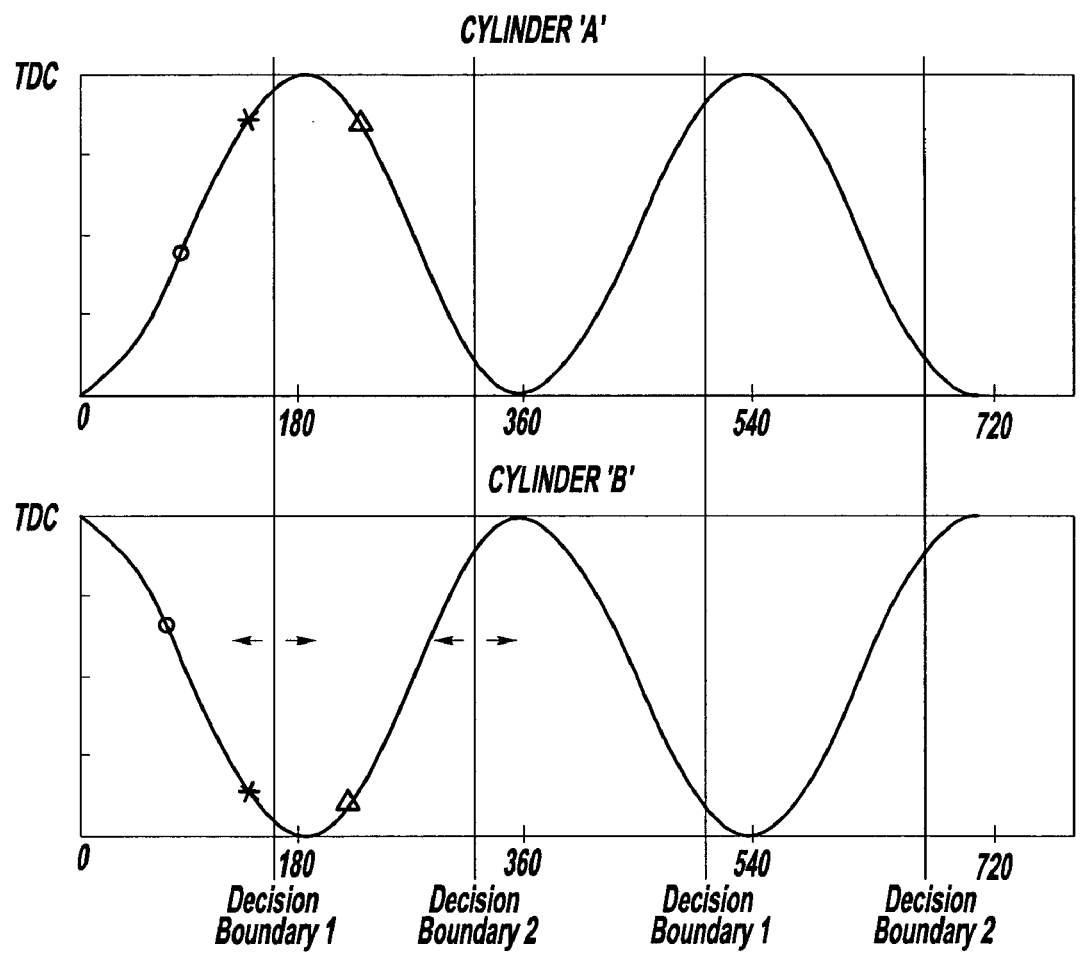
FIG. 54 is a plot showing piston trajectories and example decision boundaries for determining the stroke of an engine during a start.

Referring to FIG. 54 a plot shows piston trajectories for two pistons in a four-cylinder engine over two engine revolutions. The piston trajectory of the top plot and the piston trajectory of the bottom plot are 180 crank angle degrees out of phase. That is, one piston is at the top of the cylinder while the other piston is at the bottom of a cylinder.

Three symbols (o, *, and Δ) identify example engine positions where an engine controller may determine engine position during a start. In addition, four vertical lines pass through both plots to illustrate moveable decision boundaries where cylinder strokes can be determined. The number of decision boundaries can vary with the number of cylinders in an engine. Typically, one decision boundary is selected for every two cylinders in an engine.

Setting the stroke (e.g., intake, combustion, compression, or exhaust) for a cylinder capable of a first combustion event may be accomplished based on a number of engine operating conditions, control objectives, and may include a decision boundary. For example, after engine position can be established, a decision boundary can be used as a location, over a crank angle interval, to set a stroke of a particular cylinder, based on engine operating conditions and control objectives. A four-cylinder engine with control objectives of a first combustion event in cylinder number one, producing a desired torque resulting from combustion event number one, could set the stroke of cylinder one, providing criteria are met, at or before a decision boundary. The remaining cylinder strokes can be set based on a predetermined order of combustion.

The decision boundary can be described as a location in crankshaft degrees relative to a piston position. In FIG. 54, the decision boundary 1 is at approximately 170 degrees after top-dead-center of cylinder "B". Decision boundary 2 is at approximately 350 degrees after top-dead-center of cylinder "B".

As the engine rotates, based on the determined engine operating conditions, cylinder stroke for respective cylinders may be set by adjusting valve timing, before and up to, a boundary condition. Two boundary conditions, decision boundary 1 and decision boundary 2, are shown in FIG. 54 because the illustrated cylinder trajectories are out of phase and the second boundary condition may be encountered, permitting setting of cylinder stroke, before the piston location represented by decision boundary 1 is reencountered. In other words, in this example, decision boundary 1 and 2 represent the same cylinder stroke setting opportunity, albeit in different cylinders.

Of course, the boundary conditions can move based on engine operating conditions and control objectives. For example, boundary conditions may be moved, relative to crankshaft angle, based on engine temperature or barometric pressure. When a decision boundary is encountered, engine operating parameters are evaluated to determine if the stroke of engine cylinders can be set. For example, if engine position and engine speed and/or acceleration permits induction of a desired air amount that can produce a desired engine output, a selected cylinder may be set to an induction stroke. Specifically, desired engine outputs can include desired engine torque, a desired cylinder air amount, and a desired engine speed. However, if operating conditions do not permit setting the stroke of a cylinder at the present boundary, then the next boundary condition factors into setting the cylinder stroke.

Referring again to FIG. 54, the "o" signifies a location where engine position might be established. If engine operating conditions meet criteria for setting the stroke of a cylinder before decision boundary 1 is encountered, the stroke of a selected cylinder can be set. In one example, cylinder "B" may be set to an intake stroke by adjusting valve timing such that cylinder "B" is the first cylinder to combust. The remaining cylinders are set to strokes based on a firing order, 1-3-4-2 in a four cylinder engine for example. In other words, if cylinder number one is set to an intake stroke, cylinder number three is set to an exhaust stroke, cylinder number four is set to a power stroke, and cylinder number two is set to a compression stroke. However, as described above, selected valve events may not follow four-stroke cylinder timings, up to a first combustion event, so that engine starting can be improved. On the other hand, if after evaluation engine operating conditions, the cylinder stroke cannot be set, the next stroke setting opportunity is at decision boundary 2.

The "*" signifies another engine position where engine position might be established. Again, if engine operating conditions meet criteria for setting the stroke of a cylinder before decision boundary 1 is encountered, the stroke of the selected cylinder is set. However, the "*" position occurs closer to decision boundary than the "o" position. When engine position is determined closer to the decision boundary, opportunity to set the stroke of a cylinder can decrease. For example, if an engine is beginning to rotate and engine position is established near a decision boundary, there may not be a sufficient duration or sufficient upward or downward movement to induct a desired cylinder air amount and produce an engine output. In this example, setting the cylinder stroke may be delayed until the next decision boundary under these conditions.

The "Δ" signifies yet another engine position where engine position might be established. In this position, if engine operating conditions meet criteria for setting the stroke of a cylinder before decision boundary 2 is encountered, the stroke of the selected cylinder is set. Specifically, in this case, cylinder "A" is set to an intake stroke and fueled to be the first cylinder to carry out combustion. Decision boundary 1 and 2 can be used to set the stroke of different cylinders that produce a first combustion event.

As described above, various valve sequences can be used to vary valve timing (of electromechanical valves, for example) to be different before (and/or during) a first combustion event (or a first fuel injection event), compared with valve timing after a first combustion event. Each of the above embodiments offer different advantages that can be used to improve engine operation.

Figure 55:
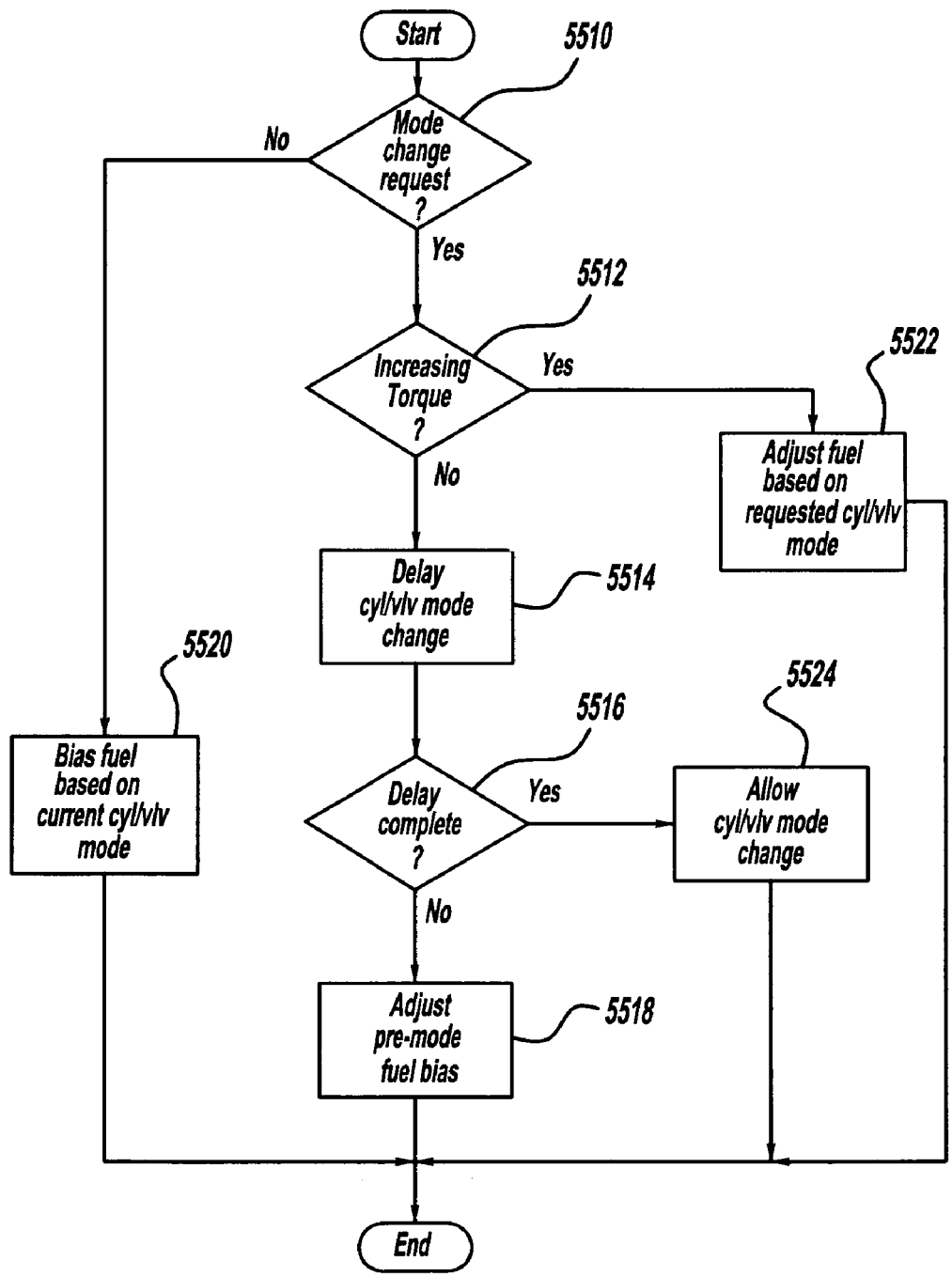
FIG. 55 is a flowchart of a method to adjust fuel based on selected cylinder and/or valve mode.

Referring to FIG. 55, a flowchart shows a method to adjust air-fuel based on a selected cylinder and/or valve mode.

As described above, cylinder and valve modes may be used to improve performance and fuel economy. However, without controlling the state of a catalyst (amount of stored oxidants, temperature, etc.) during cylinder and/or valve mode changes, and while in the different cylinder and/or valve modes, emissions may increase. Fuel and spark are two control parameters that can be used to adjust the state of a catalyst. The method of FIG. 55 works in conjunction with the method of FIG. 10 to affect the catalyst state by adjusting fuel delivered to the engine.

In step 5510, the routine determines if a mode change has been requested by step 1022 of FIG. 10. A mode change request is indicated by a difference between the requested mode variable and the target mode variable. If a mode change is not pending, the routine proceeds to step 5520. If a mode change is pending, the routine proceeds to step 5512.

In step 5512, the routine determines if the requested engine torque is increasing. If so, the routing proceeds to step 5522. If not, the routine proceeds to step 5514. This step allows a cylinder and/or valve mode change to occur without a long delay if the driver is requesting additional torque, which can improve vehicle drivability.

In step 5514, the routine delays an impending cylinder and/or valve mode change. The routine sends a signal, by setting the MODE_DLY variable, to step 1022 of FIG. 10. The duration of the delay may be based on time and/or on the oxidant state and/or oxidant storage capacity of the catalyst. For example, the oxidant storage capacity of a catalyst and the amount of oxidants stored in the catalyst may be sufficient to allow a mode change by the method of FIG. 14, but this routine may delay the mode change to further adjust the catalyst state by increasing or decreasing fuel to the engine. Typically, the delay is maintained until the oxidant storage capacity reaches a predetermined level that is based on the new cylinder and/or valve mode. The routine then continues to step 5516.

In step 5516, the routine determines if the delay is complete. If the delay is complete the routine continues to step 5524. If the delay is not complete the routine proceeds to step 5518.

In step 5518, the fuel delivered to the engine is adjusted. The fuel adjustment amount is based on the new cylinder and/or valve mode, engine operating conditions, and catalyst conditions. For example, if the engine was operating in a fuel enrichment mode to regulate catalyst temperature, the fuel amount may be leaned to return the catalyst from a hydrocarbon rich state. On the other hand, if the engine has been operating with eight cylinders at low or moderate loads, and a reduced cylinder mode is requested, the fuel amount may be enriched to anticipate higher levels of $NO_x$ that may occur in reduced cylinder modes. Fuel is adjusted by increasing or decreasing the average amount of fuel delivered to the engine, by biasing the fuel for example. Alternatively, fuel amounts may be pulsed or stepped to increase or decrease the amount of oxidants stored in the catalyst. The effect of this step can be to pre-condition the state of the catalyst for the impending cylinder and/or valve mode change. Then, the routine exits.

In step 5524, the routine enables a requested cylinder and/or valve mode. After the predetermined delay is been met, the MODE_DLY variable is set to an off state, permitting the mode change in step 1022 of FIG. 10. The routine proceeds to exit after turning off the mode delay flag.

In step 5522, fuel delivered to the engine is adjusted based on the new cylinder and/or valve mode. This path of the routine does not delay an impending cylinder and/or valve mode request, but the fuel may be enriched or leaned during the period between setting the requested mode variable and setting the target mode variable. This feature may also be used to pre-condition the catalyst before an impending cylinder and/or valve mode change. The routine proceeds to exit.

In step 5520, fuel is adjusted based on the current cylinder and/or valve mode. Switching cylinder and/or valve modes may alter engine feed gas constituents. It may be beneficial to adjust the amount of fuel delivered to the engine to compensate for exhaust gases produced by specific cylinder and/or valve modes. Therefore, the base fuel delivered to the engine can be adjusted to provide the before-mentioned compensation. For example, the desired base fuel amount may produce a stoichiometric air-fuel mixture, such as approximately 14.6 for example. Fuel compensation can be determined by looking up a fuel bias amount from a matrix of fuel bias amounts, MODE_BIAS. In this example, an enrichment request of 0.2 air-fuel ratios may be requested. The fuel bias can then reduce the air-fuel mixture to produce a 14.4 air-fuel ratio mixture. Compensation for each cylinder and/or valve mode is provided. The routine proceeds to exit.

As will be appreciated by one of ordinary skill in the art, the routines described in FIGS. 2, 10, 13–18, 32, 37 and 39 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages described herein, but are provided for ease of illustration and description. Although not explicitly illustrated, one of ordinary skill in the art will recognize that one or more of the illustrated steps or functions may be repeatedly performed depending on the particular strategy being used.

It will be appreciated that the various operating modes described above are exemplary in nature, and that these specific embodiments are not to be considered in a limiting sense, because numerous variations are possible. The subject matter of the present disclosure includes all novel and non-obvious combinations and subcombinations of the valve operating patters, cylinder operating patterns, cylinder stroke variations, valve timing variations, and other features, functions, and/or properties disclosed herein.

For example, in one example, an approach can be used where the engine varies the number of cylinders carrying out combustion. Further, not only can the number of the cylinders carrying out combustion be varied, but the number of valves in active cylinders can also be varied (in time, or between different cylinder groups). Further still, in addition or as an alternative, the number of stroke in active cylinders can be varied (in time, or between different cylinder groups). Thus, in one example, in a first mode the engine can operate with a first number of cylinders carrying out combustion with a first number of strokes and a first number of active valves, and in a second mode, the engine can operate with a second number of cylinders carrying out combustion with a second number of strokes and a second number of active valves. In this way, greater torque resolution can be obtained with increasing fuel economy. In another example, a first group of cylinders of the engine can operate with a first number of strokes and a first number of active valves, and a second group of cylinders of the engine can operate with a second number of strokes and a second number of active valves. In still another example, the cylinders can have equal number of valves active, yet different valve patterns (e.g., one group of cylinder can have the active intake valve and exhaust valve in a diagonal configuration, while another group has a non-diagonal configuration).

Further, in one approach, the control system can use a combination of varying the number of cylinders carrying out combustion, varying the number (or pattern) of active valves, and/or varying the number of strokes of active cylinders as ways to control engine output torque. By having numerous degrees of freedom, it can be possible to better optimize engine performance for various operating conditions.

Also, in one example described above, the number of strokes can be varied as a condition of a catalyst in the exhaust system varies, such as, for example, the amount of stored oxidants. However, other engine parameters can also be adjusted based on catalyst conditions, such as the number of active valves in active cylinders, and/or the pattern of active valve in active cylinders. Further, the number of cylinders carrying out combustion can also be varied as catalyst conditions vary.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the valve operating patters, cylinder operating patterns, cylinder stroke variations, valve timing variations, and/or properties may be claimed through amendment of the present claims or through presentation of new claims in this or a related application. Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the disclosure. For example, I3, I4, I5, V6, V8, V10, and V12 engines operating in diesel, natural gas, gasoline, or alternative fuel configurations could be used to advantage.

The invention claimed is:

1. A control method for selecting cylinder and valve actuation modes in an engine having at least a valve that may be deactivated, the method comprising:
   generating a set of available cylinder and valve modes;
   removing cylinder and valve modes from said available set of cylinder and valve modes, based on a group of operating conditions;
   determining a cylinder and a valve mode, from remaining active cylinder and valve modes, based on a second group of operating conditions.

2. The method of claim 1 wherein said set of cylinder and valve modes is selected from a group of cylinder modes comprising: V8, V4.

3. The method of claim 1 wherein said set of cylinder and valve modes is selected from a group of cylinder modes comprising: V6, V2.

4. The method of claim 1 wherein said set of cylinder and valve modes are selected from a group of cylinder modes comprising: I4, I2.

5. The method of claim 1 wherein said set of cylinder and valve modes are selected from a group of cylinder modes comprising: I5, I3.

6. The method of claim 1 wherein said set of valve modes are selected from a group of valve modes comprising: single intake/single exhaust, dual intake/dual exhaust.

7. The method of claim 1 wherein said set of valve modes is selected from a group of valve modes comprising: single intake/dual exhaust, dual intake/single exhaust.

8. The method of claim 1 wherein said set of valve modes is selected from a group of valve modes comprising: alternating intake/alternating exhaust, alternating intake/dual exhaust.

9. The method of claim 6 wherein said set of valve modes is selected from a group of valve modes comprising: alternating intake/alternating exhaust.

10. The method of claim 1 wherein said cylinder mode is determined by intake valve selection.

11. The method of claim 1 wherein said first group of operating conditions comprises engine temperature.

12. The method of claim 1 wherein said first group of operating conditions is comprises engine speed.

13. The method of claim 1 wherein said first group of operating conditions is comprised of requested engine torque.

14. A control method for selecting cylinder and valve actuation modes in an engine having at least an electromechanical valve, the method comprising:
   generating a set of available cylinder and valve modes;
   organizing said set of available cylinder and valve modes based on available engine torque of said engine operating in said available cylinder and valve modes;
   removing cylinder and valve modes from said set of cylinder and valve modes, based on a group of operating conditions, in order of said available engine torque;
   determining a cylinder and a valve mode from remaining active cylinder and valve modes of said set of cylinder and valve modes, based on a second group of operating conditions; and
   operating said engine in said determined cylinder and valve mode.

15. The method of claim 14 wherein said organization of available cylinder and valve modes is in an order of higher to lower available engine torque.

16. The method of claim 14 wherein said organization of available cylinder and valve modes is in an order of lower to higher available engine torque.

17. The method of claim 14 wherein said set of cylinder and valve modes is selected from a group of cylinder modes comprising: V8, V4.

18. The method of claim 14 wherein said set of valve modes is selected from a group of valve modes comprising: single intake/single exhaust, dual intake/dual exhaust.

19. The method of claim 14 wherein said first group of operating conditions is comprises engine temperature.

20. The method of claim 14 wherein said first group of operating conditions is comprises engine speed.

21. The method of claim 14 wherein said first group of operating conditions is comprises requested engine torque.

22. A computer readable storage medium having stored data representing instructions executable by a computer to control an internal combustion engine of a vehicle, said storage medium comprising:
   instructions for generating a set of available cylinder and valve modes;
   removing cylinder and valve modes from said set of cylinder and valve modes, based on a group of operating conditions; and
   determining a cylinder and a valve mode, from remaining active cylinder and valve modes, based on a second group of operating conditions.

* * * * *